(12) United States Patent
Chiyo et al.

(10) Patent No.: US 11,315,169 B2
(45) Date of Patent: Apr. 26, 2022

(54) INFORMATION DISTRIBUTION SYSTEM AND ELECTRONIC DEVICE

(71) Applicants: Naoki Chiyo, Kanagawa (JP); Mayu Kondo, Kanagawa (JP)

(72) Inventors: Naoki Chiyo, Kanagawa (JP); Mayu Kondo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 16/743,351

(22) Filed: Jan. 15, 2020

(65) Prior Publication Data

US 2020/0151802 A1    May 14, 2020

Related U.S. Application Data

(63) Continuation of application No. 15/819,340, filed on Nov. 21, 2017, now Pat. No. 10,580,061.

(30) Foreign Application Priority Data

| Dec. 13, 2016 | (JP) | .............................. | JP2016-241652 |
| Mar. 6, 2017 | (JP) | .............................. | JP2017-042260 |

(51) Int. Cl.
 *G06Q 30/06* (2012.01)
 *G06Q 10/08* (2012.01)
 (Continued)

(52) U.S. Cl.
 CPC ......... *G06Q 30/0633* (2013.01); *G06F 3/121* (2013.01); *G06F 3/1235* (2013.01);
 (Continued)

(58) Field of Classification Search
 USPC ........................................................ 705/14.4
 See application file for complete search history.

(56) References Cited

U.S. PATENT DOCUMENTS 6,023,593 A * 2/2000 Tomidokoro .......... G03G 15/55
 399/24
6,067,531 A   5/2000 Hoyt et al.
 (Continued)

FOREIGN PATENT DOCUMENTS

| JP | 2003-308195 | 10/2003 |
| JP | 2006-040038 | 2/2006 |

(Continued)

OTHER PUBLICATIONS

English translation (dated Mar. 25, 2021) of Japanese Intellectual Property Office "Notice of Reasons for Refusal" regarding Japanese Patent Application 2017-042260 (drafting date Nov. 11, 2020). (Year: 2021).*

(Continued)

*Primary Examiner* — Nicholas D Rosen
(74) *Attorney, Agent, or Firm* — IPUSA, PLLC

(57) ABSTRACT

An information distribution system includes an electronic device; and a server system including at least one information distribution apparatus that communicates with the electronic device via a network. The electronic device includes an information requester configured to transmit, to the server system, a request to distribute information, the request being transmitted together with identification information of the electronic device; and an information displayer configured to display, on a display device, the information transmitted from the server system. The server system includes a contract information acquirer configured to acquire contract information relating to a contract for a service provided to the electronic device; an information generator configured to identify the contract information of the electronic device based on the identification information, and generate the information according to the contract information; and an information distributor configured to distribute the informa- (Continued)

tion generated by the information generator, to the electronic device.

28 Claims, 33 Drawing Sheets

(51) Int. Cl.
  *G06F 3/12* (2006.01)
  *H04N 1/00* (2006.01)
  *G06Q 30/02* (2012.01)
(52) U.S. Cl.
  CPC .......... *G06F 3/1285* (2013.01); *G06F 3/1286* (2013.01); *G06F 3/1293* (2013.01); *G06Q 10/08* (2013.01); *G06Q 10/0833* (2013.01); *G06Q 30/0241* (2013.01); *G06Q 30/06* (2013.01); *G06Q 30/0601* (2013.01); *G06Q 30/0635* (2013.01); *H04N 1/00* (2013.01); *H04N 1/00015* (2013.01); *H04N 1/00023* (2013.01); *H04N 1/00042* (2013.01); *H04N 1/00061* (2013.01); *H04N 1/00074* (2013.01); *H04N 1/00082* (2013.01); *H04N 1/00244* (2013.01); *H04N 1/00477* (2013.01); *H04N 2201/0094* (2013.01)

(56) References Cited

U.S. PATENT DOCUMENTS

| | | | |
|---|---|---|---|
| 6,272,472 | B1 | 8/2001 | Danneels et al. |
| 6,629,134 | B2 | 9/2003 | Hayward et al. |
| 6,952,686 | B1 | 10/2005 | Kudo |
| 7,010,502 | B1* | 3/2006 | Hoshizawa ............ G06Q 30/02 399/24 |
| 7,124,097 | B2 | 10/2006 | Claremont et al. |
| 7,400,241 | B2 | 7/2008 | Horitgami et al. |
| 7,830,555 | B2* | 11/2010 | Katsurabayashi ............... H04N 1/32133 358/3.28 |
| 7,844,481 | B2* | 11/2010 | Hilbush ............ G06Q 10/0835 705/7.13 |
| 8,019,648 | B2 | 9/2011 | King et al. |
| 8,819,541 | B2* | 8/2014 | Nicholas ............ G06F 40/143 715/236 |
| 9,015,628 | B2* | 4/2015 | Kuroyanagi ............ G06F 8/38 715/835 |
| 9,087,354 | B1* | 7/2015 | Hambir ............ G06Q 30/0601 |
| 9,330,403 | B2 | 5/2016 | Kakii |
| 9,537,791 | B2 | 1/2017 | Chiyo |
| 9,614,982 | B2 | 4/2017 | Chiyo et al. |
| 9,742,936 | B2 | 8/2017 | Jimbo |
| 9,875,385 | B1 | 1/2018 | Humphreys et al. |
| 10,149,123 | B2* | 12/2018 | Li ............ H04W 4/12 |
| 10,580,061 | B2* | 3/2020 | Chiyo ............ G06Q 30/0635 |
| 2002/0010661 | A1* | 1/2002 | Waddington ............ G06Q 10/08 705/28 |
| 2002/0072998 | A1 | 6/2002 | Haines et al. |
| 2003/0023703 | A1 | 1/2003 | Hayward et al. |
| 2003/0055767 | A1 | 3/2003 | Tamura et al. |
| 2003/0074268 | A1 | 4/2003 | Haines et al. |
| 2003/0139973 | A1 | 7/2003 | Claremont et al. |
| 2005/0038758 | A1* | 2/2005 | Hilbush ............ G06Q 10/06311 705/402 |
| 2006/0023945 | A1 | 2/2006 | King et al. |
| 2007/0019245 | A1* | 1/2007 | Katsurabayashi ............... H04N 1/32133 358/3.28 |
| 2007/0103287 | A1 | 5/2007 | Horitgami et al. |
| 2010/0211866 | A1* | 8/2010 | Nicholas ............ G06F 16/9577 715/234 |
| 2011/0067023 | A1 | 3/2011 | Chiyo et al. |
| 2011/0125655 | A1 | 5/2011 | Chiyo et al. |
| 2012/0023451 | A1* | 1/2012 | Kuroyanagi ............ G06F 8/38 715/835 |
| 2012/0203632 | A1* | 8/2012 | Blum ................ G06Q 30/0633 705/14.53 |
| 2014/0310196 | A1* | 10/2014 | Yamamura ............ G06Q 10/083 705/337 |
| 2015/0032586 | A1* | 1/2015 | Blackhurst ......... G06Q 30/0631 705/35 |
| 2016/0105492 | A1 | 4/2016 | Jimbo |
| 2016/0371070 | A1 | 12/2016 | Jimbo |
| 2017/0201869 | A1* | 7/2017 | Li ........................ H04W 12/04 |
| 2017/0212714 | A1 | 7/2017 | Watanabe et al. |

FOREIGN PATENT DOCUMENTS

| | | |
|---|---|---|
| JP | 2011-005791 | 1/2011 |
| JP | 2014-127840 | 7/2014 |
| JP | 2015-062114 | 4/2015 |
| JP | 2015-142288 | 8/2015 |
| JP | 2015-148968 | 8/2015 |
| JP | 2015-158937 | 9/2015 |
| JP | 2015-180986 | 10/2015 |
| JP | 2016-058076 | 4/2016 |
| JP | 2016-081077 | 5/2016 |
| JP | 2016-081120 | 5/2016 |
| JP | 2016-218706 | 12/2016 |
| JP | 2017-004217 | 1/2017 |
| JP | 2017-010532 | 1/2017 |
| JP | 2017-182748 | 10/2017 |
| WO | 2017/158962 | 9/2017 |

OTHER PUBLICATIONS

Anon., "Qiva Introduces Supply Chain Execution Framework for Global B2B E-Commerce," PR Newswire, New York, Feb. 29, 2000. (Year: 2000).*
Anon., "Low-cost proof-of-delivery technology improves efficiency," Fleet Equipment, vol. 39, No. 12, pp. 20-21, Dec. 2013. (Year: 2013).*
Bowman, R., "The right Rx for drug distribution," Chilton's Distribution, 90.n12: p60(2). Reed Business Information, Inc. (US). Nov. 1991. (Year: 1999).*
Lau, S.Q., "domain Analysis of E-Commerce Systems Using Feature-Based Model Templates," thesis, University of Waterloo, Waterloo, Ontario, Canada, 2006. (Year: 2006).*
Japanese Office Action for 2017-042260 dated Nov. 17, 2020.
Anon., "HP Threatens Java Hope," Christchurch Press, p. 27, Mar. 24, 1998 (Year: 1998).
Anon., "Instantly Re-Order Toner Cartridges Online Using HP's Smartchip," M2 Presswire, Oct. 19, 2001 (Year: 2001).
Fox, B., "We Know What You're Printing," New Scientist, vol. 172, No. 2316, p. 24, Nov. 10, 2001 (Year: 2001).
Richard, J., "Lexmark Printer Supplies Monitor Acts as GasGauge, for Inkjet Printers," http://reseller.lexmark.com/US?CorporatePressRelease/0,1196,709.html, retrieved Dec. 10, 2001 (Year: 2001).
Shea, J., "Technology Decision Cycle Tracks the Recovery," Rental Equipment Register, 54.5 Penton Media, Inc., May 1, 2011 (Year: 2011).

* cited by examiner

LOG OUT

TONER DELIVERY HISTORY    INFORMATION UPDATE TIME AND DATE: SEPTEMBER 6, 2016 AT 13:30

NOTIFICATION    CLOSE

DESTINATION: ABC COMPANY
MODEL, MACHINE NUMBER: 3F13-110087

NEWEST DELIVERY HISTORY PER-TONER TYPE

| AUTOMATIC REPORT DATE | PRODUCT NAME (PER-TONER TYPE) | DELIVERY STATUS (NEWEST PER-TONER TYPE) |
|---|---|---|
| 2016/06/05 | P TONER BLACK C5002 | SHIPMENT COMPLETED (SCHEDULED TO BE DELIVERED ON 2016/06/07) |
| 2016/06/05 | P TONER CYAN C5002 | SHIPMENT COMPLETED (SCHEDULED TO BE DELIVERED ON 2016/06/07) |
| 2016/06/05 | P TONER MAGENTA C5002 | SHIPMENT COMPLETED RETURN |
| 2016/06/05 | P TONER YELLOW C5002 | SHIPMENT COMPLETED (SCHEDULED TO BE DELIVERED ON 2016/06/07) |

DELIVERY HISTORY LIST

| AUTOMATIC REPORT DATE | PRODUCT NAME | DELIVERY STATUS |
|---|---|---|
| 2016/06/05 | P TONER BLACK C5002 | SHIPMENT COMPLETED (SCHEDULED TO BE DELIVERED ON 2016/06/07) |
| 2016/06/05 | P TONER CYAN C5002 | SHIPMENT COMPLETED (SCHEDULED TO BE DELIVERED ON 2016/06/07) |
| 2016/06/05 | P TONER MAGENTA C5002 | SHIPMENT COMPLETED RETURN |
| 2016/06/05 | P TONER YELLOW C5002 | SHIPMENT COMPLETED (SCHEDULED TO BE DELIVERED ON 2016/06/07) |

STATE CONFIRMATION    STOP

FIG.11

TONER DELIVERY HISTORY
INFORMATION UPDATE TIME AND DATE: SEPTEMBER 6, 2016 AT 13:30

DESTINATION: ABC COMPANY
MODEL, MACHINE NUMBER: 3F13-110087

NEWEST DELIVERY HISTORY PER-TONER TYPE

| AUTOMATIC REPORT DATE | PRODUCT NAME (PER-TONER TYPE) | DELIVERY STATUS (NEWEST PER-TONER TYPE) |
|---|---|---|
| 2016/06/05 | P TONER BLACK C5002 | SHIPMENT COMPLETED (SCHEDULED TO BE DELIVERED ON 2016/06/07) |
| 2016/06/05 | P TONER CYAN C5002 | SHIPMENT COMPLETED (SCHEDULED TO BE DELIVERED ON 2016/06/07) |
| 2016/06/05 | P TONER MAGENTA C5002 | SHIPMENT COMPLETED RETURN |
| 2016/06/05 | P TONER YELLOW C5002 | SHIPMENT COMPLETED (SCHEDULED TO BE DELIVERED ON 2016/06/07) |

DELIVERY HISTORY LIST

| AUTOMATIC REPORT DATE | PRODUCT NAME | DELIVERY STATUS |
|---|---|---|
| 2016/06/05 | P TONER BLACK C5002 | SHIPMENT COMPLETED (SCHEDULED TO BE DELIVERED ON 2016/06/07) |
| 2016/06/05 | P TONER CYAN C5002 | SHIPMENT COMPLETED (SCHEDULED TO BE DELIVERED ON 2016/06/07) |
| 2016/06/05 | P TONER MAGENTA C5002 | SHIPMENT COMPLETED RETURN |
| 2016/06/05 | P TONER YELLOW C5002 | SHIPMENT COMPLETED (SCHEDULED TO BE DELIVERED ON 2016/06/07) |

STATE CONFIRMATION

FIG.21
| PRODUCT CODE | PRODUCT NAME | TONER TYPE | TONER ICON |
|---|---|---|---|
| 6003001 | RHOC MP P TONER BLACK C6003 | TONER BLACK |  |
| 3302001 | imagine MP P TONER BLACK C3302 | TONER BLACK |  |
| 5002001 | imagine MP P TONER BLACK C5002 | TONER BLACK |  |

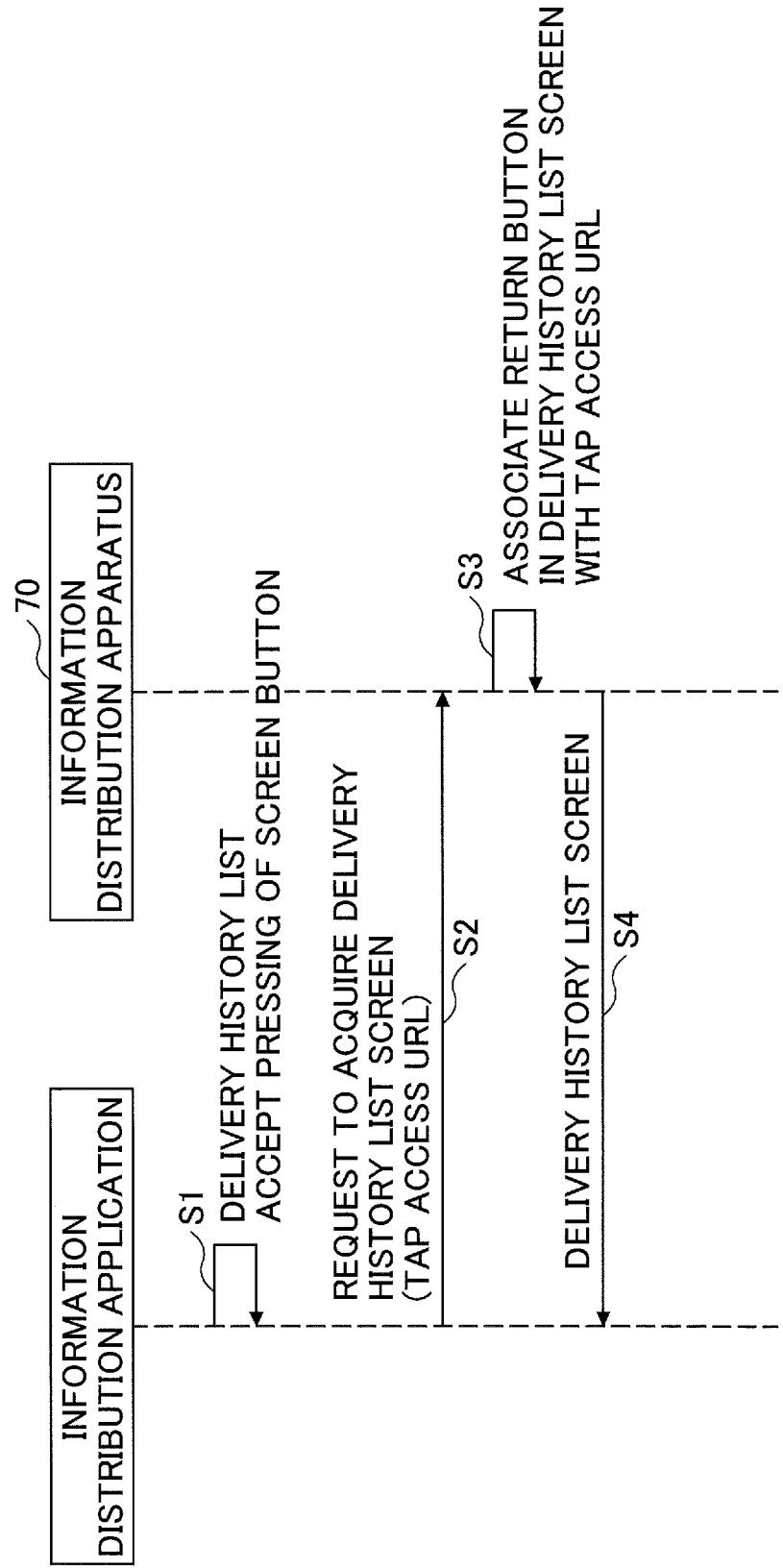

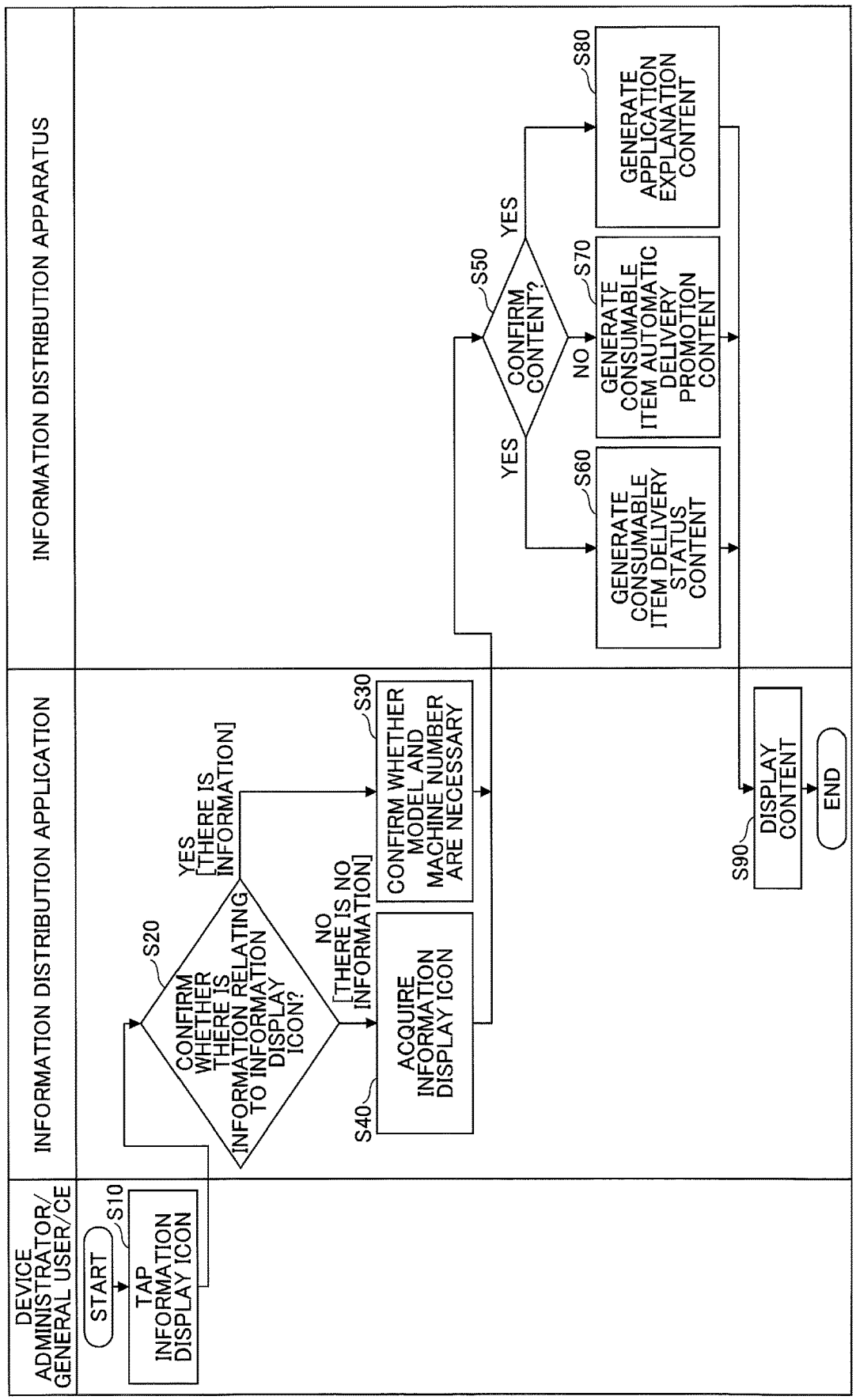

INFORMATION DISTRIBUTION SYSTEM AND ELECTRONIC DEVICE

CROSS-REFERENCE TO RELATED APPLICATION

The present application is a continuation application of and claims the benefit of priority under 35 U.S.C. 120 of U.S. patent application Ser. No. 15/819,340, filed on Nov. 21, 2017, which claims priority to Japanese Patent Application No. 2016-241652, filed on Dec. 13, 2016 and Japanese Patent Application No. 2017-042260, filed on Mar. 6, 2017. The contents of the applications are incorporated herein by reference in their entirety.

BACKGROUND OF THE INVENTION

1. Field of the Invention

The present invention relates to an information distribution system and an electronic device.

2. Description of the Related Art

There are known information distribution systems for transmitting by using electronic display devices such as displays, at locations where people pass by or where people may exist, such as outdoors, storefronts, public spaces, and transportation facilities. Information distribution systems and information distributed by information distribution systems are referred to as digital signage, which is used at various locations.

However, it is unlikely that all the information distributed by the information distribution system is effective for viewers. In order for the information distribution system to effectively provide the information, it is considered important to distribute the information, which is considered beneficial to the viewer, at appropriate timings. For this reason, a technique has been devised for increasing the distribution probability of information considered to be beneficial to the viewer (for example, see Patent Document 1). Patent Document 1 discloses an information distribution system that collects usage information of an electronic device and display capability information of a display device, and extracts and processes advertisement information according to the collected information.

Patent Document 1: Japanese Unexamined Patent Application Publication No. 2015-180986

SUMMARY OF THE INVENTION

An aspect of the present invention provides an information distribution system and an electronic device in which one or more of the disadvantages of the related art are reduced.

According to one aspect of the present invention, there is provided an information distribution system including an electronic device; and a server system including at least one information distribution apparatus that communicates with the electronic device via a network, wherein the electronic device includes an information requester configured to transmit, to the server system, a request to distribute information, the request being transmitted together with identification information of the electronic device; and an information displayer configured to display, on a display device, the information transmitted from the server system, and wherein the server system includes a contract information acquirer configured to acquire contract information relating to a contract for a service provided to the electronic device; an information generator configured to identify the contract information of the electronic device based on the identification information, and generate the information according to the contract information; and an information distributor configured to distribute the information generated by the information generator, to the electronic device.

BRIEF DESCRIPTION OF THE DRAWINGS

FIGS. 1A to 1C are diagrams illustrating an example of information provided by an information providing system according to a first embodiment of the present invention;

FIG. 11 is a diagram illustrating an example of consumable item delivery status content according to the first embodiment of the present invention;

FIG. 21 is a table required for a content generating unit to create the toner type according to the second embodiment of the present invention;

FIG. 27 is an example of a sequence diagram illustrating a procedure by the image forming apparatus for displaying the delivery history list screen from the consumable item delivery status content according to the third embodiment of the present invention;

FIG. 28 is an example of a flowchart illustrating a process by the information distribution application and information distribution apparatus when the information display icon is pressed according to the third embodiment of the present invention.

DETAILED DESCRIPTION OF THE PREFERRED EMBODIMENTS

In the related art, there has been a problem that the information provided by the information distribution system may cause the viewer to make an erroneous recognition. A specific example will be described. In an electronic device such as an image forming apparatus, there are cases where the manufacturer of the image forming apparatus provides a service for remotely monitoring the electronic device (hereinafter referred to as a "remote monitoring service"). Furthermore, there are also cases where a service is provided, in which a delivery company automatically delivers consumable items by using the remote monitoring service (hereinafter referred to as a "consumable item automatic delivery service"). For example, when the electronic device transmits a message indicating toner end to a remote monitoring apparatus, the remote monitoring apparatus informs the delivery company, such that the toner is automatically delivered to the customer of the electronic device, without the customer of the electronic device ordering the toner.

When the information distribution system is applied to an electronic device, there are cases where the information distribution system transmits an advertisement and a notification of the remote monitoring service and the automatic delivery service, to the electronic device. However, there may be cases where the customer has already made a contract for the remote monitoring service and the automatic delivery service. In a case where the customer has already made a contract, and information of these services is displayed on the electronic device, the viewer may erroneously recognize that the customer has not subscribed to the automatic delivery service and that there is a need to order the toner in the case of toner end. This erroneous recognition may cause the toner to be ordered in duplicate.

A problem to be solved by an embodiment of the present invention is to provide an information providing system by which erroneous recognition can be avoided.

An information distribution system and an information display method performed by an image forming apparatus according to embodiments of the present invention will be described by referring to the accompanying drawings.

First Embodiment

Figure 1A:
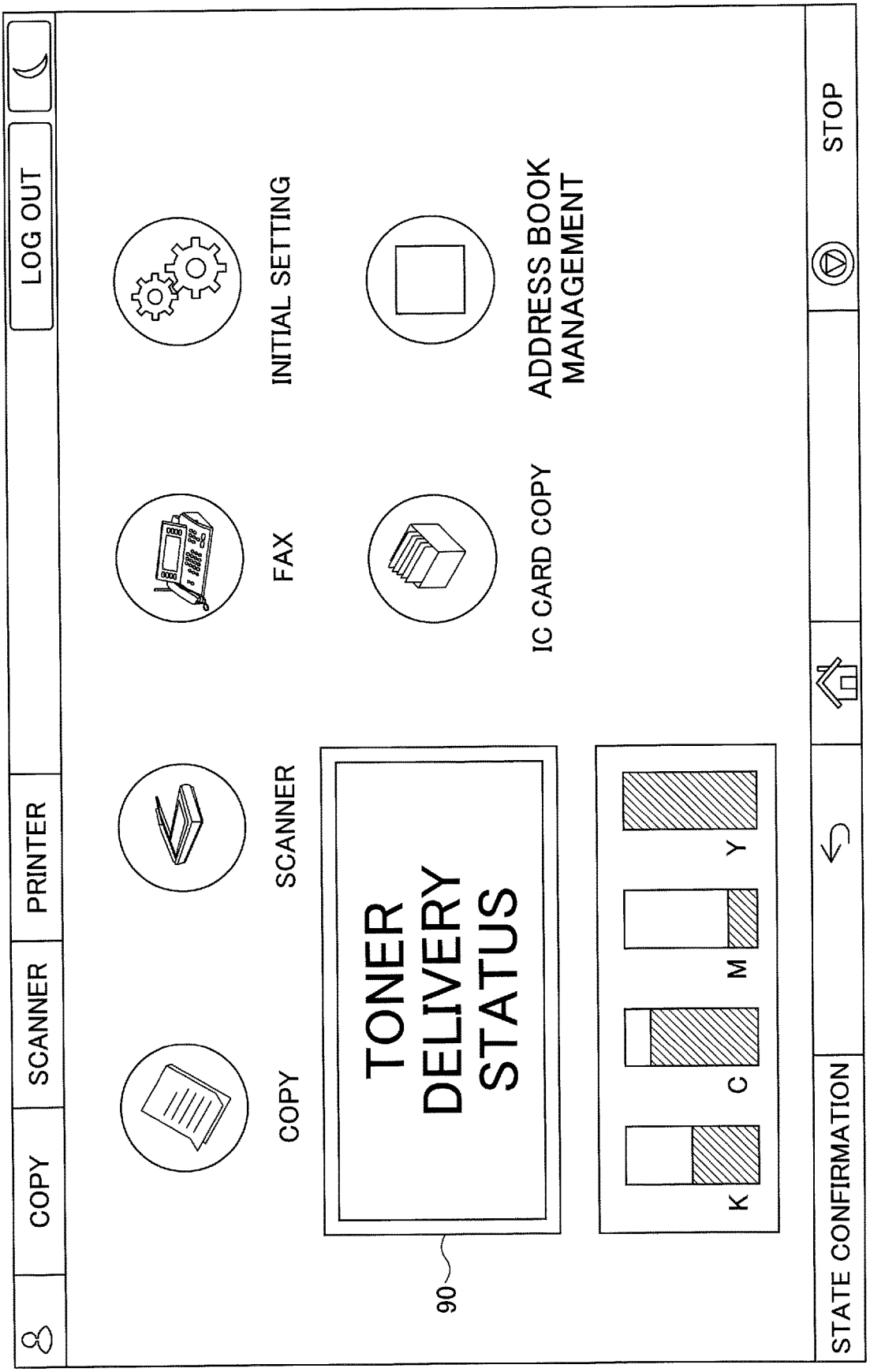
Figure 1C:
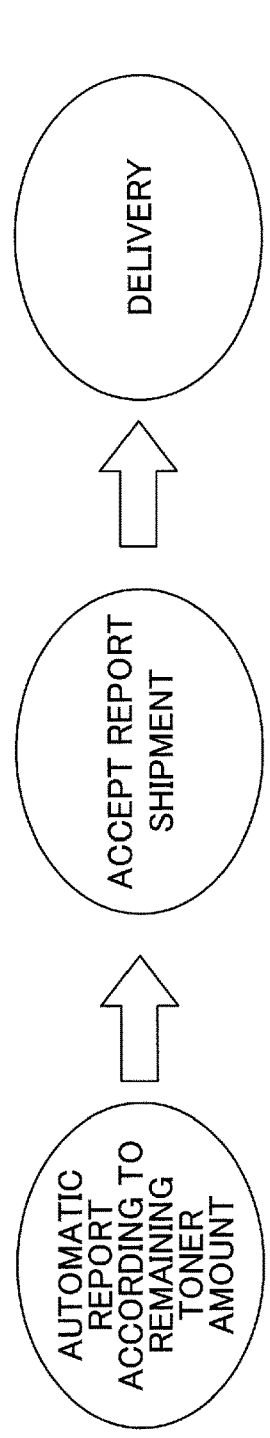

FIGS. 1A to 1C are diagrams illustrating an example of information (content to be described later) provided by the information providing system according to the present embodiment. FIG. 1A illustrates a home screen 401 in a state where the viewer has logged in. The home screen 401 is a screen on which icons of various applications are displayed in a selectable manner. On the home screen 401, an information display icon 90 referred to as a widget is arranged. The information display icon 90 displays the content of an event and characters for guiding the display of the content, and notifies that an information distribution apparatus 70 is preparing some kind of content.

(1) When an image forming apparatus 80 has made a contract for the consumable item automatic delivery service When the viewer presses the information display icon 90, the image forming apparatus 80 displays a consumable item delivery status content 402 illustrated in FIG. 1B. The consumable item delivery status content 402 displays the present delivery status of the consumable item as the content. The viewer can recognize what kind of delivery status the consumable item is in.

(2) When the image forming apparatus 80 has not made a contract for the consumable item automatic delivery service When the viewer presses the information display icon 90, the image forming apparatus 80 displays a consumable item delivery promotion content 403 illustrated in FIG. 1C. The consumable item delivery promotion content 403 is content for prompting the viewer to make a contract for the consumable item automatic delivery service. Since the viewer will consider making a contract for the consumable item automatic delivery service, the manufacturer of the image forming apparatus 80 can increase the number of contracts for the consumable item automatic delivery service.

As described above, the information distribution system according to the present embodiment can change the content to be distributed, according to the contract state for the consumable item automatic delivery service, so that the possibility of erroneous recognition by the viewer can be reduced.

<Terms>

The information may be any information that is useful for the viewer. The information may contain information that the manufacturer (including the provider) of the electronic device can benefit by having the information viewed by the viewer. In the present embodiment, the information will be described by using the term "content".

Furthermore, the distribution of information may include other aspects such as sending information, providing information, transmitting information, and displaying information, etc.

Furthermore, a service contract means that the customer of the electronic device and the manufacturer of the electronic device have agreed on the service. Contract information is information on the contents of this contract. Also, service refers to some useful hospitality for the customer of the electronic device. For example, there are a service for remotely monitoring an electronic device (remote monitoring service) and a service for a delivery company to automatically deliver consumable items (consumable item automatic delivery service).

<System Configuration Example—First Embodiment>

Figure 2:
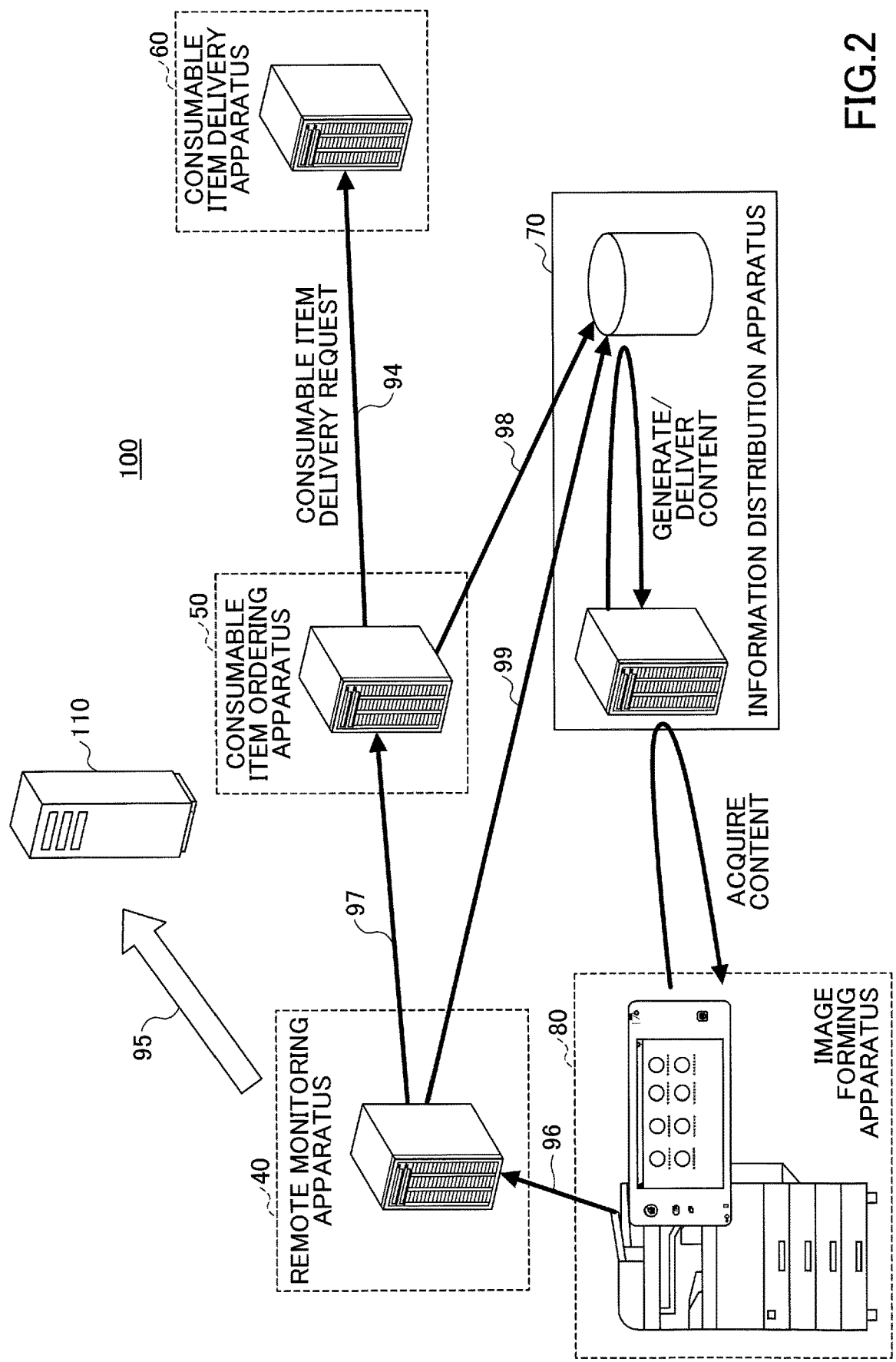
FIG. 2 is an example of a schematic overall configuration diagram of the information distribution system according to the first embodiment of the present invention.

FIG. 2 is an example of a schematic overall configuration diagram of the information distribution system 100. The information distribution system 100 includes the image forming apparatus 80, a remote monitoring apparatus 40 that monitors the image forming apparatus 80, a consumable item ordering apparatus 50 that receives a consumable item ordering request from the remote monitoring apparatus 40, a consumable item delivery apparatus 60 that receives the consumable item ordering request from the consumable item ordering apparatus 50, and the information distribution apparatus 70 that provides the content to the image forming apparatus 80. Furthermore, the remote monitoring apparatus 40 is connected to a sales company server 110 operated by a sales company that is a wholesaler or a retailer of the consumable items. The following description is given assuming that the sales company server 110 is not included in the information distribution system 100.

Note that it is assumed that elements in the information distribution system 100 are communicably connected to each other over a network. The network is constructed by a Local Area Network (LAN) of a facility where the image forming apparatus 80 is arranged, a provider network of the provider connecting the LAN to the Internet, and a line provided by a line operator, etc. When the network has multiple LANs, the network is referred to as Wide Area Network (WAN) or the Internet, etc. The network may be constructed by either wired or wireless lines, or may be constructed by a combination of wired and wireless lines. Furthermore, when the image forming apparatus 80 has a circuit switching type communication apparatus such as third generation (3G) or Long-Term Evolution (LTE), the image forming apparatus 80 can connect to the Internet via a line of a line operator. Note that the Internet is a network that connects computers on a global scale, in which networks around the world are interconnected.

The remote monitoring apparatus 40 is an information processing apparatus that receives device information (to be described later) from the image forming apparatus 80 and transmits consumable item ordering information 97 to the consumable item ordering apparatus 50 according to the contract information, when a consumable item runs short (out of stock). Furthermore, the remote monitoring apparatus 40 transmits the remaining amount of consumable items to the sales company server 110 according to the contract information. Furthermore, the remote monitoring apparatus 40 monitors whether the image forming apparatus 80 is operating normally.

Furthermore, the remote monitoring apparatus 40 periodically transmits contract information 99 related to the contract of the service to which the image forming apparatus 80 is subscribed, to the information distribution apparatus 70. Accordingly, the information distribution apparatus 70 can generate content corresponding to the contract information 99.

The service includes a remote monitoring service and an automatic delivery service. However, in the present embodiment, it is assumed that the customer of the image forming apparatus 80 has already subscribed to the remote monitoring service. However, even if the image forming apparatus 80 is not subscribed to the remote monitoring service, the image forming apparatus 80 can execute an information distribution application to be described later. Furthermore, the automatic delivery service includes a delivery service by the consumable item delivery apparatus 60 and a delivery service by the sales company. The former is referred to as "consumable item automatic delivery", and the latter is referred to as "consumable item remaining amount information provision".

The consumable item ordering apparatus 50 is an information processing apparatus that manages the ordering of consumable items to the delivery of consumable items, and is an information processing apparatus that transmits a consumable item delivery request 94 to the consumable item delivery apparatus 60 based on the consumable item ordering information 97. After sending the delivery request for consumable items, the consumable item ordering apparatus 50 manages the delivery status up to the completion of delivery, and performs a charging process, etc., for the customer after delivery (the timing of charging varies depending on the contract, and there are cases where no fees are charged).

Furthermore, the consumable item ordering apparatus 50 periodically transmits a consumable item delivery status 98 to the information distribution apparatus 70. Since the delivery status is included in the consumable item delivery status 98, the information distribution apparatus 70 can generate the consumable item delivery status content 402.

The consumable item delivery apparatus 60 is an information processing apparatus that manages the delivery of consumable items. The consumable item delivery apparatus 60 accepts the input of the delivery result by the deliveryman of the consumable item and transmits the delivery status to the consumable item ordering apparatus 50. The deliveryman carries a terminal, and inputs information identifying the consumable item that has been delivered. The terminal wirelessly transmits the delivery status to the consumable item delivery apparatus 60. Alternatively, a deliveryman may manually input the information from a terminal wired to the consumable item delivery apparatus 60.

The information distribution apparatus 70 generates content according to the contract information and distributes the content in response to a request from the image forming apparatus 80. Content is generated at the requested timing. However, the content may be generated at a fixed timing such as twice a day, for example. Accordingly, when the image forming apparatus 80 requests content, the content can be promptly acquired.

The image forming apparatus 80 is an example of an electronic device that forms and outputs an image on a print medium such as paper. The image forming apparatus 80 includes an operation panel (including a display device such as a display) described later, and displays the content on the operation panel. As long as the electronic device includes a display device, the electronic device may be a projector, an electronic blackboard, a video conference terminal, a car navigation device, and a digital camera, etc., other than the image forming apparatus 80. Furthermore, the image forming apparatus 80 may be referred to as a printer, a copier, a copying machine, a multi-function peripheral (MFP), a scanner, and a facsimile machine, etc.

An application (hereinafter referred to as a "device information report application") for providing the function of transmitting device information 96 (described later) to the remote monitoring apparatus 40, is installed in advance in the image forming apparatus 80 (a main body 10 described later). Furthermore, an application for providing a function for requesting the content to the information distribution apparatus 70 and for providing a function for displaying the content (hereinafter referred to as "information distribution application"), is installed in advance in the image forming apparatus 80 (an operation unit 20 described later).

The sales company server 110 is an information processing apparatus that receives a remaining amount 95 of a consumable item from the remote monitoring apparatus 40. The remote monitoring apparatus 40 refers to the contract information 99 and transmits the remaining amount 95 of the consumable item to the sales company server 110, when the customer has made a contract for consumable item remaining amount information provision. Furthermore, when the customer has made a contract for the consumable item automatic delivery, the remote monitoring apparatus 40 transmits the consumable item ordering information 97 to the consumable item ordering apparatus 50 according to the toner remaining amount in the device information. Since the sales company server 110 does not communicate with the information distribution apparatus 70, the delivery status of consumable items managed by the sales company server 110 is not provided to the information distribution apparatus 70.

The remote monitoring apparatus 40, the consumable item ordering apparatus 50, the consumable item delivery apparatus 60, and the information distribution apparatus 70 may all be referred to as servers in some cases. Since the remote monitoring apparatus 40, the consumable item ordering apparatus 50, the consumable item delivery apparatus 60, and the information distribution apparatus 70 are formed of one or more servers, these are referred to as a server system.

<Delivery Route of Consumable Items—First Embodiment>

Note that in the present embodiment, consumable items are delivered by the following two routes.

Route 1: remote monitoring apparatus 40→consumable item ordering apparatus 50→consumable item delivery apparatus 60→customer Route 2: remote monitoring apparatus 40→sales company server 110→customer The image forming apparatus 80 according to the present embodiment has made a contract for the remote monitoring service. Therefore, the image forming apparatus 80 transmits the device information 96 to the remote monitoring apparatus 40.

There is a case where the image forming apparatus 80 of route 1 has made a contract for consumable item automatic delivery (automatic delivery service) and a case where the image forming apparatus 80 of route 1 has not made a contract for consumable item automatic delivery (automatic delivery service). Furthermore, there is a case where the image forming apparatus 80 of route 2 has made a contract for providing the consumable item remaining amount to the sales company server 110 (consumable item remaining amount information provision), and a case where the image forming apparatus 80 of route 2 has not made a contract for providing the consumable item remaining amount to the sales company server 110 (consumable item remaining amount information provision). In a case where the image forming apparatus 80 has made a contract for consumable item remaining amount information provision, it is considered that the sales company automatically delivers consumable items (although not necessarily so).

In a case where the viewer of the image forming apparatus 80 of route 1 has not made a contract for consumable item automatic delivery, the information distribution apparatus 70 is to deliver an advertisement or a notification of the automatic delivery service. In a case where the viewer of the image forming apparatus 80 of route 1 has made a contract for consumable item automatic delivery, the information distribution apparatus 70 is not to deliver an advertisement or a notification of the automatic delivery service. In this case, instead of delivering an advertisement or a notification of the automatic delivery service, the information distribution system 100 may provide the delivery status.

Furthermore, when the viewer of the image forming apparatus 80 of route 2 has not made a contract for consumable item remaining amount information provision, the information distribution apparatus 70 is to deliver an advertisement of the automatic delivery service. However, when the viewer of the image forming apparatus 80 of route 2 has made a contract for consumable item remaining amount information provision, the information distribution apparatus 70 is not to deliver an advertisement of the automatic delivery service. In this case, the delivery status cannot be provided because the delivery status is unknown to the information distribution apparatus 70.

The information distribution service according to the present embodiment provides appropriate contents to each image forming apparatus 80 in consideration of such a contract state.

<Example of Hardware Configuration—First Embodiment>

Figure 3:
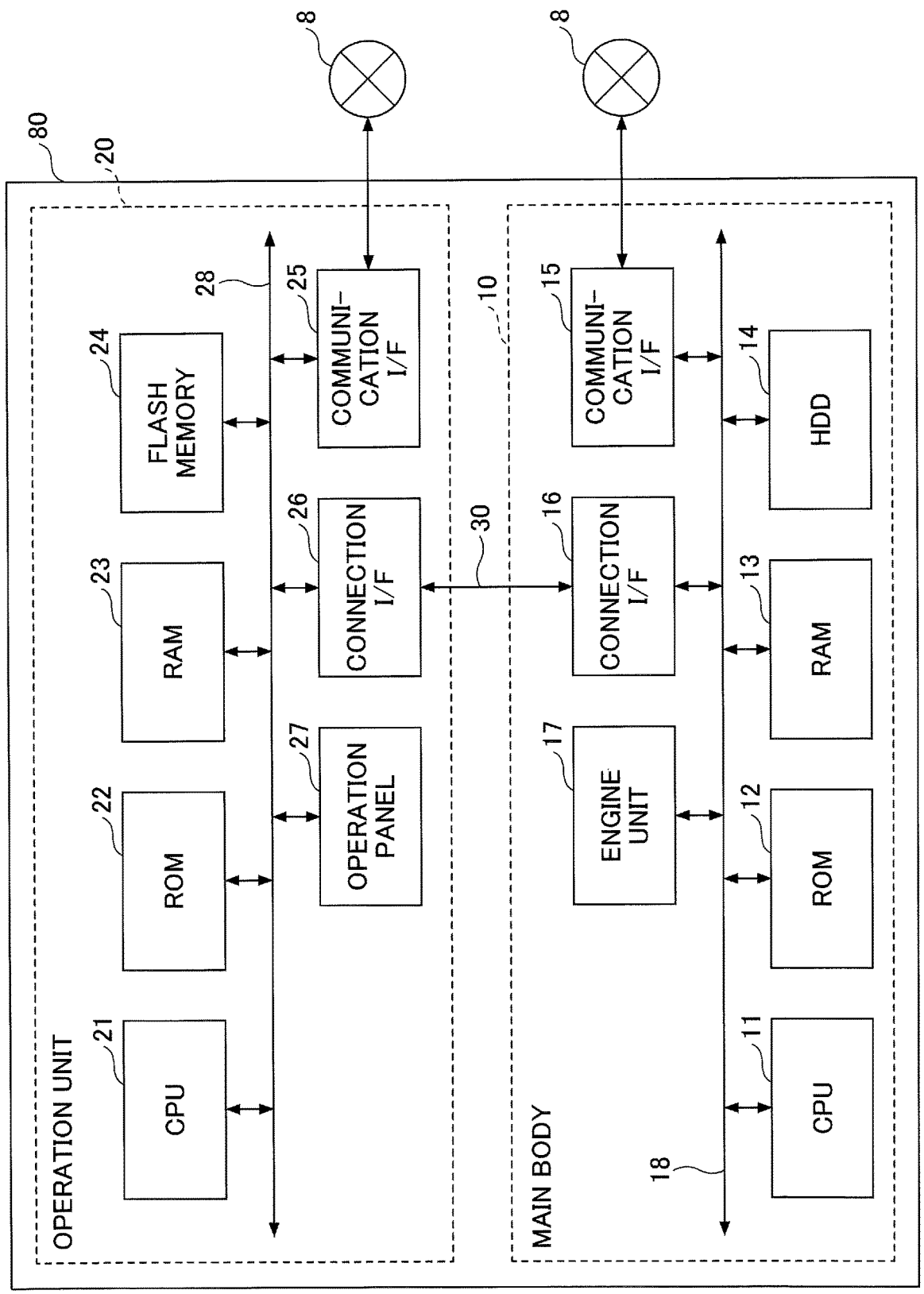
FIG. 3 is an example of a hardware block diagram of an image forming apparatus according to the first embodiment of the present invention.

FIG. 3 is an example of a hardware block diagram of the image forming apparatus 80. As illustrated in FIG. 3, the image forming apparatus 80 includes the main body 10 and the operation unit 20. The main body 10 and the operation unit 20 are communicatively connected to each other via an exclusive-use communication path 30. As the communication path 30, for example, a communication path of a Universal Serial Bus (USB) standard can be used; however, the communication path may be of any standard regardless of whether the communication path is wired or wireless.

Note that the main body 10 can perform an operation corresponding to the operation accepted by the operation unit 20. Furthermore, the main body 10 can also communicate with an external device such as a client personal computer (PC), and can perform an operation according to an instruction received from the external device.

Next, the hardware configuration of the main body 10 will be described. As illustrated in FIG. 3, the main body 10 includes a Central Processing Unit (CPU) 11, a Read-Only Memory (ROM) 12, a Random Access Memory (RAM) 13, a Hard Disk Drive (HDD) 14, a communication interface (I/F) 15, a connection I/F 16, and an engine unit 17, which are interconnected via a system bus 18. As a matter of convenience of description, in FIG. 3, the main body 10 includes the HDD 14 as an example. However, for example, there may be a configuration that does not include the HDD 14 and cannot ensure a sufficient storage area.

The CPU 11 comprehensively controls the operation of the main body 10. The CPU 11 executes programs stored in the ROM 12 or the HDD 14, etc., with the RAM 13 functioning as a work area, to control the overall operation of the main body 10 and to implement various functions such as a copy function, a scanner function, a facsimile function, and a printer function, etc., described above.

The communication I/F 15 is an interface for connecting to a network 8. The connection I/F 16 is an interface for communicating with the operation unit 20 via the communication path 30.

The engine unit 17 is hardware for performing general-purpose information processing and processing other than communication for implementing a copy function, a scanner function, a facsimile function, and a printer function. For example, the engine unit 17 includes a scanner (image reading unit) that scans and reads an image of a document, a plotter (image forming unit) that performs printing on a sheet material such as paper, and a fax unit that performs fax communication, etc. Furthermore, it is possible to provide specific options such as a finisher for sorting printed sheet materials and an automatic document feeder (ADF) for automatically feeding original documents.

Next, the hardware configuration of the operation unit 20 will be described. As illustrated in FIG. 3, the operation unit 20 includes a CPU 21, a ROM 22, a RAM 23, a flash memory 24, a communication I/F 25, a connection I/F 26, and an operation panel 27, which are interconnected via a system bus 28. As a matter of convenience of description, in FIG. 3, the operation unit 20 includes the flash memory 24 as an example. However, there may be a configuration without the flash memory 24, for example. In short, the image forming apparatus 80 may not have a storage device for storing the received contents.

<<Remote Monitoring Apparatus 40, Consumable Item Ordering Apparatus 50, Consumable Item Delivery Apparatus 60, Information Distribution Apparatus 70—First Embodiment>>

Figure 4:
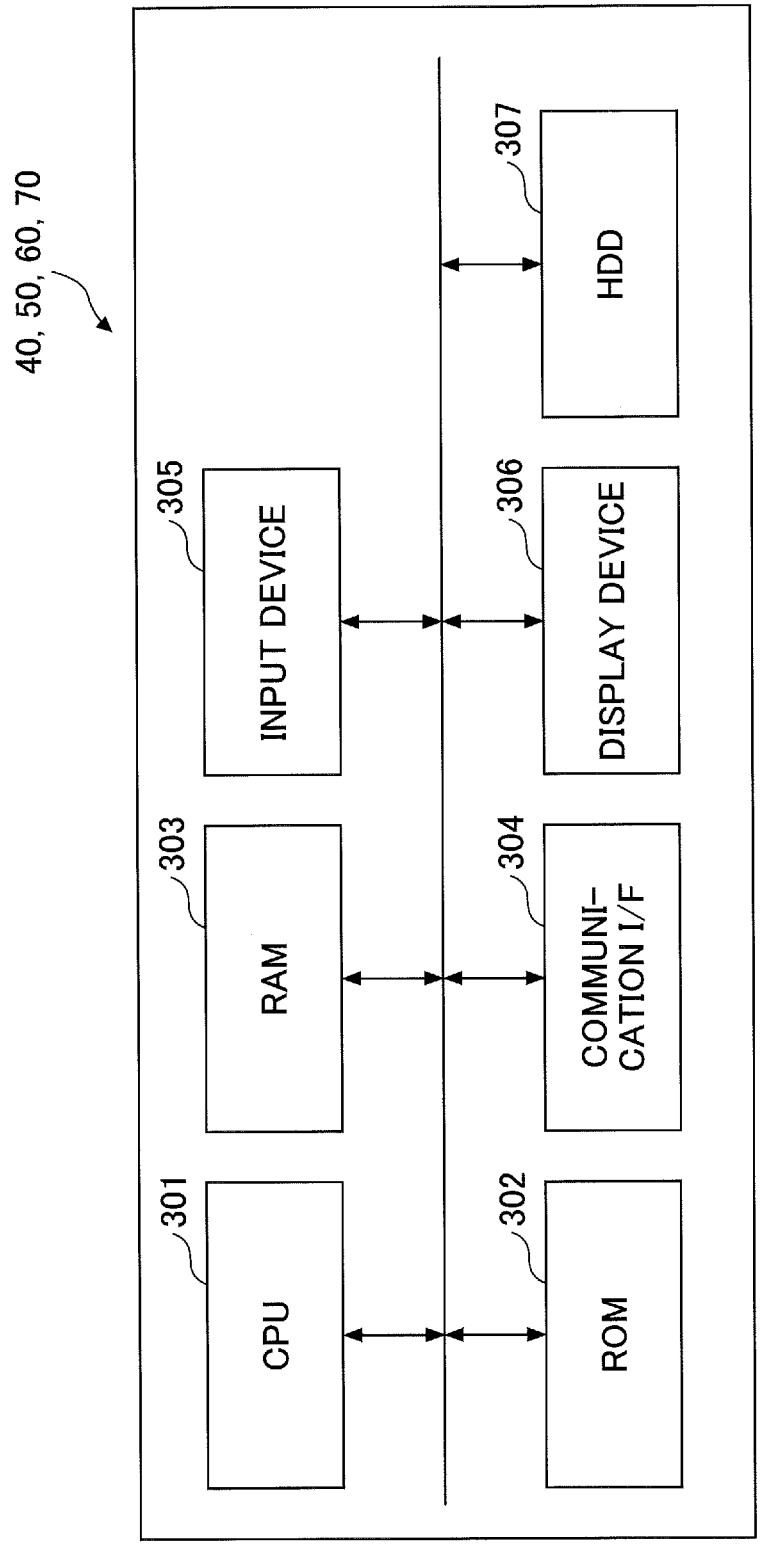
FIG. 4 is an example of a hardware block diagram of a remote monitoring apparatus, a consumable item ordering apparatus, a consumable item delivery apparatus, or an information distribution apparatus according to the first embodiment of the present invention.

FIG. 4 is an example of a hardware block diagram of the remote monitoring apparatus 40, the consumable item ordering apparatus 50, the consumable item delivery apparatus 60, or the information distribution apparatus 70. Here, a description will be given with regard to the remote monitoring apparatus 40. The remote monitoring apparatus 40 includes a CPU 301, a ROM 302, a RAM 303, a communication I/F 304, an input device 305, a display device 306, and a HDD 307. The CPU 301 comprehensively controls the operations of the remote monitoring apparatus 40. The ROM 302 is a non-volatile memory that stores various kinds of data such as programs. The RAM 303 is a volatile memory that functions as a work area of various processes executed by the CPU 301. The communication I/F 304 is an interface for connecting to the network 8. The input device 305 is a device used for inputting operations by the user, and is formed of, for example, a mouse and a keyboard, etc. The display device 306 is a device for displaying various types of information, such as a liquid crystal display device, etc.

The hardware configuration of the consumable item ordering apparatus 50, the consumable item delivery apparatus 60, and the information distribution apparatus 70 may be the same as or different from that of the remote monitoring apparatus 40; either way, there is no problem in describing the present embodiment.

Note that it is preferable that the remote monitoring apparatus 40, the consumable item ordering apparatus 50, the consumable item delivery apparatus 60, or the information distribution apparatus 70 is compatible with cloud computing. Cloud computing is a usage form of a computer in which resources on a network are utilized without being conscious of specific hardware resources.

The illustrated hardware configuration does not need to be housed in a single housing or provided as a unitary device, but rather represents hardware elements that are preferably provided in the remote monitoring apparatus 40. Furthermore, in order to be compatible with cloud computing, the physical configuration of the remote monitoring apparatus 40 according to the present embodiment need not be fixed; hardware resources may be dynamically connected/disconnected according to the load.

<Software Configuration—First Embodiment>

Figure 5:
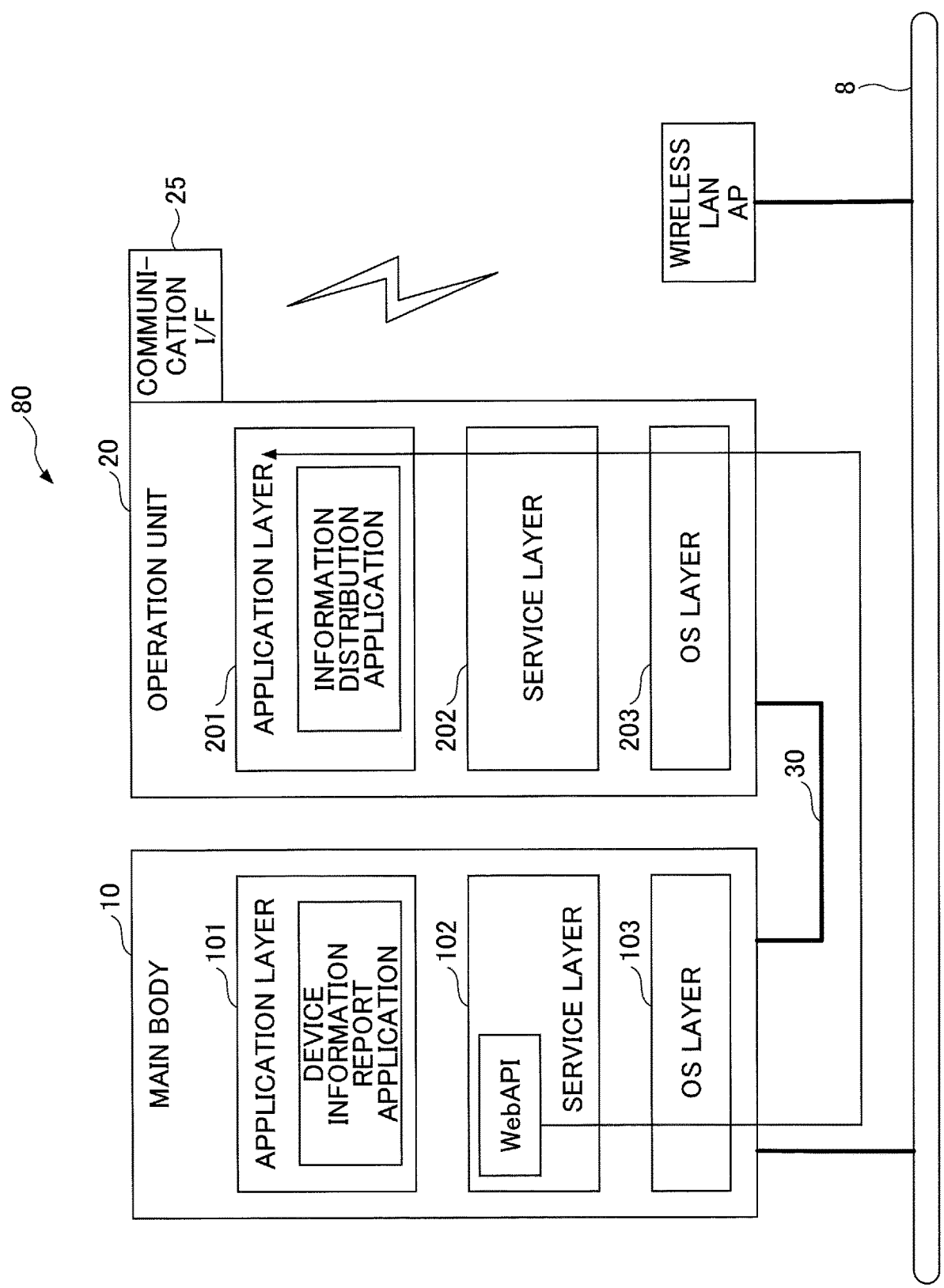
FIG. 5 is a schematic diagram illustrating an example of a software configuration of the image forming apparatus according to the first embodiment of the present invention.

FIG. 5 is a schematic diagram illustrating an example of a software configuration of the image forming apparatus 80. As illustrated in FIG. 5, the main body 10 includes an application layer 101, a service layer 102, and an Operating System (OS) layer 103. The entities of the application layer 101, the service layer 102, and the OS layer 103 are various kinds of software stored in the ROM 12 and the HDD 14, etc. Various functions are provided as the CPU 11 executes these software items.

The software of the application layer 101 is application software (in the following description, simply referred to as "application") for operating a hardware resource to provide a predetermined function.

Examples of the application include a copy application for providing a copy function, a scanner application for providing a scanner function, a fax application for providing a fax function, a printer application for providing a printer function, and a device information notification application, etc.

The software of the service layer 102 is interposed between the application layer 101 and the OS layer 103, and the service layer 102 is software for providing an interface for using the hardware resources of the main body 10, to the applications. More specifically, the service layer 102 is software for providing functions to accept operation requests for hardware resources and to arbitrate operation requests. As an operation request accepted by the service layer 102, there may be a request such as reading by a scanner or printing by a plotter.

Note that the interface function of the service layer 102 is provided not only to the application layer 101 of the main body 10, but also to an application layer 201 of the operation unit 20. That is, the application layer 201 (application) of the operation unit 20 can also implement the function of using the hardware resources (for example, the engine unit 17) of the main body 10 via the interface function of the service layer 102. For example, the interface function of the service layer 102 is provided by a Web Application Programming Interface (API). The operation unit 20 and the main body 10 can communicate by using the communication path 30 as a network.

The software of the OS layer 103 is basic software (operating system (OS)) for providing basic functions for controlling the hardware of the main body 10. The software of the service layer 102 converts usage requests for hardware resources from various applications, into commands interpretable by the OS layer 103, and transfers the commands to the OS layer 103. Then, as the command is executed by the software of the OS layer 103, the hardware resource performs the operation according to the request of the application.

Similarly, the operation unit 20 includes the application layer 201, a service layer 202, and an OS layer 203. The application layer 201, the service layer 202, and the OS layer 203 included in the operation unit 20 have a hierarchical structure similar to that of the main body 10. However, the functions provided by the applications of the application layer 201 and the types of operation requests that can be accepted by the service layer 202 are different from those of the main body 10. The application of the application layer 201 may be software for operating hardware resources of the operation unit 20 to provide a predetermined function; however, the application of the application layer 201 is software for mainly providing a function of a user interface (UI) (a UI function of a copier, a UI function of a scanner, a UI function of a facsimile, a UI function of a printer, and an initial setting UI function, etc.) and a browser function for performing operations and displaying information relating to functions of the main body 10 (a copy function, a scanner function, a fax function, a printer function and an initial setting function). Here, the application of the application layer 201 includes an information distribution application, etc.

Note that, in the present embodiment, the software of the OS layer 103 on the main body 10 side and the software of the OS layer 203 on the operation unit 20 side are different from each other in order to maintain the functional independence. That is, the main unit 10 and the operation unit 20 operate independently from each other by separate operating systems. For example, it is also possible to use Net Berkeley Software Distribution (BSD) (registered trademark) as the software of the OS layer 103 on the main body 10 side, and use Android (registered trademark) as the software of the OS layer 203 on the operation unit 20 side.

As described above, in the image forming apparatus 80 according to the present embodiment, since the main body 10 and the operation unit 20 operate with different operating systems, the communication between the main body 10 and the operation unit 20 is performed as communication between different devices, instead of by inter-process communication within a common device. This communication corresponds to an operation (command communication) of transmitting the information (instruction content from the viewer) accepted by the operation unit 20 to the main body 10, and an operation of reporting an event from the main unit 10 to the operation unit 20, etc. Here, the operation unit 20 can use the functions of the main body 10 by performing command communication to the main body 10. Examples of an event reported from the main body 10 to the operation unit 20 include the execution status of an operation in the main body 10, and the contents set on the main body 10 side, etc.

Furthermore, in the present embodiment, since power is supplied to the operation unit 20 from the main body 10 via the communication path 30, power control of the operation unit 20 can be performed separately (independently) from power control of the main body 10.

<Functions—First Embodiment>

Figure 6:
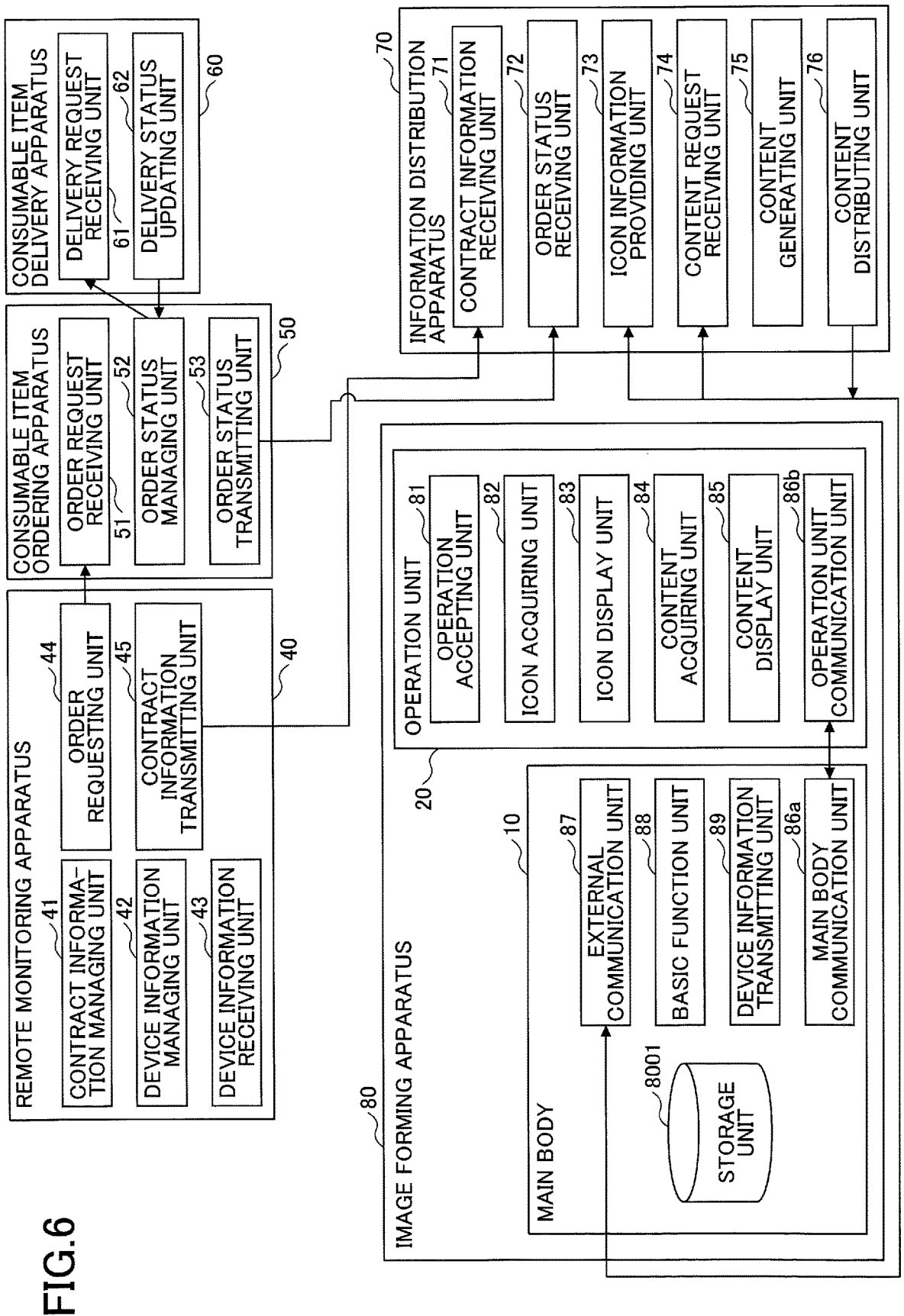
FIG. 6 is an example of a functional block diagram of the image forming apparatus, the remote monitoring apparatus, the consumable item ordering apparatus, the consumable item delivery apparatus, and the information distribution apparatus included in the information distribution system according to the first embodiment of the present invention.

Next, with reference to FIG. 6, functions of each apparatus in the information distribution system 100 will be described. FIG. 6 is an example of a functional block diagram of the image forming apparatus 80, the remote monitoring apparatus 40, the consumable item ordering apparatus 50, the consumable item delivery apparatus 60, and the information distribution apparatus 70 included in the information distribution system 100.

<<Image Forming Apparatus 80—First Embodiment>>

The image forming apparatus 80 includes the main body 10 and the operation unit 20, and the main body 10 includes an external communication unit 87, a basic function unit 88, a device information transmitting unit 89, and a main body communication unit 86a. Each of these functional units of the main body 10 is a function or a means implemented as any one of the elements illustrated in FIG. 3 operate according to an instruction from the CPU 11 in accordance with a program loaded in the RAM 13 from the HDD 14. This program is distributed from a server used for program distribution, or is distributed in a state of being stored in a storage medium.

The operation unit 20 includes an operation accepting unit 81, an icon acquiring unit 82, an icon display unit 83, a content acquiring unit 84, a content display unit 85, and an operation unit communication unit 86b. Each of these functional units of the operation unit 20 is a function or a means implemented as any one of the elements illustrated in FIG. 3 operate according to an instruction from the CPU 21 in accordance with a program loaded in the RAM 23 from the flash memory 24. This program is distributed from a server used for program distribution, or is distributed in a state of being stored in a storage medium.

The external communication unit 87 is implemented as the CPU 11 illustrated in FIG. 3 executes a program and controls the communication I/F 15, etc. The external communication unit 87 exchanges various data via the network 8.

The basic function unit 88 is implemented as the CPU 11 illustrated in FIG. 3 executes a program and controls the engine unit 17. The basic function unit 88 provides the basic functions of the image forming apparatus 80. That is, the basic function unit 88 provides functions of printing, scanning, and facsimile transmission/reception, etc.

The device information transmitting unit 89 is implemented as the CPU 11 illustrated in FIG. 3 executes a program, etc. The device information transmitting unit 89 transmits device information to the remote monitoring apparatus 40 via the external communication unit 87. Device information is described with reference to Table 1.

The main body communication unit 86a is implemented as the CPU 11 illustrated in FIG. 3 executes a program and controls the connection I/F 16, etc. The main body communication unit 86a exchanges various data with the operation unit 20.

A storage unit 8001 included in the main body 10 is a storage means implemented by the HDD 14 in FIG. 3. The information display icon 90 and content are stored in the storage unit 8001.

The operation accepting unit 81 is implemented as the CPU 21 illustrated in FIG. 3 executes a program and controls the operation panel 27, etc. The operation accepting unit 81 accepts various operations from the viewer.

The icon acquiring unit 82 is implemented as the CPU 21 illustrated in FIG. 3 executes a program, etc. The icon acquiring unit 82 acquires the information display icon 90 from the information distribution apparatus 70 via the operation unit communication unit 86b.

The icon display unit 83 is implemented as the CPU 21 illustrated in FIG. 3 executes programs and controls the operation panel 27. The icon display unit 83 displays the information display icon 90 on the operation panel.

The content acquiring unit 84 is implemented as the CPU 21 illustrated in FIG. 3 executes a program, etc. When the viewer operates the information display icon 90, the content acquiring unit 84 acquires content based on a Uniform Resource Locator (URL) held by the information display icon 90 via the operation unit communication unit 86b.

The content display unit 85 is implemented, for example, as the CPU 21 illustrated in FIG. 3 executes a program to operate the operation panel 27. The content display unit 85 displays the content acquired by the content acquiring unit 84, on the operation panel 27.

The operation unit communication unit 86b is implemented as the CPU 21 illustrated in FIG. 3 executes a program and controls the connection I/F 26, etc. The operation unit communication unit 86b exchanges various kinds of data with the main body 10.

TABLE 1

| MODEL | MACHINE NUMBER | REMAINING TONER AMOUNT | COUNTER INFOR-MATION | WHETHER THERE IS ABNORMALITY |
|---|---|---|---|---|
| 3F55 | 111111 | 0% | 50 | NORMAL |

Table 1 indicates device information in a table form. The device information includes items such as model, machine number, toner remaining amount, counter information, and whether there is abnormality. The model is information for identifying the product name and the product category of the image forming apparatus 80, and the machine number is a manufacturer's serial number of the image forming apparatus 80 in the machine type. Since the image forming apparatus 80 is uniquely identified by a combination of a model and a machine number, the combination of a machine type and a machine number is identification information of the image forming apparatus 80. The remaining toner amount indicates the remaining amount of toner of each color (the color is omitted in the table) expressed in percentages, etc. The counter information is the cumulative print number of how many pages the image forming apparatus 80 has printed in the past. Whether there is abnormality indicates whether there is an abnormality of the image forming apparatus 80 (in a case where there is an abnormality, the content of the abnormality). For example, when the device information having a toner remaining amount less than or equal to a threshold value, is transmitted to the remote monitoring apparatus 40, the remote monitoring apparatus 40 determines to place an order for toner. Alternatively, a predetermined abnormality (referred to as event information) indicating toner end may be transmitted as device information to the remote monitoring apparatus 40.

<<Remote Monitoring Apparatus 40—First Embodiment>>

The remote monitoring apparatus 40 includes a contract information managing unit 41, a device information managing unit 42, a device information receiving unit 43, an order requesting unit 44, and a contract information transmitting unit 45. Each of these functional units of the remote monitoring apparatus 40 is a function or a means implemented as any one of the elements illustrated in FIG. 4 operate according to an instruction from the CPU 301 in accordance with a program loaded in the RAM 303 from the HDD 307. This program is distributed from a server used for program distribution, or is distributed in a state of being stored in a storage medium.

The contract information managing unit 41 is implemented as the CPU 301 illustrated in FIG. 4 executes a program and uses the HDD 307, etc. The contract information managing unit 41 manages the contract information of the image forming apparatus 80. The contract information will be described with reference to Table 2.

The device information managing unit 42 is implemented as the CPU 301 illustrated in FIG. 4 executes a program and uses the HDD 307, etc. The device information managing unit 42 manages the device information transmitted from the image forming apparatus 80.

The device information receiving unit 43 is implemented as the CPU 301 illustrated in FIG. 4 executes a program and controls the communication I/F 304, etc. The device information receiving unit 43 receives the device information from the image forming apparatus 80.

The order requesting unit 44 is implemented as the CPU 301 illustrated in FIG. 4 executes a program and controls the communication I/F 304, etc. The order requesting unit 44 refers to the contract information to determine whether a contract has been made for either consumable item automatic delivery or consumable item remaining amount information provision. When a contract has been made for consumable item remaining amount information provision, the order requesting unit 44 transmits the remaining amount 95 of a consumable item to the sales company server 110. When a contract has been made for consumable item automatic delivery, the order requesting unit 44 transmits the consumable item ordering information 97 to the consumable item ordering apparatus 50 when the consumable item remaining amount is less than or equal to a threshold or according to a toner end event.

The contract information transmitting unit 45 is implemented as the CPU 301 illustrated in FIG. 4 executes a program and controls the communication I/F 304, etc. The contract information transmitting unit 45 periodically transmits the contract information managed by the contract information managing unit 41, to the information distribution apparatus 70.

TABLE 2

| MODEL | MACHINE NUMBER | TARGET OF CONSUMABLE ITEM AUTOMATIC DELIVERY | TARGET OF CONSUMABLE ITEM REMAINING AMOUNT INFORMATION PROVISION | TARGET OF REMOTE MONITORING SERVICE | UPDATE TIME |
|---|---|---|---|---|---|
| 3F55 | 111111 | YES | NO | YES | 2016 Feb. 3 |
| 3F32 | 222222 | NO | NO | YES | 2016 Feb. 4 |

TABLE 2-continued

| MODEL | MACHINE NUMBER | TARGET OF CONSUMABLE ITEM AUTOMATIC DELIVERY | TARGET OF CONSUMABLE ITEM REMAINING AMOUNT INFORMATION PROVISION | TARGET OF REMOTE MONITORING SERVICE | UPDATE TIME |
|---|---|---|---|---|---|
| 3F51 | 333333 | NO | YES | YES | 2016 Feb. 5 |
| 3F11 | 444444 | YES | NO | YES | 2016 Feb. 6 |

Table 2 indicates contract information in a table form. The contract information is a table-like database in which the items of model, machine number, target of consumable item automatic delivery, target of consumable item remaining amount information provision, target of remote monitoring service, and update time are one record. The model and machine number are the same as those in Table 1. The target of consumable item automatic delivery indicates whether or not the image forming apparatus 80 is a target of a contract for the consumable item automatic delivery service. That is, it is set whether a contract has been made for (automatically) ordering a consumable item of the image forming apparatus 80. Target of consumable item remaining amount information provision indicates whether the image forming apparatus 80 is a target of a contract for transmitting the consumable item remaining amount to the sales company server 110. That is, it is set whether a contract has been made to transmit device information to a predetermined information processing apparatus (sales company server 110). Target of remote monitoring service indicates whether the image forming apparatus 80 has subscribed to the remote monitoring service. The update time indicates the time at which the contract information has been last updated, for each record.

As described above, since it is assumed that all of the image forming apparatuses 80 according to the present embodiment have made a contract for the remote monitoring service, target of consumable item remaining amount information provision is a setting of whether the remote monitoring apparatus 40 is to provide the remaining consumable item amount to the sales company server 110.

Since it can be considered that the customer selects only one of the consumable item automatic delivery service or providing the consumable item remaining amount to the sales company server 110, a situation where "YES" and "YES" are set for these items in Table 2 will not occur.

Note that the contract information is input by a person in charge who sells the image forming apparatus 80.

<<Consumable Item Ordering Apparatus 50—First Embodiment>>

The consumable item ordering apparatus 50 includes an order request receiving unit 51, an order status managing unit 52, and an order status transmitting unit 53. Each of these functional units of the consumable item ordering apparatus 50 is a function or a means implemented as any one of the elements illustrated in FIG. 4 operate according to an instruction from the CPU 301 in accordance with a program loaded in the RAM 303 from the HDD 307. This program is distributed from a server used for program distribution, or is distributed in a state of being stored in a storage medium.

The order request receiving unit 51 is implemented as the CPU 301 illustrated in FIG. 4 executes a program and controls the communication I/F 304, etc. The order request receiving unit 51 receives the consumable item ordering information 97 from the remote monitoring apparatus 40.

The order status managing unit 52 is implemented as the CPU 301 illustrated FIG. 4 executes a program and uses the HDD 307, etc. The order status managing unit 52 manages the present consumable item delivery status 98. The consumable item delivery status 98 will be described with reference to Table 3. Upon acquiring a delivery status update request from the consumable item delivery apparatus 60, the order status managing unit 52 updates the delivery status of the consumable item delivery status 98 by applying the update request.

The order status transmitting unit 53 is implemented as the CPU 301 illustrated in FIG. 4 executes a program and controls the communication I/F 304, etc. The order status transmitting unit 53 transmits the consumable item delivery status 98 to the information distribution apparatus 70.

TABLE 3

| MODEL | MACHINE NUMBER | CONSUMABLE ITEM NAME | INQUIRY NUMBER | DELIVERY STATUS | ORDER DATE | SCHEDULED DELIVERY DATE |
|---|---|---|---|---|---|---|
| 3F55 | 111111 | BLACK TONER | 001 | SHIPMENT COMPLETED | 2016 Oct. 25 | 2016 Oct. 27 |
| 3F55 | 111111 | MAGENTA TONER | 002 | SHIPMENT COMPLETED | 2016 Oct. 25 | 2016 Oct. 27 |
| 3F11 | 222222 | BLACK TONER | 003 | NON-DELIVERY | 2016 Sep. 25 | 2016 Sep. 27 |

Table 3 indicates information included in the consumable item delivery status 98 in a table form. The consumable item delivery status 98 includes items such as model, machine number, consumable item name, inquiry number, delivery status, order date, and scheduled delivery date. The model and machine number are the same as those in Table 1. The consumable item name is the name of the ordered consumable item. The inquiry number is information for identifying the order for the consumable item and corresponds to an order number. The delivery status indicates what kind of status the consumable item is in, in the delivery. The delivery status includes shipment completed, non-delivery (absence or refusal of receipt), and delivery completed, etc.

The order date is the date and time when the consumable item ordering apparatus 50 has ordered the consumable item. The scheduled delivery date is the scheduled date for the consumable item to be delivered. The scheduled delivery date is uniquely determined depending on the location of the image forming apparatus 80 and whether there is inventory (stock) of consumable items.

As an example, the consumable item delivery statuses are collectively transmitted, once a day, to the information distribution apparatus 70 by the consumable item ordering apparatus 50. After the transmission, the consumable item ordering apparatus 50 transmits the consumable item delivery status to the information distribution apparatus 70 at timings when the delivery status changes.

<<Consumable Item Delivery Apparatus 60—First Embodiment>>

The consumable item delivery apparatus 60 includes a delivery request receiving unit 61 and a delivery status updating unit 62. Each of these functional units of the consumable item delivery apparatus 60 is a function or a means implemented as any one of the elements illustrated in FIG. 4 operate according to an instruction from the CPU 301 in accordance with a program loaded in the RAM 303 from the HDD 307. This program is distributed from a server used for program distribution, or is distributed in a state of being stored in a storage medium.

The delivery request receiving unit 61 is implemented as the CPU 301 illustrated in FIG. 4 executes a program and controls the communication I/F 304, etc. The delivery request receiving unit 61 receives a delivery request from the consumable item ordering apparatus 50.

The delivery status updating unit 62 is implemented as the CPU 301 illustrated in FIG. 4 executes a program and controls the communication I/F 304, etc. The delivery status updating unit 62 transmits a request for updating the delivery status to the consumable item ordering apparatus 50. The deliveryman inputs the delivery status to a mobile terminal according to need, and the consumable item delivery apparatus 60 collects the delivery status of consumable items during the delivery from the mobile terminal held by the deliveryman to manage the delivery status in a real-time manner.

TABLE 4

| INQUIRY NUMBER | DELIVERY STATUS | DELIVERY DATE |
|---|---|---|
| 001 | DELIVERY COMPLETED | 2016 Oct. 27 |

Table 4 indicates the request to update the delivery status that is transmitted from the consumable item delivery apparatus 60 to the consumable item ordering apparatus 50 in a table form. The delivery status update request includes items such as inquiry number, delivery status, and delivery date. The inquiry number is the same as that in Table 3. The delivery status is the newest delivery status reported by the deliveryman to the consumable item delivery apparatus 60. The delivery date is the date and time when the consumable item has actually been delivered to the customer. The delivery date can be left blank if the delivery status is updated before delivery. The order status managing unit 52 of the consumable item ordering apparatus 50 can update the consumable item delivery status by using the inquiry number as a key. Further to these items, a scheduled delivery date, etc., may be included.

<<Information Distribution Apparatus 70—First Embodiment>>

The information distribution apparatus 70 includes a contract information receiving unit 71, an order status receiving unit 72, an icon information providing unit 73, a content request receiving unit 74, a content generating unit 75, and a content distributing unit 76. Each of these functional units of the information distribution apparatus 70 is a function or a means implemented as any one of the elements illustrated in FIG. 4 operate according to an instruction from the CPU 301 in accordance with a program loaded in the RAM 303 from the HDD 307. This program is distributed from a server used for program distribution, or is distributed in a state of being stored in a storage medium.

The contract information receiving unit 71 is implemented as the CPU 301 illustrated in FIG. 4 executes a program and controls the communication I/F 304, etc. The contract information receiving unit 71 receives the contract information 99 from the remote monitoring apparatus 40.

The order status receiving unit 72 is implemented as the CPU 301 illustrated in FIG. 4 executes a program and controls the communication I/F 304, etc. The order status receiving unit 72 receives the consumable item delivery status 98 from the consumable item ordering apparatus 50.

The icon information providing unit 73 is implemented as the CPU 301 in FIG. 4 executes a program, etc. The icon information providing unit 73 generates the information display icon 90 based on the contract information and the consumable item delivery status, and provides the information display icon 90 to the image forming apparatus 80. The information display icon 90 includes information such as a URL, etc., in addition to image data of an icon recognized visually. The information display icon 90 will be described with reference to Table 5.

The content request receiving unit 74 is implemented as the CPU 301 illustrated in FIG. 4 executes a program and controls the communication I/F 304, etc. The content request receiving unit 74 receives a distribution request for the content from the image forming apparatus 80.

The content generating unit 75 is implemented as the CPU 301 in FIG. 4 executes a program, etc. The content generating unit 75 generates the content based on the contract information and the consumable item delivery status. Details will be described later.

The content distributing unit 76 is implemented as the CPU 301 illustrated in FIG. 4 executes a program and controls the communication I/F 304, etc. The content distributing unit 76 distributes the content to the image forming apparatus 80 that has requested the content.

TABLE 5

| INFORMATION DISPLAY ICON NAME | INFORMATION DISPLAY IMAGE | MESSAGE | TAP ACCESS URL | INFORMATION DISPLAY ICON CREATION TIME |
|---|---|---|---|---|
| TONER DISTRIBUTION HISTORY | ***.gif | DISPLAY TONER DELIVERY HISTORY | https://sample/index.hrml | 2016 Oct. 25 10:15 |

Table 5 indicates information relating to the information display icon 90 generated by the icon information providing unit 73 in a table form. The information relating to the information display icon 90 includes information display icon name, information display image, message, tap access URL, and information display icon creation time. The information display icon name is the name of the information display icon 90 for the viewer to identify the information display icon 90. The information display image is image data displayed as the information display icon 90. The message is a character string displayed inside the information display icon 90. The tap access URL is address information of a resource accessed by the image forming apparatus 80 when the viewer presses the information display icon 90. The tap access URL may be referred to as a link destination or link information. The information display icon creation time is the time at which the information display icon 90 is generated; since there is a possibility that the image forming apparatus 80 acquires the information display icon 90 several times a day, the information display icon creation time is used to identify the information display icon 90.

Except for the information display icon creation time, the information display icon name, the information display image, the message, and the tap access URL are managed by the information distribution apparatus 70 as static information.

<Operation Procedure—First Embodiment>

Figure 7:
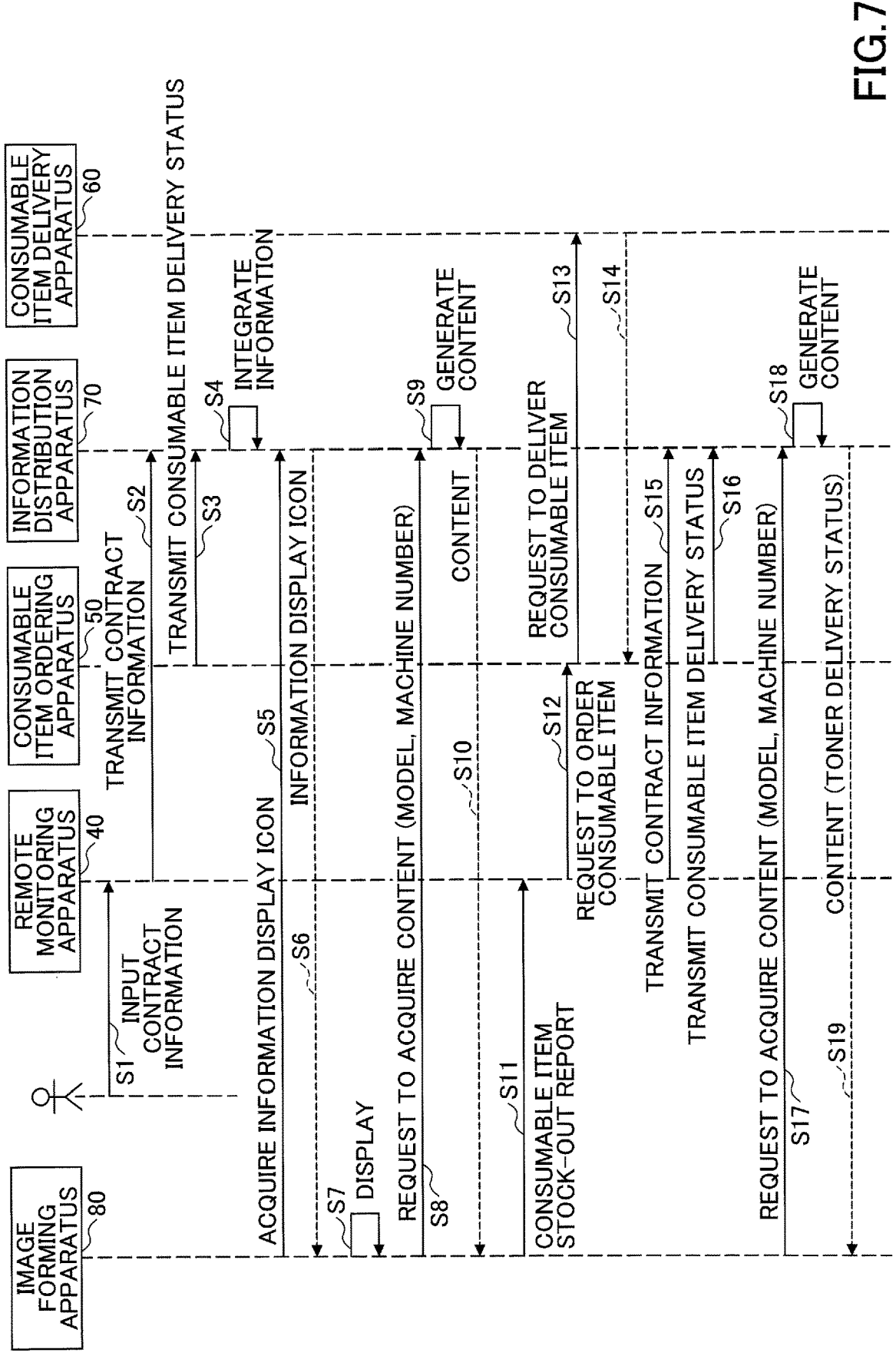
FIG. 7 is an example of a sequence diagram illustrating the overall operation of the information distribution system according to the first embodiment of the present invention.

FIG. 7 is an example of a sequence diagram illustrating the overall operation of the information distribution system 100.

Step S1: The person in charge, who has sold the image forming apparatus 80 to the customer, inputs the contract information to the remote monitoring apparatus 40. The contract information managing unit 41 of the remote monitoring apparatus 40 accepts and holds the contract information.

Step S2: The contract information transmitting unit 45 of the remote monitoring apparatus 40 transmits the contract information to the information distribution apparatus 70 at a fixed timing such as once a day. Alternatively, the contract information may be transmitted in response to a request from the information distribution apparatus 70. The contract information transmitting unit 45 transmits the contract information with respect to a new contract at a fixed timing such as once a day, and also when the content of the contract changes, the contract information transmitting unit 45 transmits the contract information at a fixed timing such as once a day. With respect to a model and a machine number for which the content of the contract has already been transmitted, the contract information is transmitted only for the model and the machine number for which the content of the contract has been changed. That is, only the difference is transmitted.

Step S3: Furthermore, at a predetermined timing or when the delivery status is updated, the order status transmitting unit 53 of the consumable item ordering apparatus 50 transmits the consumable item delivery status to the information distribution apparatus 70. The predetermined timings are fixed times of about twice a day. The order status managing unit 52 of the consumable item ordering apparatus 50 requests the delivery to the consumable item delivery apparatus 60 at the timing when the order is requested from the remote monitoring apparatus 40. Therefore, between the previous transmission timing and the next transmission timing, the consumable item delivery status of a consumable item for which delivery has been requested, is accumulated. Only the newly accumulated consumable item delivery status is transmitted to the information distribution apparatus 70 at fixed times of about twice a day.

Furthermore, when the order status managing unit 52 acquires the delivery status of the consumable item from the consumable item delivery apparatus 60 between the previous transmission timing and the next transmission timing, at the timing at which the delivery status is acquired, the consumable item ordering apparatus 50 transmits the consumable item delivery status to the information distribution apparatus 70. However, the consumable item ordering apparatus 50 may wait for the next timing.

Step S4: The content generating unit 75 of the information distribution apparatus 70 integrates the contract information and the consumable item delivery status, by using the model and the machine number as the key. Accordingly, the contract information and the consumable item delivery status are associated with the model and the machine number.

Step S5: The icon acquiring unit 82 of the image forming apparatus 80 makes a request to the information distribution apparatus 70 for the information display icon 90 at a predetermined timing to be described later.

Step S6: The icon information providing unit 73 of the information distribution apparatus 70 generates the information display icon 90 and transmits the information display icon 90 to the image forming apparatus 80. Details will be described with reference to in FIG. 14. Accordingly, the image forming apparatus 80 can display the information display icon 90 holding the URL. Since the information display icon 90 is a widget (application) as described above, the information display icon 90 can be displayed as the image forming apparatus 80 executes the widget.

Step S7: The icon display unit 83 of the image forming apparatus 80 automatically displays the information display icon 90 as the initial screen on the home screen 401, after the activation of the image forming apparatus 80. Immediately after activation, the image forming apparatus 80 does not have the information display icon 90 (the image forming apparatus 80 has not received the information display icon 90 from the information distribution apparatus 70), and therefore a predetermined message, etc., is displayed (URL is not held). Upon receiving the information on the information display icon 90 in step S6, the icon display unit 83 displays the information display icon 90 based on the received information.

Step S8: The content acquiring unit 84 of the image forming apparatus 80 transmits a content acquisition request to the information distribution apparatus 70 according to an operation by the viewer. In the present embodiment, it is assumed that the content is acquired as the viewer presses the information display icon 90. However, content may be acquired periodically or may be acquired immediately after the activation. The acquisition request includes a model and a machine number. The content acquiring unit 84 communicates with the main body communication unit 86a via the operation unit communication unit 86b and transmits a content acquisition request to the main body 10, and the external communication unit 87 of the main body 10 transmits the content acquisition request to the information distribution apparatus 70.

Step S9: The content generating unit 75 of the information distribution apparatus 70 generates content. In FIG. 7, the content is generated in response to the content acquisition request. Note that the content may be generated in advance at fixed timings such as twice a day. When the image forming apparatus 80, which has requested the content, has made a contract for consumable item automatic delivery, in the state of step S7, the image forming apparatus 80 has not transmitted toner end (because the consumable item is not ordered), and therefore no content is generated. When the image forming apparatus 80, which has requested the content, has made a contract for consumable item remaining amount information provision, the toner delivery status is irrelevant, and therefore a remote monitoring service introduction content 404 is provided. When the image forming apparatus 80 has not made a contract for either the consumable item automatic delivery or the consumable item remaining amount information provision, the consumable item delivery promotion content 403 is provided. Details will be described with reference to FIG. 10.

Step S10: The content distributing unit 76 of the information distribution apparatus 70 transmits the content to the image forming apparatus 80.

Step S11: The device information transmitting unit 89 of the image forming apparatus 80 transmits, to the remote monitoring apparatus 40 via the external communication unit 87, the device information indicating that the remaining toner amount is less than or equal to a threshold value or the device information indicating that the consumable item has run short (out of stock), acquired from the basic function unit 88.

Step S12: The device information receiving unit 43 of the remote monitoring apparatus 40 receives the device information. When it is determined that the consumable item has run short (out of stock) based on the device information, the order requesting unit 44 transmits a consumable item ordering request including a model, a machine number, and a consumable item name (consumable item ID), etc., to the consumable item ordering apparatus 50. Note that the transmission of the remaining amount of the consumable item to the sales company server 110 is omitted.

Step S13: The order request receiving unit 51 of the consumable item ordering apparatus 50 receives the consumable item ordering information 97. The consumable item ordering apparatus 50 preferably immediately transmits a consumable item delivery request to the consumable item delivery apparatus 60. The consumable item delivery request includes a model, a machine number, and a consumable item name (consumable item ID), etc.

Step S14: When the delivery status of the consumable item being delivered changes, the delivery status updating unit 62 of the consumable item delivery apparatus 60 transmits the delivery status to the consumable item ordering apparatus 50 according to need.

Step S15: As described above, the contract information transmitting unit 45 of the remote monitoring apparatus 40 transmits the contract information to the information distribution apparatus 70. By periodically transmitting the contract information in this manner, the information distribution apparatus 70 can generate content according to the newest contract information.

Step S16: As described above, the order status transmitting unit 53 of the consumable item ordering apparatus 50 transmits the consumable item delivery status 98 to the information distribution apparatus 70. As described above, by transmitting the consumable item delivery status 98 periodically or according to need, the information distribution apparatus 70 can generate content according to the newest consumable item delivery status 98.

Step S17: Since the information display icon 90 automatically communicates with the information distribution apparatus 70, a summary of the content is displayed on the information display icon 90. The viewer sees the summary of the content and presses the information display icon 90. The operation accepting unit 81 of the image forming apparatus 80 accepts an operation, and the content acquiring unit 84 transmits a content acquisition request to the information distribution apparatus 70 based on the URL included in the information display icon 90. Details are the same as those of step S5. Note that when the image forming apparatus 80 displays the remote monitoring service introduction content 404 described later, the image forming apparatus 80 accesses a predetermined URL, instead of accessing the information distribution apparatus 70.

Step S18: The content generating unit 75 of the information distribution apparatus 70 generates content. When the contract information indicates that a contract has been made for consumable item automatic delivery, the consumable item delivery status content 402 is generated. When the contract information and the consumable item delivery status are searched according to the model and the machine number received from the image forming apparatus 80, it can be known that the shipment has been completed, and therefore the content generating unit 75 generates the consumable item delivery status content 402 as illustrated in FIG. 11. Furthermore, when the delivery status updating unit 62 changes the delivery status, the content generating unit 75 generates content reflecting the newest delivery status.

Step S19: The content distributing unit 76 transmits the content to the image forming apparatus 80.

<Sorting of Transmitting Consumable Item Ordering Information or Consumable Item Remaining Amount—First Embodiment>

Figure 8:
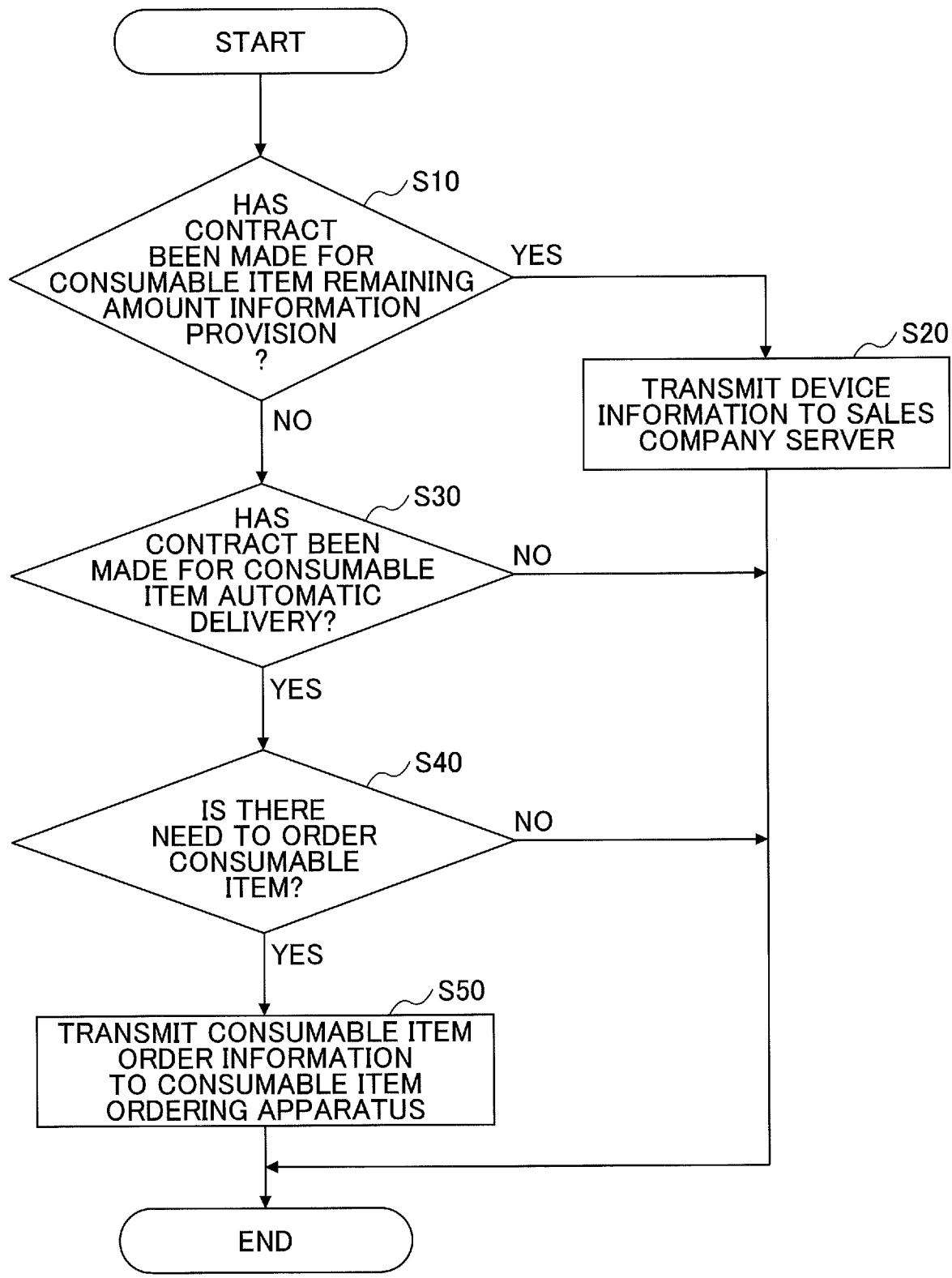
FIG. 8 is an example of a flowchart for describing the operation when the remote monitoring apparatus receives the device information according to the first embodiment of the present invention.

FIG. 8 is an example of a flowchart for describing the operation when the remote monitoring apparatus 40 receives the device information. The process of FIG. 8 starts when device information is received.

The order requesting unit 44 of the remote monitoring apparatus 40 first refers to the contract information based on the model and the machine number, and determines whether the image forming apparatus 80 has made a contract for consumable item remaining amount information provision (step S10).

When the determination in step S10 is YES, the order requesting unit 44 transmits the consumable item remaining amount to the sales company server 110 (step S20).

When the determination in step S10 is NO, the order requesting unit 44 determines whether the image forming apparatus 80 identified by the model and the machine number has made a contract for consumable item automatic delivery, by referring to the contract information (step S30).

When the determination in step S30 is NO, the process is ended. When the determination in step S30 is YES, the order requesting unit 44 determines whether it is necessary to order a consumable item (step S40). That is, when the toner remaining amount in the device information is less than or equal to the threshold value or indicates toner end, the order requesting unit 44 determines to place an order.

When the determination in step S40 is YES, the order requesting unit 44 transmits the consumable item ordering information 97 to the consumable item ordering apparatus 50 (step S50).

In this manner, the remote monitoring apparatus 40 can change (switch) the route of the order for the consumable item according to the contract information.

<Communication Between Operation Unit 20 and Main Body 10—First Embodiment>

Figure 9:
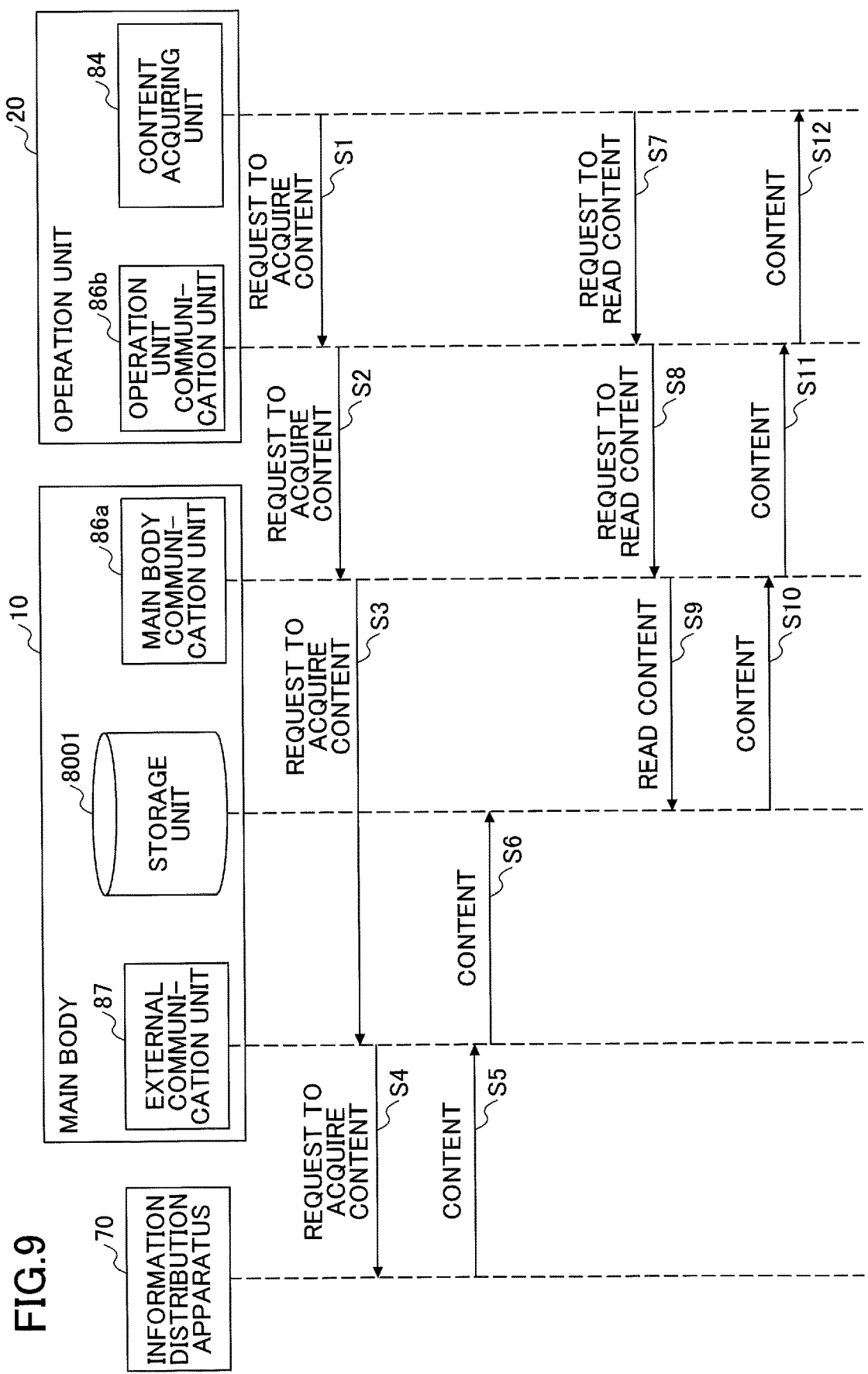
FIG. 9 is an example of a sequence diagram illustrating a procedure for an operation unit to acquire contents via a main body according to the first embodiment of the present invention.

The communication procedure between the operation unit 20 and the main body 10 will be described with reference to FIG. 9. As described above, the operation unit 20 communicates with the main body 10 via the communication path 30, and the operation unit 20 requests the main body 10 to communicate with the outside. FIG. 9 is an example of a sequence diagram illustrating a procedure for the operation unit 20 to acquire contents via the main body 10. The process in FIG. 9 starts when the information display icon 90 is pressed.

Step S1: The content acquiring unit 84 transmits a content acquisition request to the operation unit communication unit 86b.

Step S2: The operation unit communication unit 86b transmits a content acquisition request to the main body communication unit 86a.

Step S3: The main body communication unit 86a transmits a content acquisition request to the external communication unit 87.

Step S4: The external communication unit 87 transmits a content acquisition request to the information distribution apparatus 70.

Step S5: The information distribution apparatus 70 transmits content to the external communication unit 87.

Step S6: The external communication unit 87 stores the content in the storage unit 8001. Thus, when the storage capacity of the storage device of the operation unit 20 is small, the storage device of the main body 10 can be used. Note that the external communication unit 87 determines whether the main body 10 includes the HDD 14 as a storage device, and holds the contents only when the main body 10 includes the HDD 14. Since the storage capacity of the HDD 14 is large, it is possible to hold the content only when there is margin in the storage capacity.

Step S7: After transmitting the content acquisition request, the content acquiring unit 84 monitors whether the content has been stored in the storage unit 8001. Since the operation unit 20 acquires information indicating whether the main body 10 has a storage unit (HDD) at the time of activation, the content acquiring unit 84 inquires the main body 10 only when there is the storage unit 8001. When there is no HDD 14 in the main body 10, the content stored in the RAM 23 of the operation unit 20 is to be read.

Step S8: The operation unit communication unit 86b transmits a content read request to the main body communication unit 86a.

Steps S9 and S10: The main body communication unit 86a reads the content from the storage unit 8001.

Step S11: The main body communication unit 86a transmits the content to the operation unit communication unit 86b.

Step S12: The operation unit communication unit 86b transmits the content to the content acquiring unit 84.

In step S1, the content acquiring unit 84 transmits the content acquisition request; however, the content acquiring unit 84 may read the content in the storage unit 8001 beforehand, and compare the content generation time with the present time, and only after a predetermined time has elapsed, the content acquiring unit 84 may transmit the content acquisition request to the main body 10. Thus, the communication load and the processing load of the information distribution apparatus 70 can be reduced. That is, if the predetermined time has not elapsed, steps S7 to S12 are to be performed.

Note that the sequence in which the information display icon 90 is obtained is also the same. If there is an HDD, the information display icon 90 is stored in the operation unit unless it is stored in the main body. However, the icon and content for the initial screen are stored in the operation unit irrespective of the presence or absence of the HDD.

<Content Generation—First Embodiment>

Figure 10:
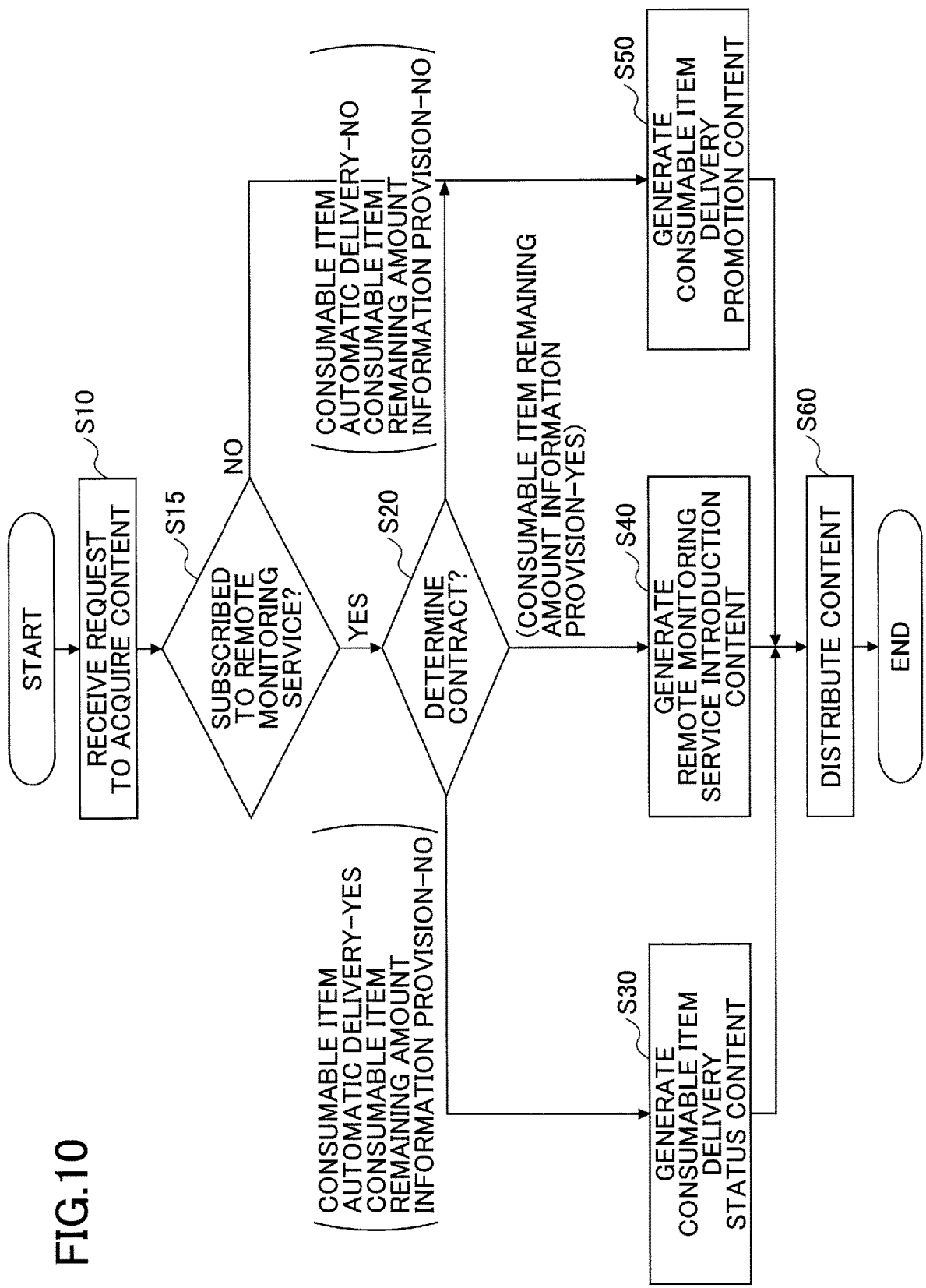
FIG. 10 is an example of a flowchart illustrating a procedure in which a content generating unit generates content according to the first embodiment of the present invention.

FIG. 10 is an example of a flowchart illustrating a procedure in which the content generating unit 75 generates content. The process in FIG. 10 is executed in steps S9 and S18 in FIG. 7.

First, the content request receiving unit 74 receives a content acquisition request together with the model and the machine number (step S10).

The content generating unit 75 refers to the contract information and the consumable item delivery status integrated with the model and the machine number as a key, to determine the contract state (step S15). First, the content generating unit 75 determines whether the image forming apparatus 80 has already subscribed to the remote monitoring service. This is because the information distribution application may be executed and a content acquisition request may be transmitted, even when the image forming apparatus 80 has not subscribed to the remote monitoring service.

The content generating unit 75 refers to the contract information and the consumable item delivery status integrated with the model and the machine number as a key, to determine the contract state (step S20).

A. A case of consumable item automatic delivery: YES and consumable item remaining amount information provision: NO The content generating unit 75 generates the consumable item delivery status content 402 illustrated in FIG. 11 (step S30). In this case, since the customer of the image forming apparatus 80 has made a contract for the consumable item automatic delivery service, the information distribution apparatus 70 can provide the viewer with the delivery status of the consumable item.

B. A case of consumable item remaining amount information provision: YES

Figure 12:
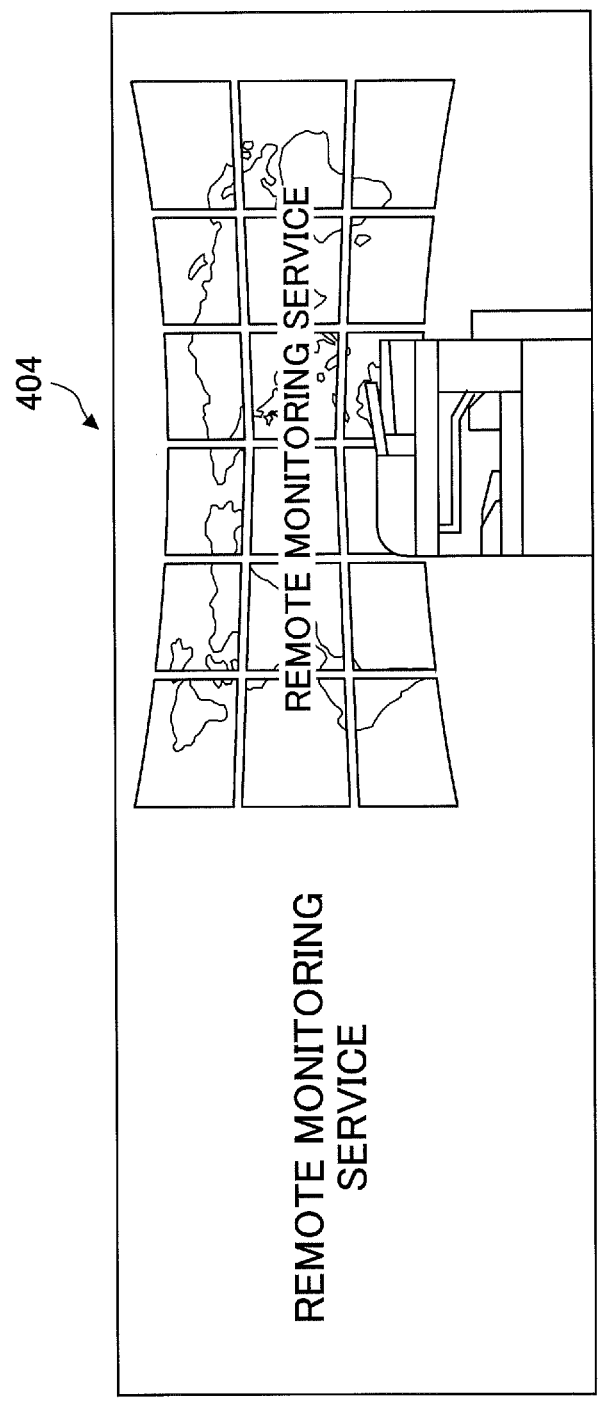
FIG. 12 is a diagram illustrating an example of remote monitoring service introduction content according to the first embodiment of the present invention.

The content generating unit 75 generates the remote monitoring service introduction content 404 illustrated in FIG. 12 (step S40). In this case, since this is a contract in which the customer of the image forming apparatus 80 provides consumable item remaining amount information to the sales company, the information distribution apparatus 70 cannot provide the delivery status. Furthermore, there is a high possibility that the image forming apparatus 80 is receiving the consumable item automatic delivery service from the sales company. Therefore, the information distribution apparatus 70 generates the remote monitoring service introduction content 404. Since the image forming apparatus 80 has already made a contract for the remote monitoring service, when the viewer is the administrator, the administrator has certain knowledge about the remote monitoring service. However, when the viewer is a general user, the viewer may not always have the knowledge of the remote monitoring service. Therefore, by having the information distribution apparatus 70 distribute the remote monitoring service introduction content 404, the remote monitoring service can be introduced to a larger number of users.

C. A case of consumable item automatic delivery: NO and consumable item remaining amount information provision: NO The content generating unit 75 generates the consumable item delivery promotion content 403 illustrated in FIG. 13 (step S50). In this case, since the customer of the image forming apparatus 80 has only made a contract for the remote monitoring service, by introducing the consumable item automatic delivery, usage of the automatic delivery can be promoted.

Upon generating the content, the content distributing unit 76 distributes the content to the image forming apparatus 80 (step S60).

Note that all of the contents are described in Hyper Text Markup Language (HTML), script language, and Cascading Style Sheets (CSS), etc. The content is referred to as a Web page or a Web application. The content may be a still image or a moving image.

<Screen Example of Content—First Embodiment>

FIG. 11 is a diagram illustrating an example of the consumable item delivery status content 402. The consumable item delivery status content 402 has a per-toner type delivery history 501 and a delivery history list 502. The per-toner type delivery history 501 is the newest delivery history for each toner color. As illustrated in FIG. 11, the delivery history of each color of black, cyan; magenta, and yellow is displayed. The viewer can easily confirm when the toner has been delivered for each color.

The delivery history list 502 is a column in which past delivery histories are displayed in time series. The viewer can confirm the past delivery history of toner which is often used, for example, black.

The per-toner type delivery history 501 is generated as follows. From the consumable item delivery status, the content generating unit 75 identifies the record of the model and the machine number of the image forming apparatus 80 that has requested the content. Then, each color is searched in an order starting from the newest order date, and the newest delivery history is identified for each toner color. Note that the color of the toner may be distinguished by looking at the product code or product name.

The delivery history list 502 is generated as follows. From the consumable item delivery status, the content generating unit 75 identifies the record of the model and the machine number of the image forming apparatus 80 that has requested the content. Then, for example, the delivery history for the past one year is acquired in time series.

The per-toner type delivery history 501 and the delivery history list 502 have fields of an automatic report date 503, a product name 504, and a delivery status 505, respectively. The automatic report date is the order date in Table 3. The product name is the consumable item name in Table 3. The delivery status is the delivery status in Table 3. The content generating unit 75 reads these information items from Table 3 and generates content.

By viewing the consumable item delivery status content 402, the viewer can know the present status of delivery of a consumable item, wait with reassurance, and avoid duplicate ordering, etc. Also, since inquiries from customers to the manufacturer of the image forming apparatus 80 are reduced, the cost of customer service, etc., can be reduced.

FIG. 12 is a diagram illustrating an example of the remote monitoring service introduction content 404. The remote monitoring service introduction content 404 is a Web page in which the remote monitoring service is introduced. The viewer can obtain information on the remote monitoring service in the Web page.

Since the icon information providing unit 73 attaches, in advance, the URL of the Web page of the remote monitoring service to the information display icon 90, the content generating unit 75 does not need to generate the content.

Figure 13:
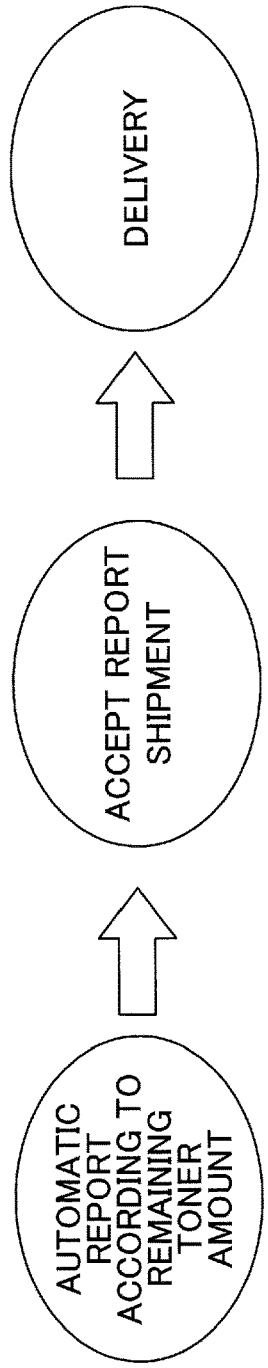
FIG. 13 is a diagram illustrating an example of consumable item delivery promotion content according to the first embodiment of the present invention.

FIG. 13 is a diagram illustrating an example of the consumable item delivery promotion content 403. The consumable item delivery promotion content 403 is an advertisement of a consumable item automatic delivery service. It is indicated that inconveniences (forgetting to order and duplicate ordering), which may arise unless a contract is made for the consumable item automatic delivery service, can be improved. Also, the flow of the automatic delivery of a consumable item is displayed.

The viewer can be aware of the existence of the consumable item automatic delivery service by looking at the consumable item delivery promotion content 403. Furthermore, since the frequency of processing orders from the customer by customer service on the manufacturer side of the image forming apparatus 80 is reduced, the cost of customer service, etc., can be reduced.

<Generation of Information Display Icon 90—First Embodiment>

For example, the information display icon 90 of the image forming apparatus 80 periodically communicates with the information distribution apparatus 70 to guide the viewer to display the content corresponding to the contract state. The information display icon 90 displays what kind of content is displayed when the viewer presses the information display icon 90. The information display icon 90 may be referred to as displaying the outline of the content.

Figure 14:
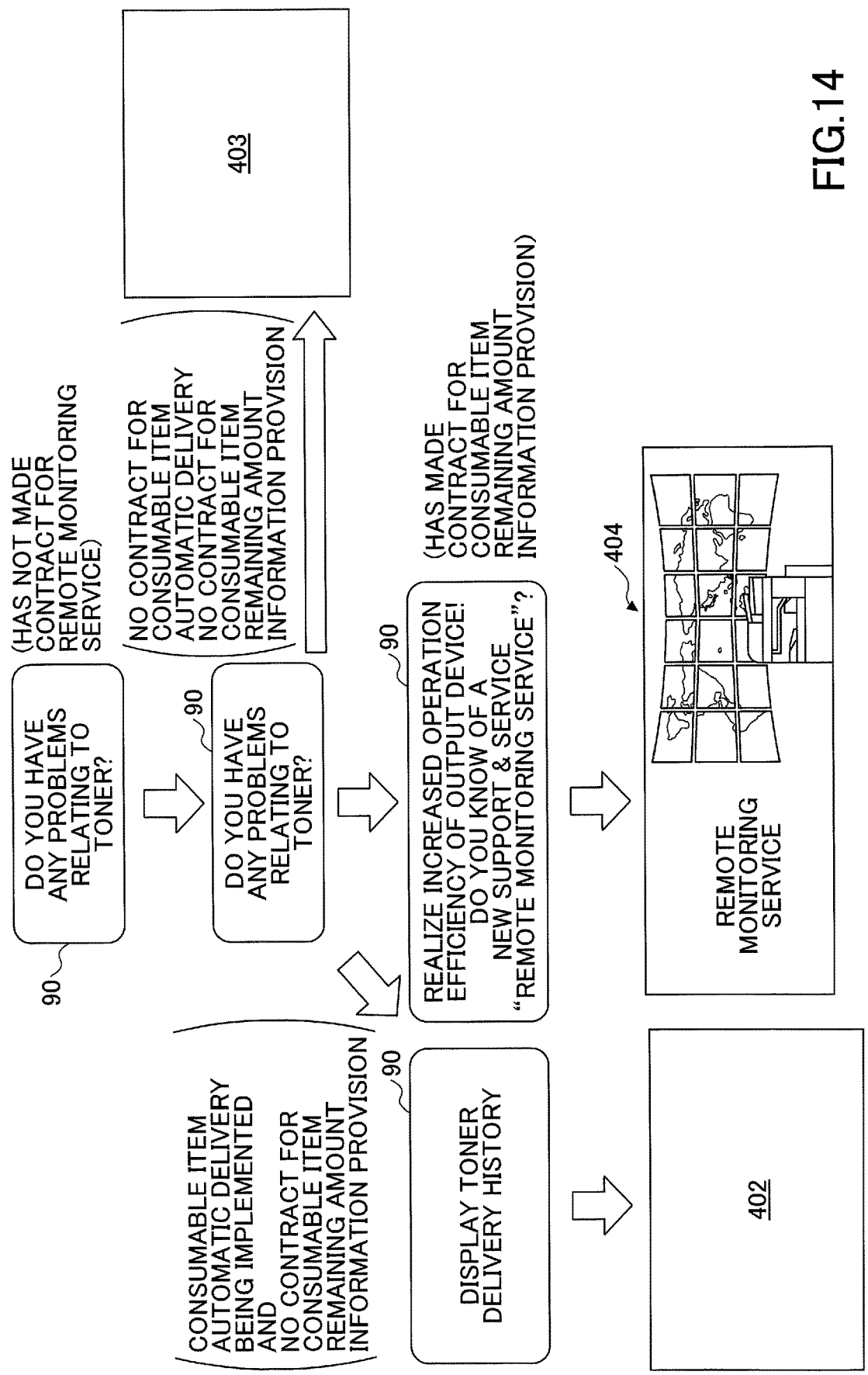
FIG. 14 is an example of a diagram for describing the relationship between a contract state and an information display icon according to the first embodiment of the present invention.

FIG. 14 is an example of a diagram for describing the relationship between the contract state and the information display icon 90.

(i) Has not made contract for remote monitoring service

The information display icon 90 displays a message "Do you have any problems relating to toner?" In this case, such a message is displayed to prompt the viewer to make a contract for the remote monitoring service. The information display icon 90 includes the URL of the web page of the remote monitoring service, and when the viewer presses the information display icon 90, the browser is activated and accesses the web page of the remote monitoring service.

The following (ii)-(iv) will be described assuming that a contract for the remote monitoring service has been made.

(ii) No contract for consumable item automatic delivery/ No contract for consumable item remaining amount information provision The information display icon 90 displays a message "Do you have any problems relating to toner?" The URL of the consumable item delivery promotion content 403 is included in the information display icon 90, and when the viewer presses the information display icon 90, the browser is activated to display the consumable item delivery promotion content 403 (FIG. 13).

(iii) Has made contract for consumable item automatic delivery/No contract for consumable item remaining amount information provision The information display icon 90 displays a message "Display toner delivery history ". The URL of the information distribution apparatus 70 is linked to the information display icon 90, and when the viewer presses the information display icon 90, the browser is activated to display the consumable item delivery status content generated by the process of FIG. 10 (FIG. 11).

(iv) Has made contract for consumable item remaining amount information provision The information display icon 90 displays messages saying "Realize increased operation efficiency of output device! Do you know of a new support & service '@remote?'" The URL of the Web page of the remote monitoring service is linked to the information display icon 90, and when the viewer presses the information display icon 90, the browser is activated and accesses the Web page (FIG. 12).

<Procedure for Generating Information Display Icon 90—First Embodiment>

The information display icon 90 is generated by the information distribution apparatus 70. The image forming apparatus 80 requests acquisition of the information display icon 90, and updates the information display icon 90 as needed.

Figure 15:
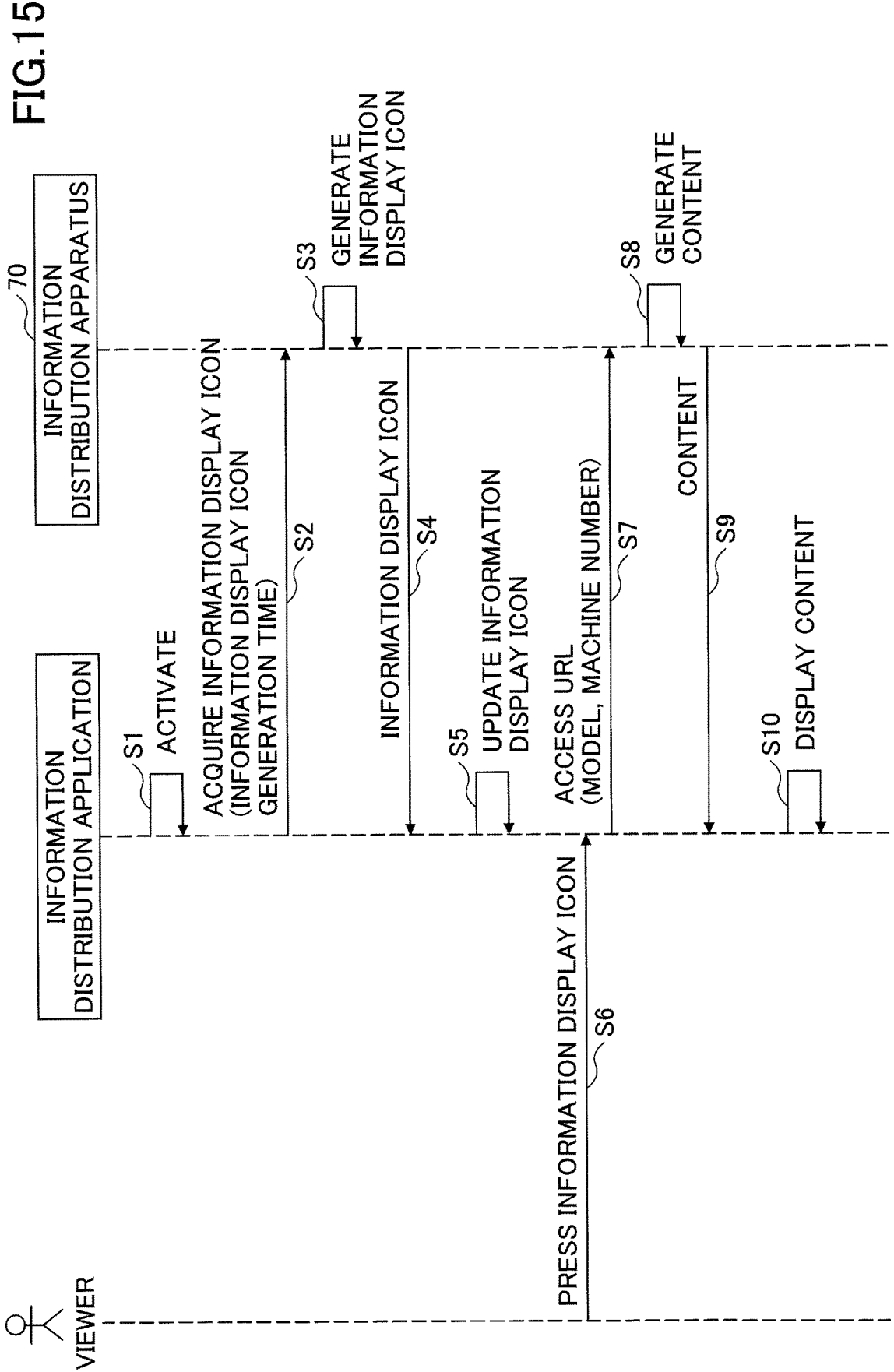
FIG. 15 is an example of a sequence diagram illustrating an operation procedure of the image forming apparatus and the information distribution apparatus relating to the information display icon according to the first embodiment of the present invention.

FIG. 15 is an example of a sequence diagram illustrating an operation procedure of the image forming apparatus 80 and the information distribution apparatus 70 relating to the information display icon 90.

Step S1: The information distribution application is activated. Immediately after the activation, since the information distribution application is not communicating with the information distribution apparatus 70, the initial screen of the information display icon 90 is displayed. The initial screen of the information display icon 90 is the same as that when the remote monitoring service has not been contracted yet. The position of the information display icon 90 does not overlap an icon of another application, and the OS automatically determines the position of the information display icon 90. The viewer can move the information display icon 90 to any position.

Step S2: When the timing to acquire the information display icon 90 has approached, the icon acquiring unit 82 makes a request to the information distribution apparatus 70 to for the information display icon 90. Note that in addition to the model and the machine number, the information display icon creation time is attached. The method of using the information display icon creation time will be described in a third embodiment.

The acquisition timing is, for example, as follows. After acquiring the information display icon 90, the information display icon 90 is acquired in short cycles.
In the state in which the information display icon 90 has not been acquired:
When the viewer presses the information display icon 90, once per hour (first predetermined time)
After acquiring the information display icon 90:
Acquire once a day (second predetermined time)

Step S3: The icon information providing unit 73 of the information distribution apparatus 70 generates the information display icon 90 with reference to the contract information as described above. In the case of "contract for consumable item remaining amount information provision: NO and contract for consumable item automatic delivery service: NO", the icon information providing unit 73 sets the URL of the information distribution apparatus 70 as the tap access URL. In the case of "contract for consumable item remaining amount information provision: NO and contract for consumable item automatic delivery service: YES", the icon information providing unit 73 sets the URL of the information distribution apparatus 70 as the tap access URL. In the case of "contract for consumable item remaining amount information provision: YES", the icon information providing unit 73 sets the URL of the Web page of the remote monitoring service as the tap access URL. As the information display icon creation time, the time when the information display icon has been created is set. It is assumed that the name of the information display icon 90, the information display image, and the message are determined in advance.

Step S4: The icon information providing unit 73 of the information distribution apparatus 70 transmits the information display icon 90 to the image forming apparatus 80.

Step S5: The icon display unit 83 updates the information display icon 90 and displays the information display icon 90. That is, the message is superimposed on the information display image and is displayed at the original position. Furthermore, the information display icon 90 name may be displayed near the information display icon 90.

Step S6: When the viewer presses the information display icon 90, the operation accepting unit 81 accepts the pressing of the information display icon 90.

Step S7: Accordingly, the content acquiring unit 84 specifies the URL held by the pressed information display icon 90, and accesses the corresponding content.

Step S8: As described above, the content generating unit 75 of the information distribution apparatus 70 generates content according to the contract information.

Step S9: The content distributing unit 76 transmits the content to the image forming apparatus 80.

Step S10: The content display unit 85 displays the content on the operation panel 27 by a browser, etc.

As described above, since the image forming apparatus 80 periodically communicates with the information distribution apparatus 70 to display the information display icon according to the contract information, the viewer can determine whether to press the information display icon according to the message displayed when the viewer looks at the information display icon.

<Overview—First Embodiment>

As described above, the information distribution system of the present embodiment can change the content to be distributed, according to the contract state of the consumable item automatic delivery service, so that the possibility of the viewer making an erroneous recognition can be reduced. Furthermore, since the content to be distributed can be changed in accordance with whether a contract has been made for the consumable item remaining amount information provision, the of the viewer making an erroneous recognition can be reduced.

Second Embodiment

Figure 16:
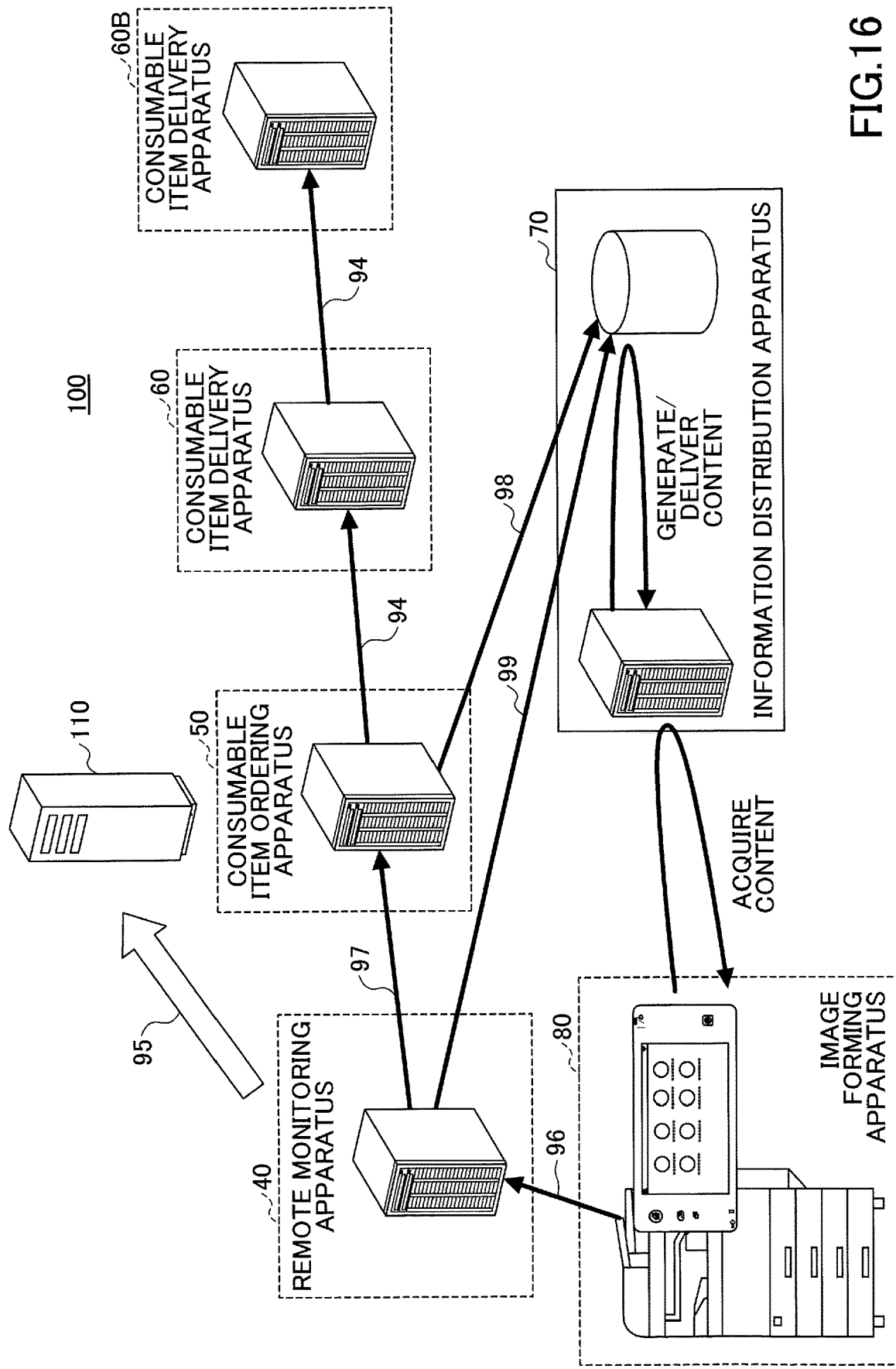
FIG. 16 is an example of a schematic overall configuration diagram of the information distribution system according to a second embodiment of the present invention.

In the present embodiment, a case where the information distribution system 100 includes a plurality of consumable item delivery apparatuses 60 will be described. FIG. 16 is an example of a schematic overall configuration diagram of the information distribution system 100. In the description with reference to FIG. 16, mainly the differences from FIG. 2 will be described.

The information distribution system 100 of FIG. 16 includes a consumable item delivery apparatus 60B, in addition to the consumable item delivery apparatus 60. Since there are various and many locations of customers to whom consumable items are to be delivered, the consumable item delivery apparatus 60 may request delivery of a consumable item to the consumable item delivery apparatus 60B. For example, the consumable item delivery apparatus 60 is operated by a company closely related to the information distribution system 100, and the consumable item delivery apparatus 60B is operated by a cooperating company, etc., that contracts the delivery from the consumable item delivery apparatus 60. The consumable item delivery apparatus 60B is also an information processing apparatus that manages delivery of consumable items.

The consumable item delivery apparatus 60 not only manages the delivery of consumable items but also requests delivery to the consumable item delivery apparatus 60B. The consumable item delivery apparatus 60B, which has been requested to deliver a consumable item, causes to a deliveryman to deliver the consumable item. In this case, the delivery may be successful or unsuccessful. When the delivery is unsuccessful, the consumable item delivery apparatus 60B sends a report indicating "non-delivery" to the consumable item delivery apparatus 60. Non-delivery means that a person in charge has visited the destination several times but cannot deliver the consumable item due to the absence of the recipient or the recipient refuses to receive the delivery.

On the other hand, when the delivery is successful, because there are a large number of successful deliveries and because the delivery is usually successful, the consumable item delivery apparatus 60B does not send a report indicating "delivery completed" to the consumable item delivery apparatus 60.

Therefore, in the case of non-delivery, the consumable item ordering apparatus 50 can report the non-delivery to the information distribution apparatus 70, but in the case of delivery completed, the consumable item ordering apparatus 50 cannot report that delivery is completed to the information distribution apparatus 70. For this reason, there has been an inconvenience that the delivery status is not updated for a consumable item delivered by the consumable item delivery apparatus 60B, even when the image forming apparatus 80 displays the consumable item delivery status content 402.

In the present embodiment, the information distribution system 100 that can display a delivery status in which the consumable item delivery status content 402 is updated in both cases of delivery completed and non-delivery, will be described.

<Functions—Second Embodiment>

Figure 17:
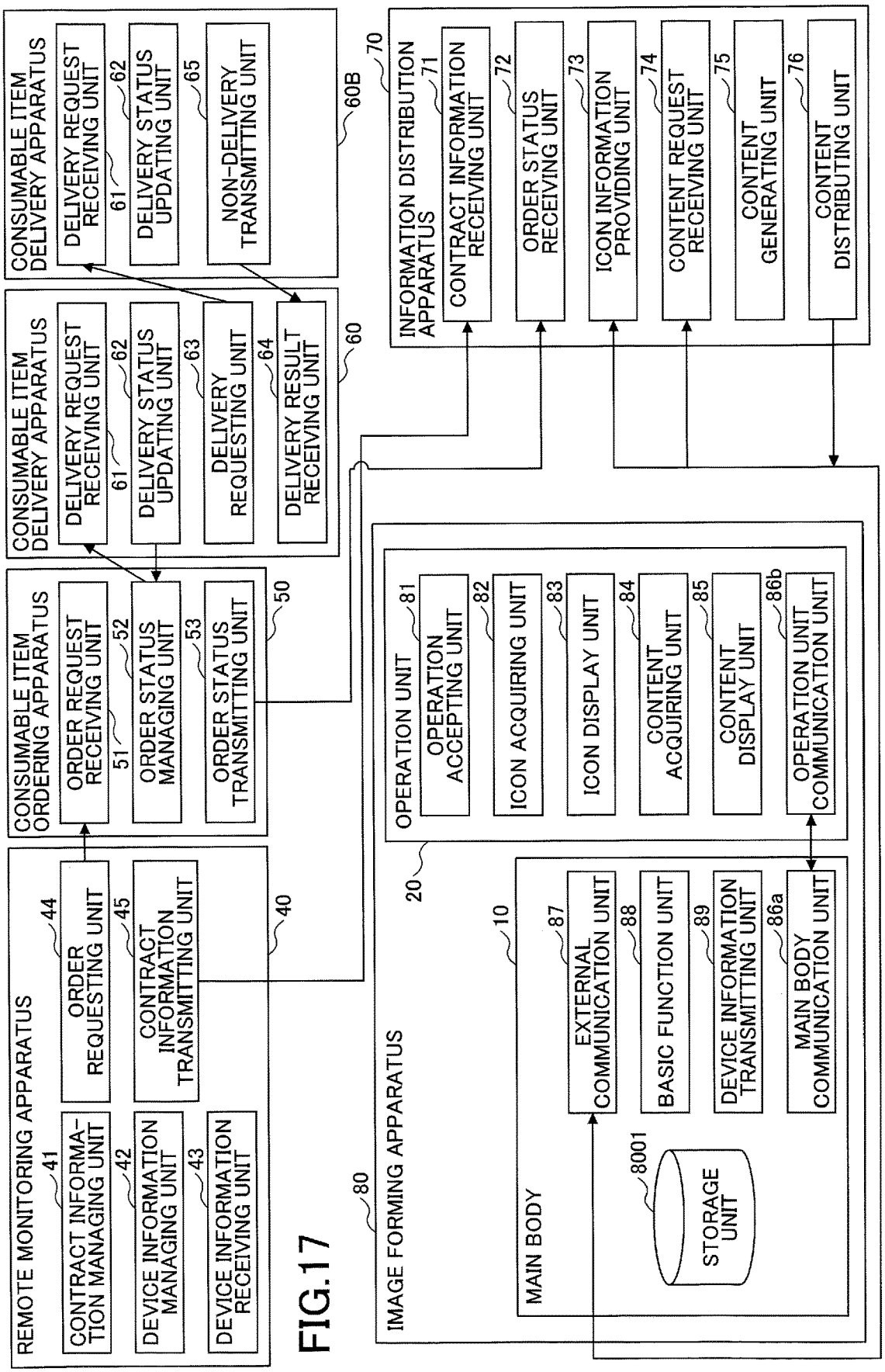
FIG. 17 is an example of a functional block diagram of the image forming apparatus, the remote monitoring apparatus, the consumable item ordering apparatus, the consumable item delivery apparatus, and the information distribution apparatus included in the information distribution system according to the second embodiment of the present invention.

FIG. 17 is an example of a functional block diagram of the image forming apparatus 80, the remote monitoring apparatus 40, the consumable item ordering apparatus 50, the consumable item delivery apparatus 60, the consumable item delivery apparatus 60B, and the information distribution apparatus 70 included in the information distribution system 100 according to the present embodiment: In the descriptions with reference to FIG. 17, mainly the differences from FIG. 6 will be described.

First, as described above, the information distribution system 100 newly includes the consumable item delivery apparatus 60B. The consumable item delivery apparatus 60B includes the delivery request receiving unit 61, the delivery status updating unit 62, and a non-delivery transmitting unit 65. The functions of the delivery request receiving unit 61 and the delivery status updating unit 62 may be the same as those of the consumable item delivery apparatus 60.

The non-delivery transmitting unit 65 determines that the deliveryman of the consumable item is unable to deliver the consumable item, inputs the non-delivery, and sends a report indicating non-delivery to the consumable item delivery apparatus 60. The non-delivery transmitting unit 65 is implemented as the CPU 301 of FIG. 4 executes a program and controls the communication I/F 304, etc.

Furthermore, the consumable item delivery apparatus 60 newly includes a delivery requesting unit 63 and a delivery result receiving unit 64. The delivery requesting unit 63 requests the consumable item delivery apparatus 60B to deliver a consumable item (transfers the consumable item delivery request 94). The customer to which the delivery requesting unit 63 requests the consumable item delivery apparatus 60B to deliver the consumable item, may be determined in advance in an area, etc., or the administrator may appropriately set the customer.

Furthermore, the delivery result receiving unit 64 receives a non-delivery report from the consumable item delivery apparatus 60B. When a non-delivery report is received from the consumable item delivery apparatus 60B, the delivery status updating unit 62 of the consumable item delivery apparatus 60 transmits a delivery status update request to the consumable item ordering apparatus 50. The delivery requesting unit 63 and the delivery result receiving unit 64 are implemented as the CPU 301 of FIG. 4 executes a program and controls the communication I/F 304, etc.

<Operation Procedure in Case of Non-Delivery—Second Embodiment>

Figure 18:
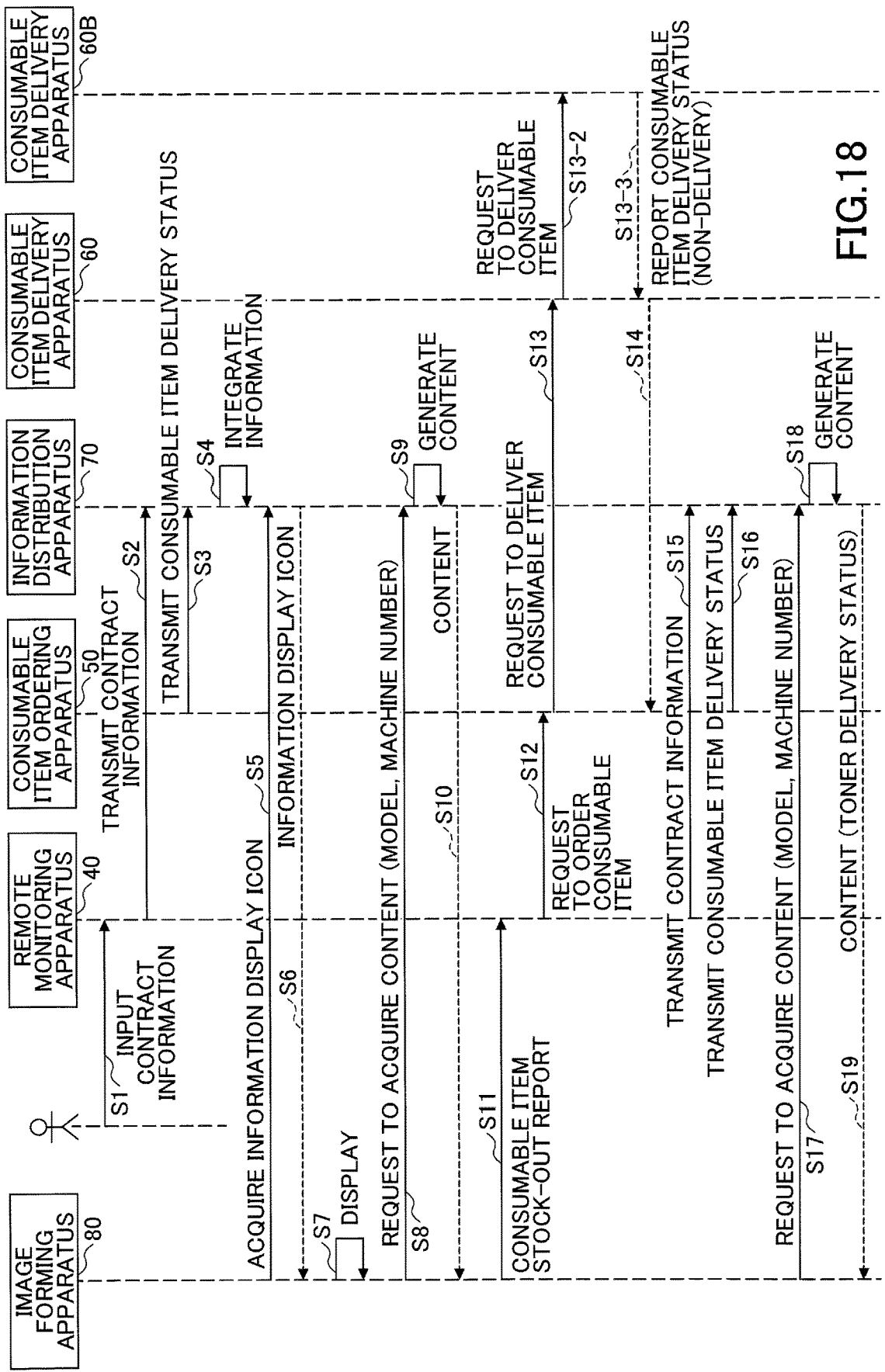
FIG. 18 is an example of a sequence diagram illustrating the overall operation of the information distribution system in the case of non-delivery according to the second embodiment of the present invention.

FIG. 18 is an example of a sequence diagram illustrating the overall operation of the information distribution system 100 in the case of non-delivery. In the description with reference to FIG. 18, mainly the differences from FIG. 7 will be described. The processes of steps S1 to S13 are the same as those of FIG. 7.

Step S13-2: The delivery requesting unit 63 of the consumable item delivery apparatus 60 transmits a consumable item delivery request to the consumable item delivery apparatus 60B.

Step S13-3: In the case where non-delivery occurs at the consumable item delivery apparatus 60B, the non-delivery transmitting unit 65 of the consumable item delivery apparatus 60B transmits "non-delivery" to the consumable item delivery apparatus 60.

Step S14: Since the delivery status of the consumable item being delivered has changed, the delivery status updating unit 62 of the consumable item delivery apparatus 60 sends a request to update the delivery status to include the delivery status of "non-delivery", to the consumable item ordering apparatus 50.

The process of step S15 is the same as that of FIG. 7, and in step S16, the consumable item ordering apparatus 50 transmits the consumable item delivery status 98 to the information distribution apparatus 70 based on the delivery status update request.

Step S16: The order status transmitting unit 53 of the consumable item ordering apparatus 50 transmits the consumable item delivery status 98 to the information distribution apparatus 70, periodically or according to need. Therefore, the information distribution apparatus 70 can transmit the content, in which the delivery status has been updated, to the image forming apparatus 80 that has requested the content.

As described above, when the consumable item delivery apparatus 60B attempts to make a delivery but the result is "non-delivery", a report indicating "non-delivery" is transmitted to the information distribution apparatus 70.

<Operation Procedure in Case of Delivery Completed—Second Embodiment>

Figure 19:
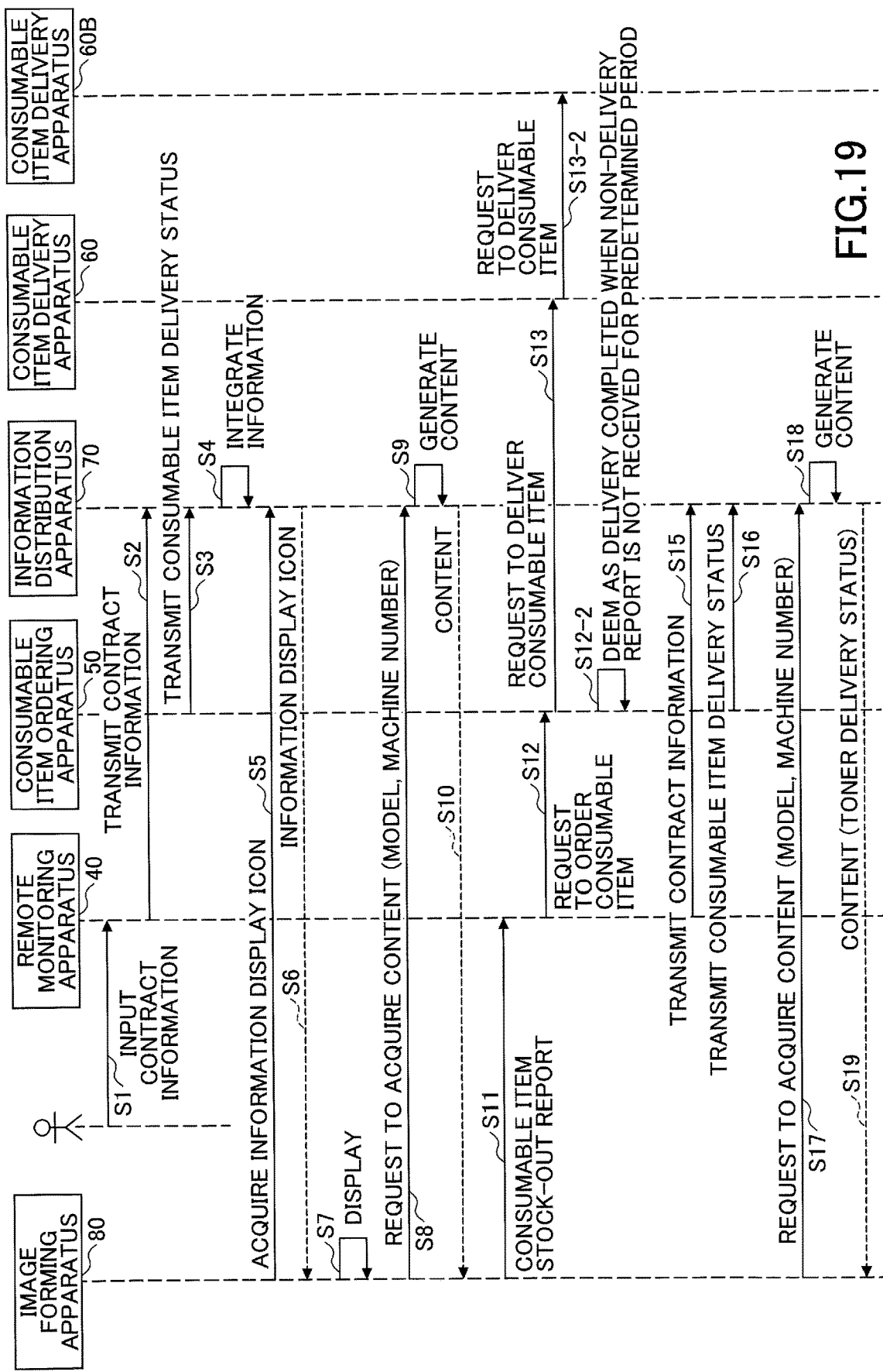
FIG. 19 is an example of a sequence diagram illustrating the overall operation of the information distribution system in the case of delivery completed according to the second embodiment of the present invention.

FIG. 19 is an example of a sequence diagram illustrating the overall operation of the information distribution system 100 in the case of delivery completed. In the description with reference to FIG. 19, mainly the differences from FIG. 18 will be described. As illustrated in FIG. 19, in the case of delivery completed, step S13-3 does not exist. That is, the state of "delivery completed" is not reported from the consumable item delivery apparatus 60B to the consumable item delivery apparatus 60. Therefore, the consumable item ordering apparatus 50 performs the process of step S12-2.

Step S12-2: The order status managing unit 52 of the consumable item ordering apparatus 50 records the date (order date) on which the consumable item delivery request has been transmitted, and when the delivery status (non-delivery) has not been received for a certain period, it is deemed as "delivery completed".

Therefore, in step S16, as in FIG. 18, the order status transmitting unit 53 can transmit the consumable item delivery status 98 to the information distribution apparatus 70.

In this manner, even when the consumable item delivery apparatus 60B makes the delivery and "delivery completed" is attained, a report indicating "delivery completed" is transmitted to the information distribution apparatus 70.

<Consumable Item Delivery Status Content—Second Embodiment>

Figure 20:
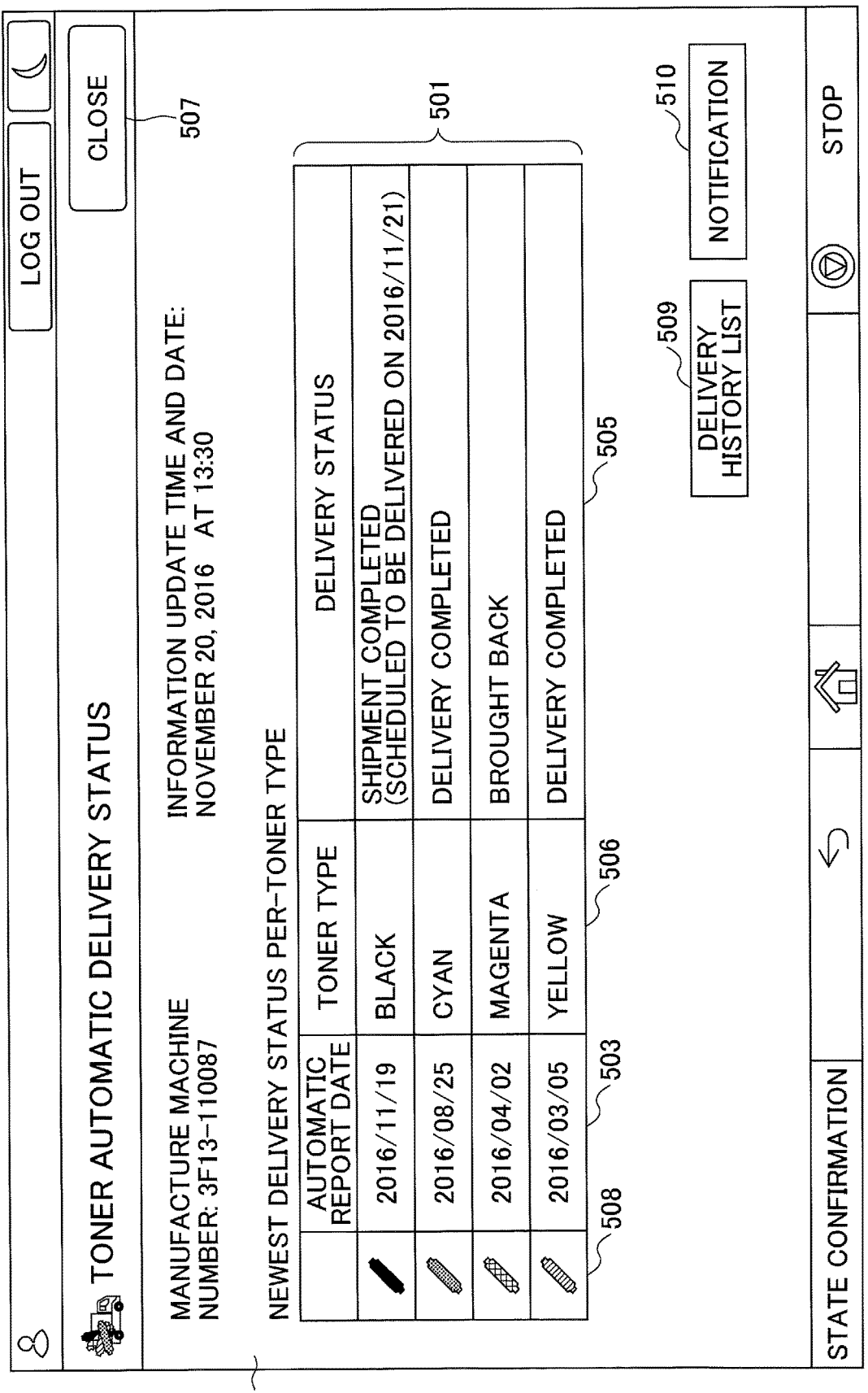
FIG. 20 is a diagram illustrating an example of consumable item delivery status content according to the second embodiment of the present invention.

With reference to FIG. 20, the consumable item delivery status content 402 in the case where non-delivery is included, will be described. FIG. 20 is a diagram illustrating an example of the consumable item delivery status content 402. In the description with reference to FIG. 20, mainly the differences from FIG. 11 will be described. The consumable item delivery status content 402 of FIG. 20 does not include a delivery history list, but the delivery history list is displayed after transitioning to another screen. Details will be described with reference to FIG. 26.

In the consumable item delivery status content 402 of FIG. 20, "brought back" is displayed in the item of delivery status 505. "Brought back" means non-delivery. The content generating unit 75 of the information distribution apparatus 70 determines the items of the delivery status 505 based on the consumable item delivery status 98 transmitted from the consumable item ordering apparatus 50. This will be described with reference to Table 6.

TABLE 6

| DATA SEGMENT | DELIVERY REPORT TYPE SEGMENT | MEANING | DISPLAY SPECIFICATION |
| --- | --- | --- | --- |
| 01: DELIVER | DO NOT SEE HERE. | DELIVERY REQUESTED | (1) SHIPMENT COMPLETED (SCHEDULED DELIVERY Y/M/D) DISPLAY DATE OF "DELIVERY DATE" IN FFM FOR SCHEDULED DELIVERY DATE (2) DELIVERY COMPLETED IN A STATE WHERE "NON-DELIVERY" IS NOT RECEIVED WITHIN 14 DAYS FROM SCHEDULED DELIVERY DATE, DEEM AS DELIVERY COMPLETED |
| 02: NON-DELIVERY | 13: NON-DELIVERY | WHEN ALL SPECIFICATIONS AND ALL QUANTITIES CANNOT BE DELIVERED IN ONE UNIT OF SAME DELIVERY REQUEST NUMBER | BROUGHT BACK |
| 02: NON-DELIVERY | 14: CANCELLED AT SITE | WHEN ALL QUANTITIES OF ONE SPECIFICATION CANNOT BE DELIVERED | BROUGHT BACK |
| 02: NON-DELIVERY | 15: CHANGED AT SITE | WHEN AT LEAST ONE ITEM CAN BE DELIVERED FOR ONE SPECIFICATION | CHANGED AT SITE |

Table 6 indicates the codes and contents of the consumable item delivery status. Table 6 includes the items of data segment, delivery report type segment, meaning, and display specification. The data segment indicates delivered or non-delivery, and the delivery report type segment indicates subdivision segments of non-delivery. The order status managing unit 52 of the consumable item ordering apparatus 50 sets the data segment and the delivery report type segment.

The meaning item indicates the content of the combination of the data segment and the delivery report type segment. This item is for describing the present embodiment, and the content generating unit 75 does not have to refer to this item. The display specification indicates how the combination of the data segment and the delivery report type segment is displayed in the consumable item delivery status content 402. In the case of non-delivery, the content generating unit 75 refers to the code of the consumable item delivery status and may set "brought back" or "changed at site" in the consumable item delivery status content 402.

When the item of data segment indicates deliver, there is a state in which shipment has been completed and a state in which delivery has been completed. The order status managing unit 52 determines whether the state is shipment completed or delivery completed, as follows.

A. Shipment Completed

Immediately after transmission of the consumable item delivery request 94, the state is determined as "shipment completed". In this case, the order status managing unit 52 sets the scheduled delivery date. The format of the scheduled delivery date is, for example, "YYYY/MM/DD". The method of determining the scheduled delivery date will be described later.

B. Delivery Completed

When "non-delivery" is not transmitted from the consumable item delivery apparatus 60 for a certain period of time (for example, 7 days, 10 days, or 14 days, etc.) from the scheduled delivery date, it is deemed as delivery completed, and the order status managing unit 52 determines that delivery has been completed.

The order status managing unit 52 sets necessary information for displaying the delivery status 505 determined as described above, and the order status transmitting unit 53 transmits the information to the information distribution apparatus 70.

The scheduled delivery date will be described. The scheduled delivery date is as follows. In the neighboring area from the consumable item delivery apparatus 60 or 60B, when an order is made in the morning, the current day will be the scheduled delivery date. When an order is made in the afternoon, the next day will be the scheduled delivery date. In a middle distance area further away from the neighborhood, the next day of the order date will be the scheduled delivery date. In other long distance areas, the second day after the order date will be the scheduled delivery date.

The consumable item ordering apparatus 50 includes a table in which the neighborhood, the middle distance area, and the long distance area are associated with each other for each area, and the consumable item ordering apparatus 50 uses this table to determine the scheduled delivery date according to the order date and the area of the customer.

Next, a toner icon 508 and a toner type 506 of the consumable item delivery status content 402 will be described. The consumable item delivery status content 402 of FIG. 20 includes items of the toner icon 508 and the toner type 506. In FIG. 11 of the first embodiment, the toner type 506 is the product name, and the product name of the consumable item is directly displayed. In the present embodiment, a method of displaying only the toner type 506 will be described.

First, an example of a method of displaying the toner type will be described with reference to FIG. 21. FIG. 21 is a table required for the content generating unit 75 to create the toner type 506. In the table, items such as product code, product name, toner type, and toner icon are registered in association with each other. If the content generating unit 75 includes this table, it is possible to identify the toner type and the toner icon from the item name (consumable item name) in the consumable item delivery status 98.

However, product codes or product names are not given by a certain rule, and there are multiple types of product codes or product names. Therefore, it is not easy for an administrator of the information distribution system 100 to create such a table.

Therefore, the content generating unit 75 according to the present embodiment determines the toner type 506 by using characters included in the product name. Since a character string of the product name of the toner type 506 is included in the product name, the toner type 506 can be easily determined. Since the toner icon 508 corresponds to the toner type 506 in a one-on-one manner, the toner icon 508 can be similarly determined.

Figure 22:
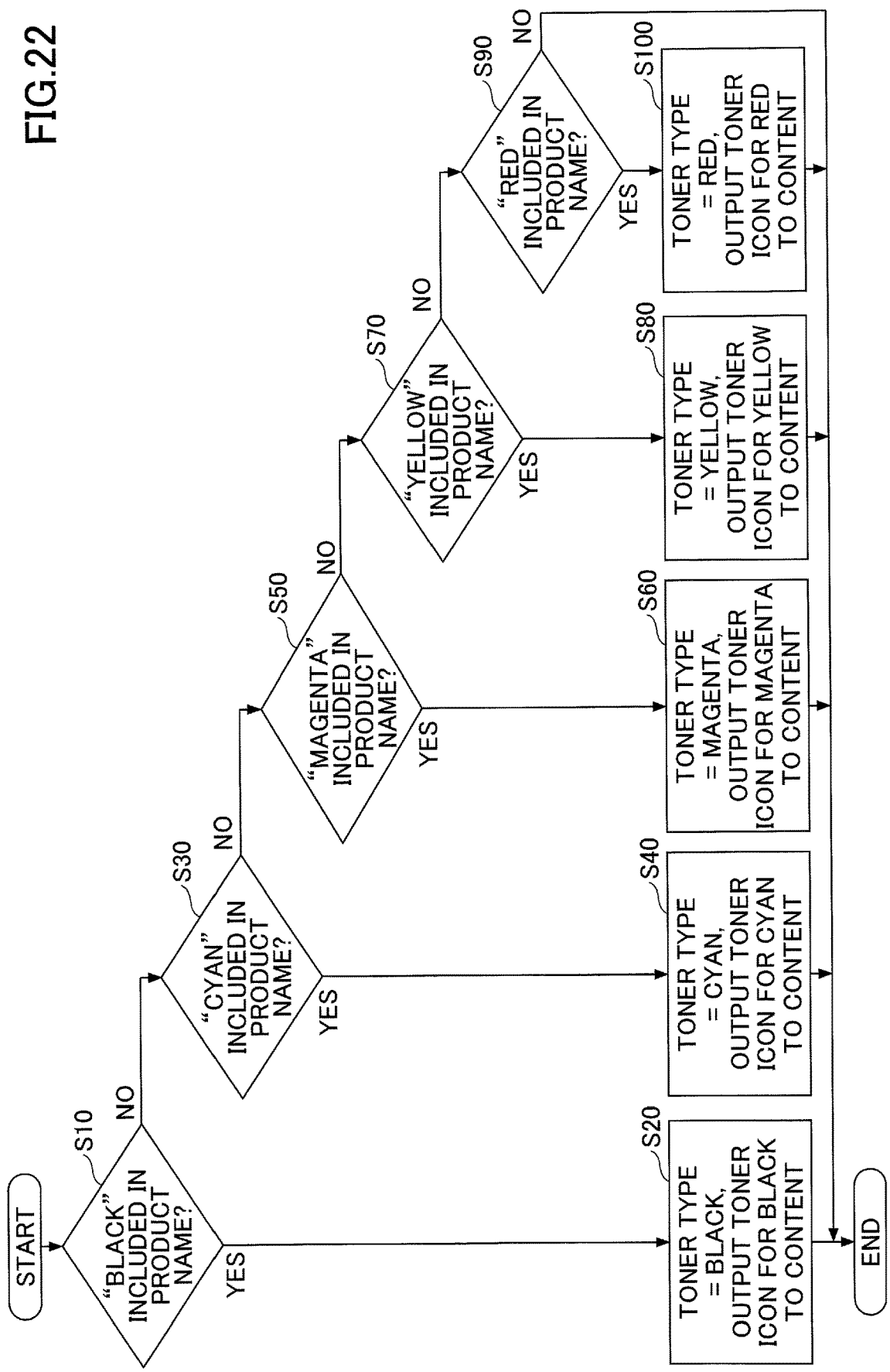
FIG. 22 is an example of a flowchart illustrating a procedure in which the content generating unit determines the toner type and the toner icon according to the second embodiment of the present invention.

FIG. 22 is an example of a flowchart illustrating a procedure in which the content generating unit 75 determines the toner type 506 and the toner icon 508.

First, the content generating unit 75 compares the product name (consumable item name) in the consumable item delivery status 98 with the character string "black" held beforehand, and determines whether "black" is included in the product name (step S10).

When the determination in step S10 is YES, the content generating unit 75 determines that the toner type is "black", and sets the black toner icon in the consumable item delivery status content 402 (step S20).

When the determination in step S10 is NO, the content generating unit 75 determines whether the character string "cyan" is included in the product name in the consumable item delivery status (step S30).

When the determination in step S30 is YES, the content generating unit 75 determines that the toner type is "cyan", and sets the cyan toner icon in the consumable item delivery status content 402 (step S40).

When the determination in step S30 is NO, the content generating unit 75 determines whether the character string "magenta" is included in the product name in the consumable item delivery status (step S50).

When the determination in step S50 is YES, the content generating unit 75 determines that the toner type is "magenta", and sets the magenta toner icon in the consumable item delivery status content 402 (step S60).

When the determination in step S50 is NO, the content generating unit 75 determines whether the character string "yellow" is included in the product name of the consumable item delivery status (step S70).

When the determination in step S70 is YES, the content generating unit 75 determines that the toner type is "yellow", and sets the yellow toner icon in the consumable item delivery status content 402 (step S80).

When the determination in step S70 is NO, the content generating unit 75 determines whether the character string "red" is included in the product name in the consumable item delivery status (step S90).

When the determination in step S90 is YES, the content generating unit 75 determines that the toner type is "red", and sets the red toner icon in the consumable item delivery status content 402 (step S100).

When the determination in step S90 is NO, the content generating unit 75 determines that there is no toner type corresponding to the product name. In this case, the toner icon 508 and the toner type 506 will be blank. In this manner, the information distribution system 100 can display the toner type and the toner icon in the consumable item delivery status content 402 even when the information distribution system 100 does not include a table that associates the product name with the toner type.

<Overview—Second Embodiment>

As described above, the information distribution system 100 according to the present embodiment can also update the delivery status of consumable items delivered by the consumable item delivery apparatus 60B, and the image forming apparatus 80 can display the consumable item delivery status content 402 in which the delivery status has been updated.

Third Embodiment

Since the size of the operation unit 20 of the image forming apparatus 80 is not necessarily fixed, when the size of the operation unit 20 is small, it may be difficult for the viewer to read the characters of the content. Therefore, in the present embodiment, the information distribution apparatus 70 that creates content according to the size of the operation unit 20, will be described.

Furthermore, in the case where the information display icon 90 is not acquired, the image forming apparatus 80 acquires the information display icon once per hour from the information distribution apparatus 70. Thus, after activating the image forming apparatus 80 and after returning to energy saving mode, etc., accesses may concentrate from the image forming apparatus 80 to the information distribution apparatus 70. Therefore, in the present embodiment, the information distribution apparatus 70 that determines the necessity of creating the information display icon 90 and that creates the information display icon 90 only when necessary, will be described.

Note that the system configuration and the functional block diagram of the present embodiment are the same as those of the first embodiment, or even if they are different, there is no problem in the description of the present embodiment.

<Procedure of Generating Information Display Icon—Third Embodiment>

Figure 23:
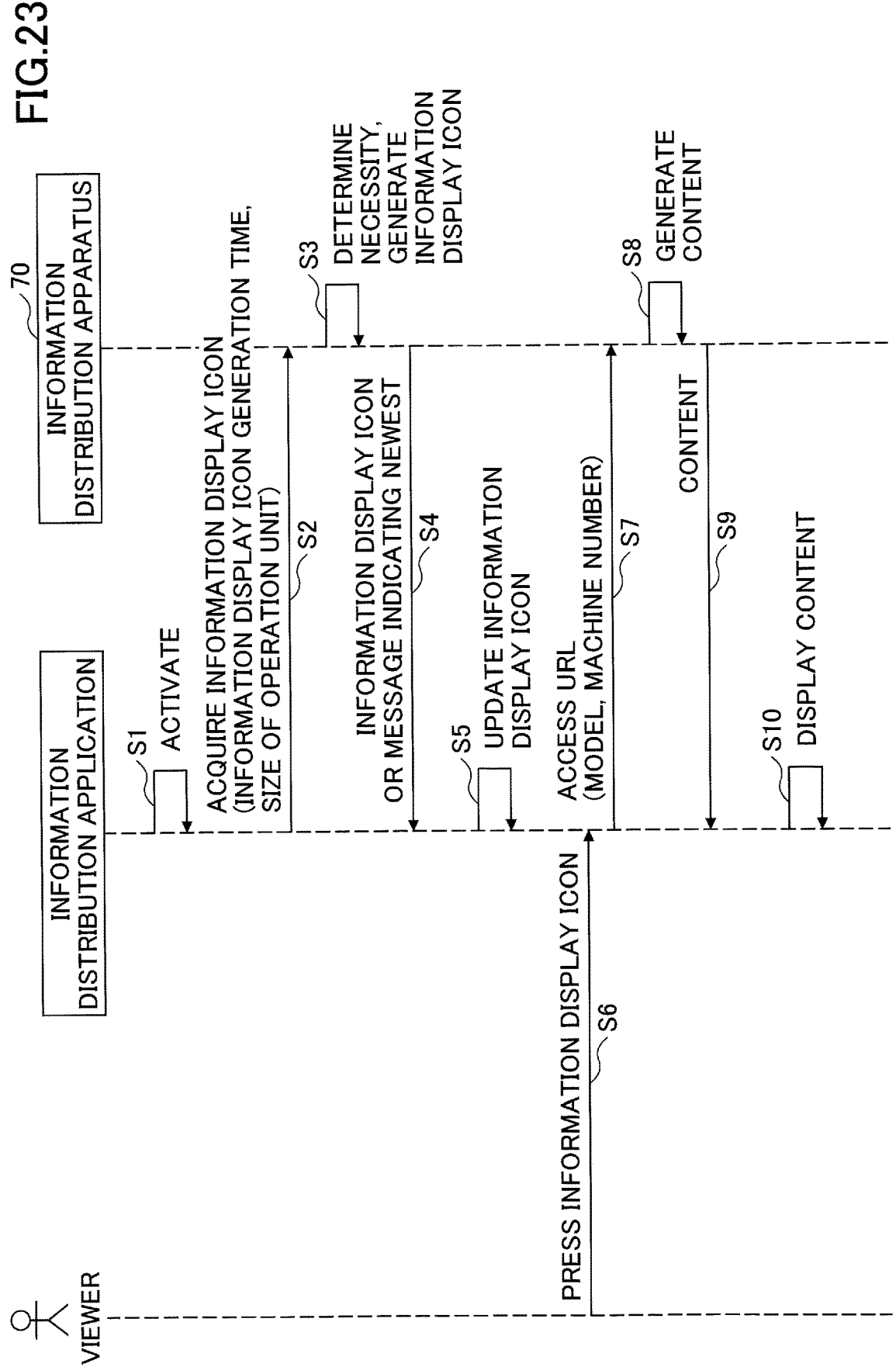
FIG. 23 is an example of a sequence diagram illustrating an operation procedure of the image forming apparatus and the information distribution apparatus relating to the information display icon according to a third embodiment of the present invention.

FIG. 23 is an example of a sequence diagram illustrating an operation procedure of the image forming apparatus 80 and the information distribution apparatus 70 relating to the information display icon 90. In the description with reference to FIG. 23, mainly the differences from FIG. 15 will be described.

Step S1: The information distribution application is activated. Immediately after the activation, since the information distribution application is not communicating with the information distribution apparatus 70, the initial screen of the information display icon 90 is displayed. The initial screen of the information display icon 90 is the same as that when the remote monitoring service has not been contracted yet. The position of the information display icon 90 does not overlap an icon of another application, and the OS automatically determines the position of the information display icon 90. The viewer can move the information display icon 90 to any position.

Step S2: When the timing to acquire the information display icon 90 has approached, the icon acquiring unit 82 makes a request to the information distribution apparatus 70 for the information display icon 90. In the present embodiment, the size of the operation unit 20 is newly transmitted. Immediately after the activation, the image forming apparatus 80 does not hold any information display icon creation time, and therefore a value such as "000", which indicates that the information display icon creation time is not held, is set at the information display icon creation time.

Figure 24:
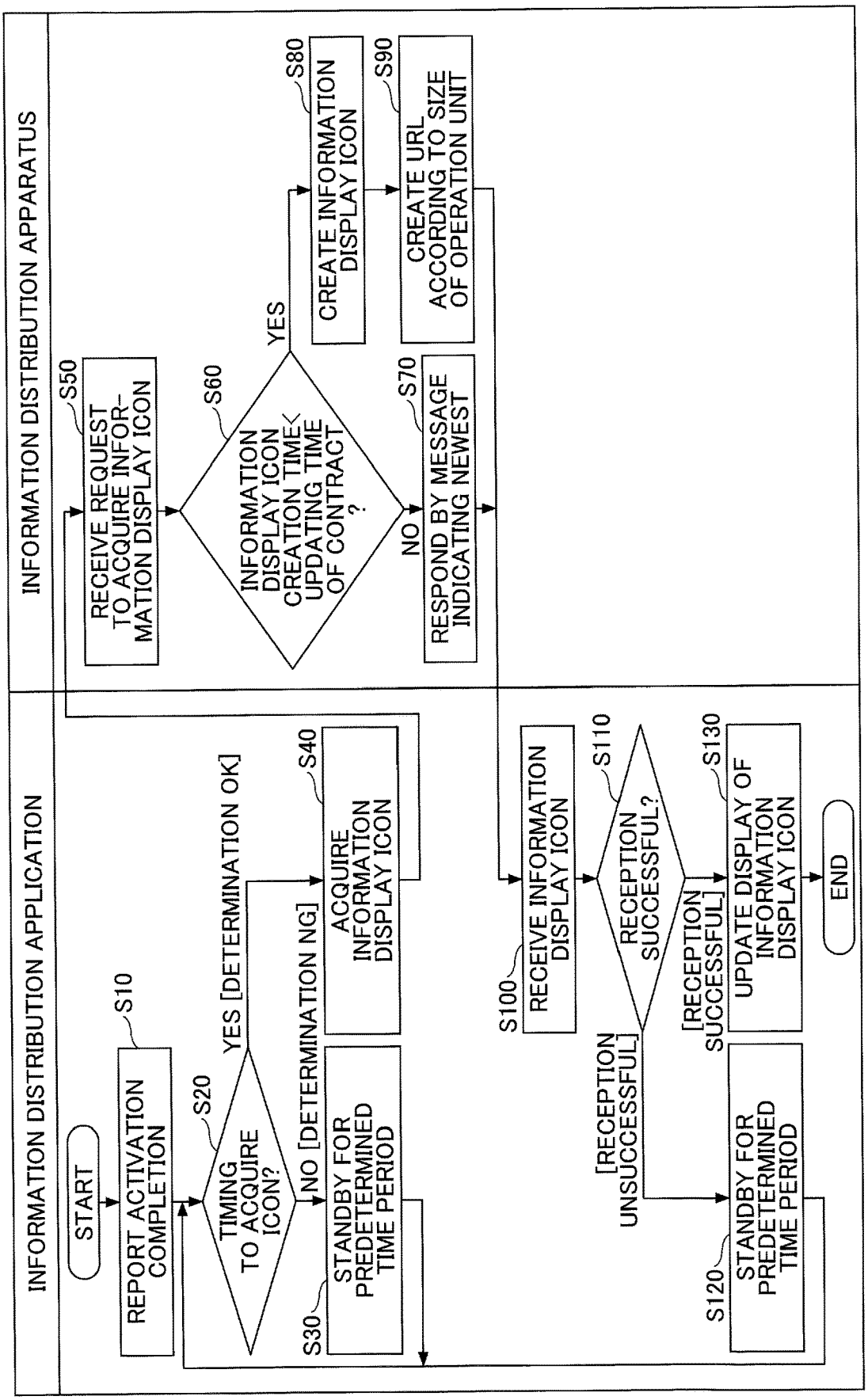
FIG. 24 is an example of a flowchart illustrating a procedure of the icon information providing unit for creating the information display icon according to the third embodiment of the present invention.

Step S3: The icon information providing unit 73 of the information distribution apparatus 70 generates the information display icon 90 with reference to the contract information as described above. Details are illustrated in FIG. 24. In the present embodiment, there are cases where the information display icon 90 is returned as a response, and there are cases where only a message "newest" is returned as a response instead of the information display icon 90. When the information display icon 90 is transmitted, the information transmitted to the image forming apparatus 80 is as illustrated in Table 5. However, as the tap access URL, a different URL may be stored, depending on the size of the operation unit 20.

Step S4: The icon information providing unit 73 of the information distribution apparatus 70 transmits the information display icon 90 or the message "newest" to the image forming apparatus 80.

Step S5: The icon display unit 83 updates the information display icon 90 and displays the information display icon 90. That is, the message is superimposed on the information display image and displayed at the original position.

Step S6: When the viewer presses the information display icon 90, the operation accepting unit 81 accepts the pressing of the information display icon 90.

Step S7: Accordingly, the content acquiring unit 84 specifies the URL held by the pressed information display icon 90, and accesses the corresponding content.

Step S8: As described above, the content generating unit 75 of the information distribution apparatus 70 generates the content according to the contract information.

Step S9: The content distributing unit 76 transmits the content to the image forming apparatus 80.

Step S10: The content display unit 85 displays the content on the operation panel 27 by a browser, etc.

In this manner, the icon information providing unit 73 can set a different tap access URL according to the size of the operation unit 20, and can determine not to create the information display icon 90. Therefore, the information distribution apparatus 70 can transmit appropriate content according to the size of the operation unit 20, and it is possible to reduce the load of creating the information display icon 90.

<Determination as to whether to Create Information Display Icon—Third Embodiment>

FIG. 24 is an example of a flowchart illustrating a procedure of the icon information providing unit 73 for creating the information display icon.

First, the information distribution application detects an activation completion report (step S10). The activation completion report is for broadcasting at once, to the applications, a report indicating that activation of the image forming apparatus 80 has been completed, from the management function of the applications of the image forming apparatus 80. The information distribution application does not acquire the information display icon 90 within a predetermined period of time from the activation completion report, so as not to consume the resources of other applications that perform the activating process and the returning process. Note that the information display icon 90 is not acquired for a predetermined period of time after returning from energy saving.

Next, the icon acquiring unit 82 determines whether the timing to acquire the information display icon 90 has approached (step S20).

When it is not the timing to acquire the information display icon (NO in step S20), the icon acquiring unit 82 waits for a predetermined time (step S30).

When the timing to acquire the information display icon has approached (YES in step S20), the icon acquiring unit 82 requests the information distribution apparatus 70 to acquire the information display icon 90 (step S40).

The icon information providing unit 73 of the information distribution apparatus 70 receives the request to acquire the information display icon 90 (step S50).

The icon information providing unit 73 determines whether to create the information display icon 90 (step S60). That is, the icon information providing unit 73 compares the information display icon creation time and the contract information update time, and determines whether the contract information is newer than the information display icon. When the contract information is newer, it is preferable to recreate the information display icon 90. Otherwise, there is no need to recreate the information display icon 90.

When the determination in step S60 is NO, the icon information providing unit 73 sends, to the image forming apparatus 80, a response indicating that the information display icon 90 is the newest information display icon 90 (step S70).

When the determination in step S60 is YES, the icon information providing unit 73 newly creates the information display icon 90 (step S80).

In this case, the icon information providing unit 73 creates a tap access URL according to the size of the operation unit 20 (step S90). In this manner, by changing the access destination of the image forming apparatus 80, it is possible to cause the image forming apparatus 80 to display the content corresponding to the size of the operation unit 20.

The icon acquiring unit 82 of the image forming apparatus 80 receives the information display icon 90 or a response indicating that the information display icon 90 is the newest information display icon 90 (step S100).

The icon acquiring unit 82 determines whether the reception is successful (step S110). When the reception is unsuccessful, the icon acquiring unit 82 waits for a fixed time (step S120) and acquires the information again. When the reception is successful and the icon acquiring unit 82 receives the information display icon 90, the icon display unit 83 displays the information display icon (step S130).

In this way, by comparing the information display icon creation time and the contract information update time, there are cases where it is not necessary for the information distribution apparatus 70 to create an information display icon, and therefore the processing load of the information distribution apparatus 70 can be reduced.

<Example of Display of Contents by Operation Units of Different Sizes—Third Embodiment>

Figure 25A:
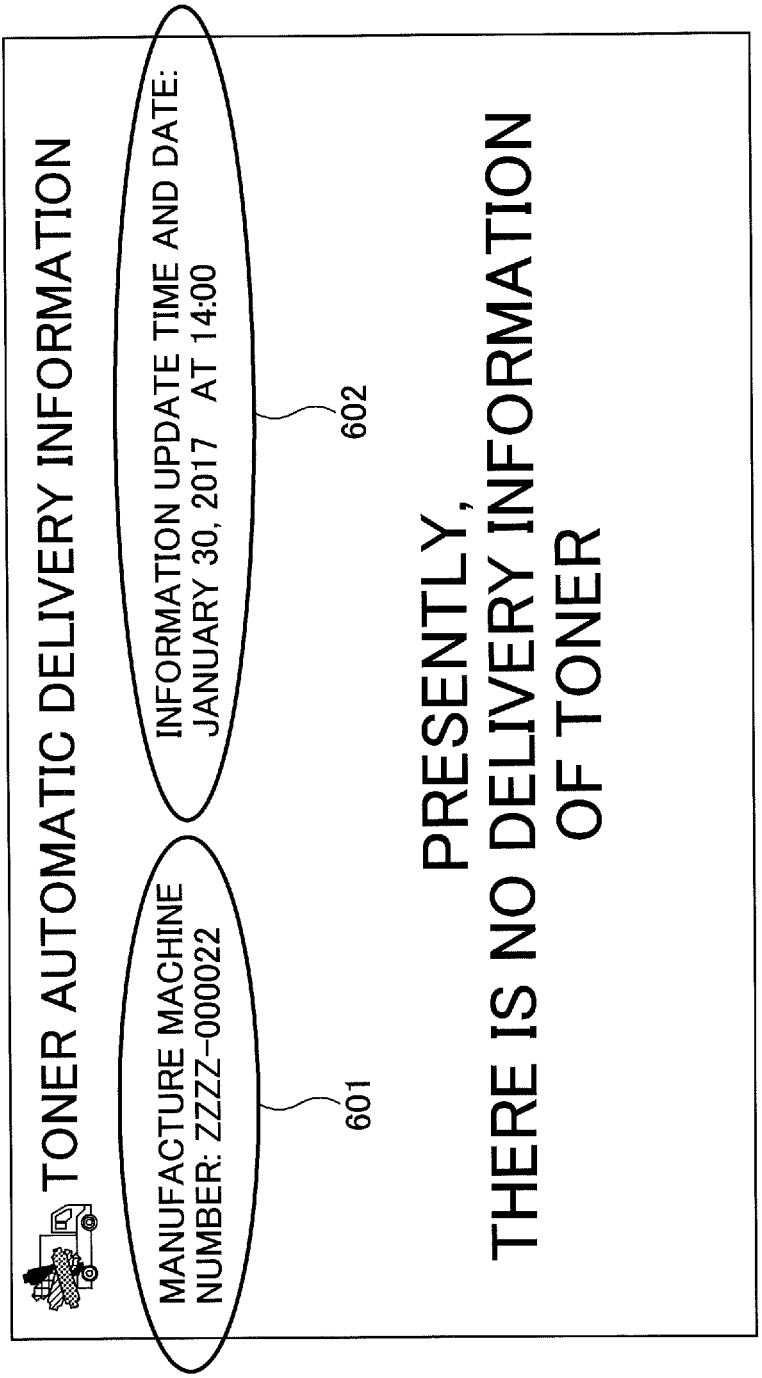
FIGS. 25A and 25B are examples of diagrams illustrating examples of contents displayed by the operation units having different sizes according to the third embodiment of the present invention.
Figure 25B:
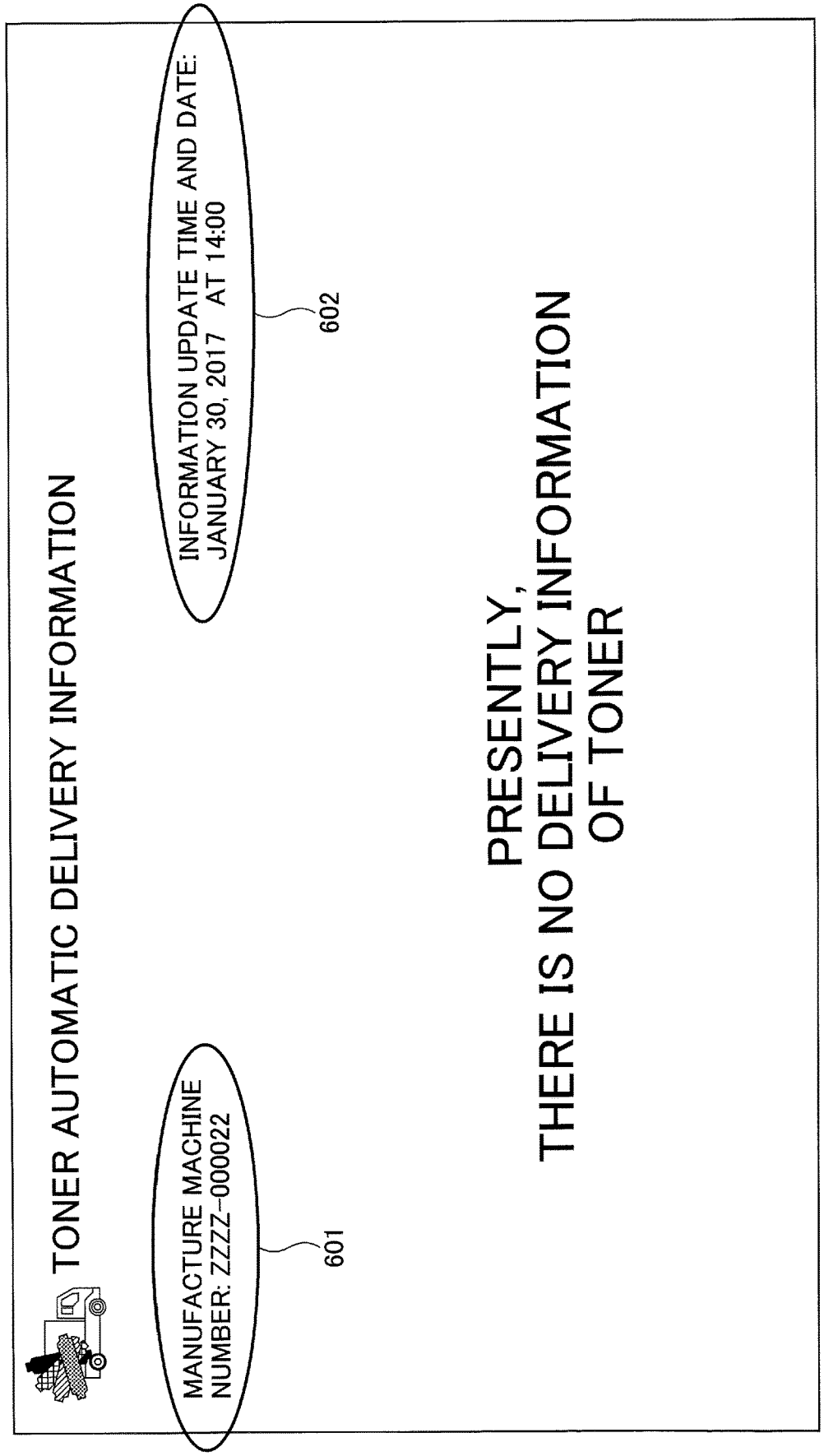

FIGS. 25A and 25B are examples of diagrams illustrating examples of contents displayed by the operation units 20 having different sizes. The operation unit 20 of FIG. 25A has a size of 7 inches and the operation unit 20 of FIG. 25B has a size of 10 inches. Since these characters are small, visibility is bad for a manufacture machine number 601 and an information update date and time 602 in the image forming apparatus 80 having the operation unit 20 with a size of 7 inches.

In the present embodiment, the 7-inch image forming apparatus 80 accesses the tap access URL for generating the content of FIG. 25A. Accordingly, the character sizes of the manufacture machine number 601 and the information update date and time 602 can be made the same between the content of FIG. 25A and the content of FIG. 25B. That is, the content generating unit 75 accessed from the 7-inch image forming apparatus 80 makes the character size of the manufacture machine number 601 and the information update date and time 602 larger than the character size when accessed from the 10-inch image forming apparatus 80. Therefore, the deterioration in visibility of small characters can be reduced.

Note that since the sizes of characters other than the manufacture machine number 601 and the information update date and time 602 are originally large, the content generating unit 75 does not change the sizes of these other characters, between the case of being accessed from the 7-inch image forming apparatus 80 and the case of being accessed from the 10-inch image forming apparatus 80.

<Display of Consumable Item Delivery Status Content and Delivery History List—Third Embodiment>

As described with reference to FIG. 20, the consumable item delivery status content 402 and the delivery history may be displayed on separate screens.

By setting the delivery history to be displayed on a different screen, the viewer can easily confirm the newest delivery status from the consumable item delivery status content 402.

Figure 26A:
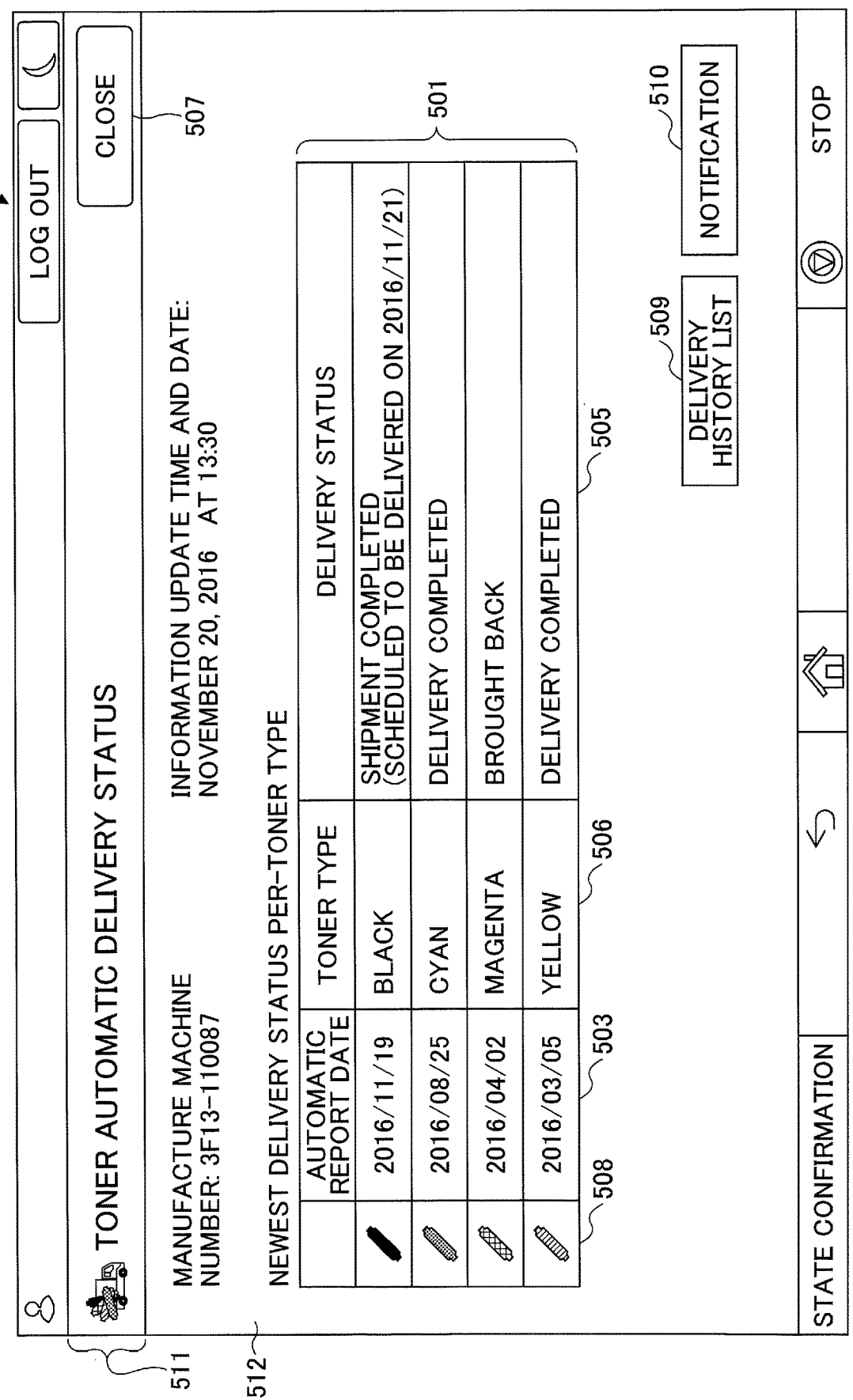
FIGS. 26A and 26B illustrate examples of the consumable item delivery status content and the delivery history list, respectively, according to the third embodiment of the present invention.

FIGS. 26A and 26A illustrate examples of the consumable item delivery status content 402 and the delivery history list, respectively. FIG. 26A illustrates the consumable item delivery status content 402. The consumable item delivery status content 402 includes the per-toner type delivery history 501, a close button 507, a delivery history list button 509, and a notification button 510. The information distribution application generates a frame 511, a background 512, and the close button 507 of the consumable item delivery status content 402; however, the content generating unit 75 of the information distribution apparatus 70 creates the delivery history list button 509 and the notification button 510 including the per-toner type delivery history 501.

The content generating unit 75 associates the delivery history list button 509 and the notification button 510 with URLs of the respective connection destinations. When the viewer presses the delivery history list button 509 and the notification button 510, the information distribution application accesses these URLs. Note that a URL for providing information such as maintenance of the information distribution apparatus 70 is associated with the notification button 510.

Figure 26B:
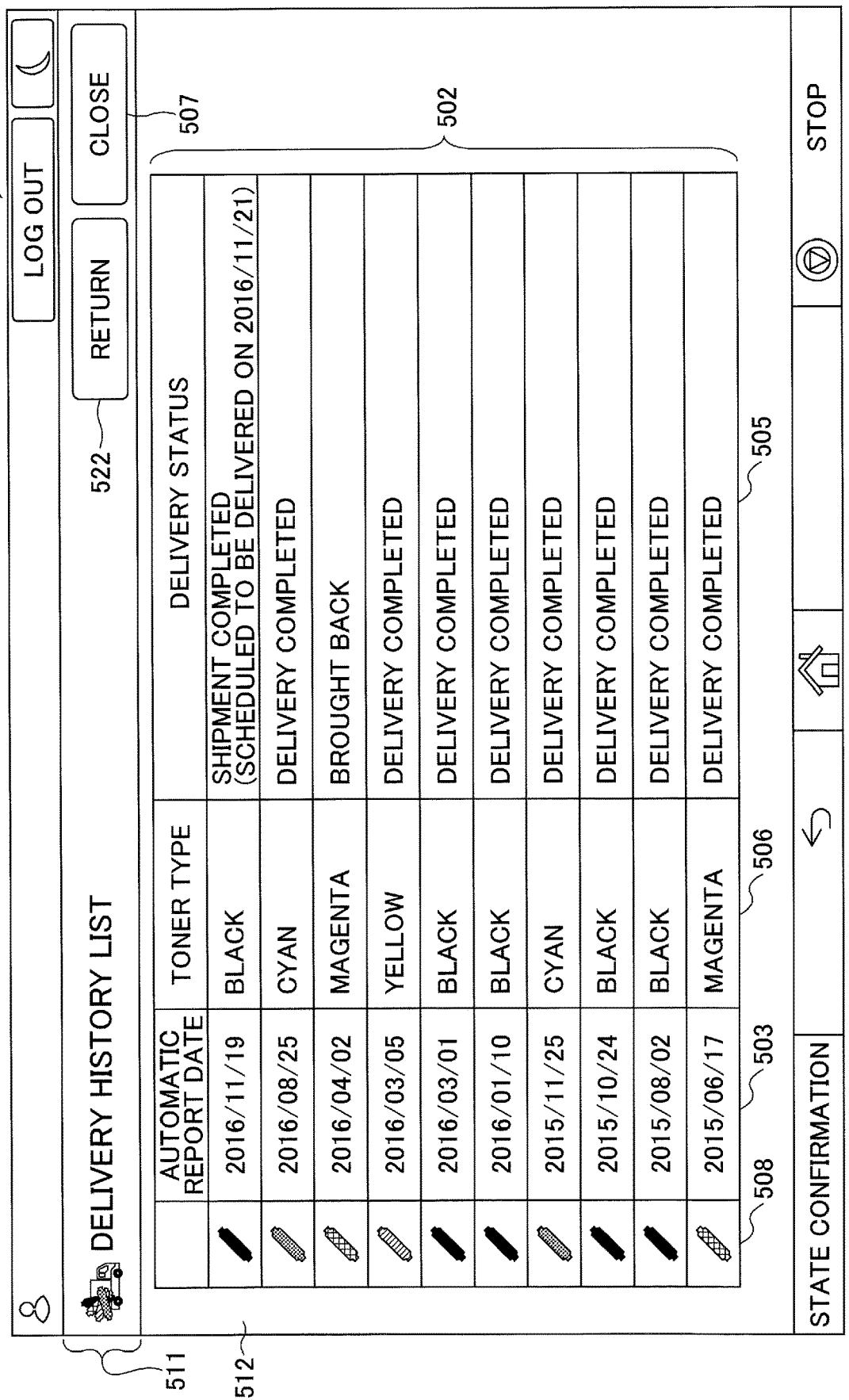

FIG. 26B illustrates a delivery history list screen 521. When the viewer presses the delivery history list button 509, the information distribution application communicates with the information distribution apparatus 70 according to the associated URL, and the content generating unit 75 generates the delivery history list screen 521.

The delivery history list screen 521 includes the delivery history list 502, a return button 522, and the close button 507. Similar to the consumable item delivery status content 402, the information distribution application generates the frame 511, the background 512, and the close button 507, but cannot generate the return button 522. The return button 522 is a button for allowing the viewer to once again display the consumable item delivery status content 402 that has been displayed by the image forming apparatus 80 immediately before, but the information distribution application does not have a mechanism for holding a tap access URL. This is because the information display application displays information other than the information distributed by the information distribution apparatus 70, and therefore the information display application does not support the screen transition unique to the information distribution apparatus 70. Therefore, even if the information distribution application displays the return button 522, the viewer cannot redisplay the consumable item delivery status content 402.

Therefore, when generating the delivery history list screen 521, the content generating unit 75 generates the return button 522, determines the position in the delivery history list screen 521, and associates the return button 522 with a tap access URL. Therefore, when the delivery history list button 509 is pressed, the content acquiring unit 84 transmits the tap access URL held by the information display icon 90 to the information distribution apparatus 70.

FIG. 27 is an example of a sequence diagram illustrating a procedure by the image forming apparatus 80 for displaying the delivery history list screen 521 from the consumable item delivery status content 402.

Step S1: When the viewer presses the delivery history list button 509, the operation accepting unit 81 accepts the pressing of the delivery history list button 509.

Step S2: The content acquiring unit 84 transmits a delivery history list screen acquisition request and a tap access URL to the information distribution apparatus 70.

Step S3: The content request receiving unit 74 of the information distribution apparatus 70 receives the delivery history list screen acquisition request, and the content generating unit 75 associates the return button 522 of the delivery history list screen with the tap access URL.

Step S4: The content distributing unit 76 transmits the delivery history list screen to the image forming apparatus 80.

Accordingly, even if the information distribution application does not include a function to return to the original screen, the viewer can alternately display the delivery history list screen 521 and the consumable item delivery status content 402.

Next, with reference to FIG. 28, a process by the information distribution application and information distribution apparatus 70 when the information display icon is pressed, will be described.

First, the viewer presses the information display icon (step S10). The operation accepting unit 81 receives the operation.

The content acquiring unit 84 determines whether the information display icon has been acquired (step S20). This is because immediately after activation, even when the information display icon is displayed, the tap access URL, etc., has not been acquired.

When the determination in step S20 is YES, the content acquiring unit 84 determines whether a model and a machine number are necessary for acquiring the content (step S30). This is because there are contents that do not require a model or a machine number. For example, the above notification button is for displaying common content that are unrelated to a model or a machine number, and therefore a model and a machine number are unnecessary. The process in FIG. 28 will be described assuming that the model and the machine number are necessary. Note that whether a model and a machine number are necessary depends on the type of the information display icon that is pressed.

The content acquiring unit 84 sets the model and the machine number in the tap access URL and accesses the information distribution apparatus 70. For example, "?mid=3C66-700013" is added to the end of the tap access URL.

The content generating unit 75 of the information distribution apparatus 70 generates content corresponding to the tap access URL (step S50). That is, one of the consumable item delivery status content 402, the consumable item delivery promotion content 403, and an application explanation content 405 (see FIG. 29) is generated (steps S60, S70, and S80).

When the content distributing unit 76 transmits the content, the content acquiring unit 84 of the information distribution application receives the content, and the content display unit 85 displays the content (step S90).

When the determination in step S20 is NO, since the information display icon has not been acquired, the icon acquiring unit 82 performs the process in FIG. 24 (step S40). When the information display icon can be acquired by this process, the processes from step S30 and onward in FIG. 28 are executed. In this way, when the information display icon is pressed when the information display icon is not held, the information distribution application can acquire the information display icon and can subsequently acquire the content.

<Another Example of Information Display Icon—Third Embodiment>

Figure 29:
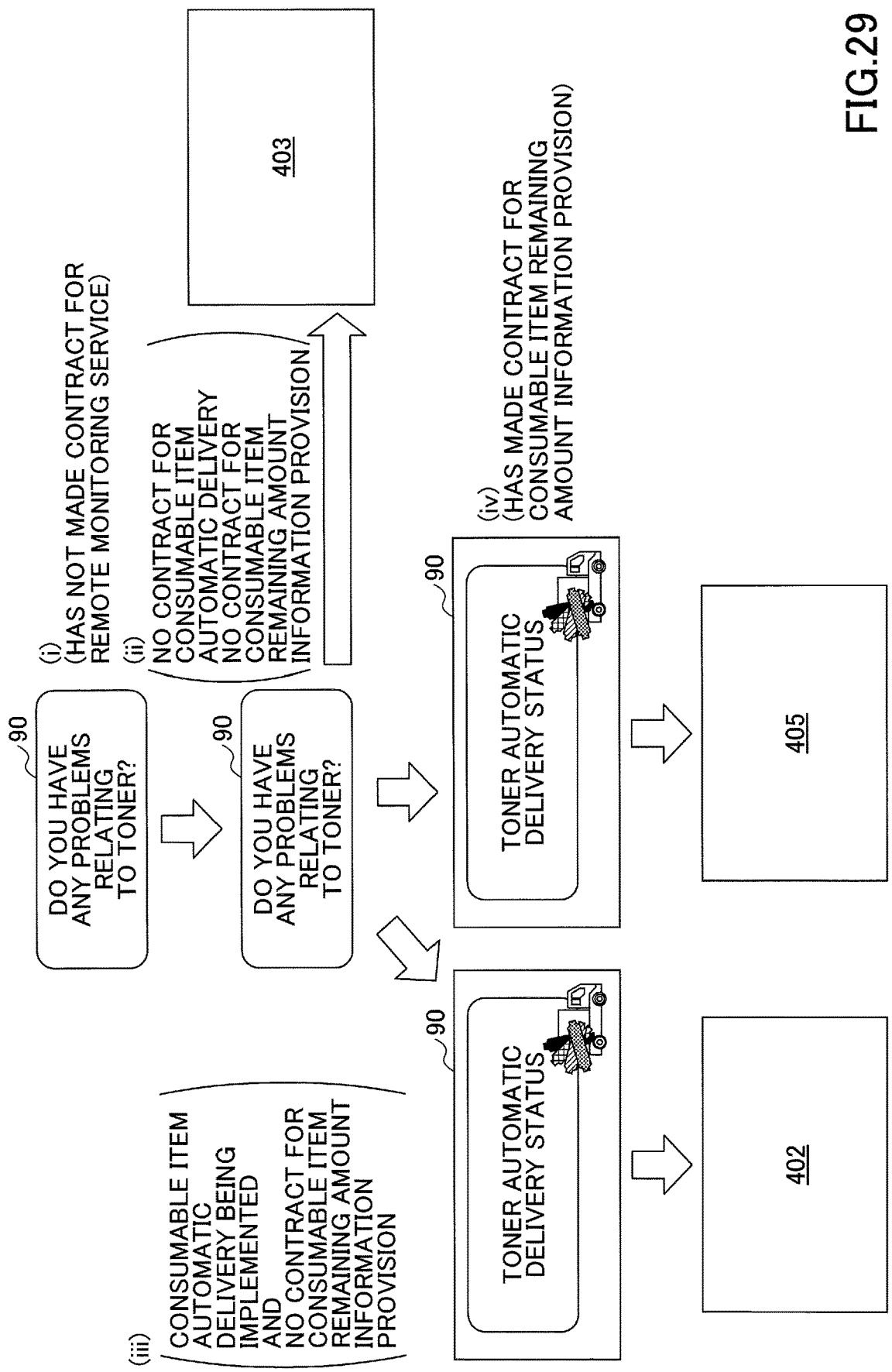
FIG. 29 is an example of a diagram for describing the relationship between the contract state and the information display icon according to the third embodiment of the present invention.

FIG. 29 is an example of a diagram for describing the relationship between the contract state and the information display icon 90. In FIG. 29, the differences from FIG. 14 will be described.

(i) Has not made contract for remote monitoring service

The information display icon 90 in this case is the same as that in FIG. 14.

The following (ii)-(iv) will be described assuming that a contract for the remote monitoring service has been made.

(ii) No contract for consumable item automatic delivery/ No contract for consumable item remaining amount information provision The information display icon 90 in this case is the same as that in FIG. 14.

(iii) Has made contract for consumable item automatic delivery/No contract for consumable item remaining amount information provision The information display icon 90 displays a message "toner automatic delivery status". The URL of the information distribution apparatus 70 is linked to the information display icon 90, and when the viewer presses the information display icon 90, the information distribution application displays the consumable item delivery status content 402.

(iv) Has made contract for consumable item remaining amount information provision The information display icon 90 displays a message "toner automatic delivery status". This is the same as (iii). The URL of the information distribution apparatus is associated with the information display icon 90, and when the viewer presses the information display icon 90, the illustrated application description content 405 is displayed. In this application explanation content 405, "Toner automatic delivery service of the remote management service. An application to be exclusively used by customer who has subscribed to this service" is displayed. Accordingly, the viewer can recognize that the information display icon 90 has no meaning for himself.

Note that the content in FIG. 29 is merely an example, and specifics contents of the content may be appropriately set.

<Overview—Third Embodiment>

As described above, the information distribution system 100 according to the present embodiment can provide content according to the size of the operation unit 20, and when the information display icon 90 is the newest, the information distribution system 100 does not create the information display icon 90, and therefore the processing load of the information distribution apparatus 70 can be reduced.

Note that not only the contents corresponding to the size of the operation unit 20, but also contents corresponding to the functions (printer, copy, FAX, finisher, monochrome/ color, double-sided printing, and aggregate printing, etc.) provided in the image forming apparatus 80, may be created.

Furthermore, the server system may notify at least the update time of the contract information to the image forming apparatus 80, and the image forming apparatus 80 may determine whether to acquire the information display icon. In this case, a response to the transmission of the device information may be considered as the transmission timing of the contract information.

<Other Application Examples >

The information distribution system and the electronic device are not limited to the specific embodiments described in the detailed description, and variations and modifications may be made without departing from the spirit and scope of the present invention.

For example, in the above embodiments, toner has been described as an example of a consumable item; however, paper may be the consumable item in some cases. Furthermore, a waste toner bottle for collecting toner on the intermediate transfer belt and the photoconductor, and a fixing belt may be consumable items. In the case of a projector being used as an electronic apparatus other than the image forming apparatus, the light source lamp may be the consumable item in some cases.

Furthermore, besides merely displaying the information display icon 90, the image forming apparatus 80 may read a message by voice sound.

Furthermore, the screen examples illustrated in above embodiments are merely examples, and it is possible to appropriately deform, replace screen elements, add screen elements, and remove screen elements, etc.

Furthermore, the sales company server 110 may be an information processing apparatus other than the consumable item ordering apparatus 50 in the information distribution system 100. Furthermore, the transmission destination of the information relating to the consumable item may be the terminal of the administrator, etc. That is, the destination of the information relating to the consumable item is not limited to the server of the sales company.

Furthermore, the information display icon 90 may be a simple icon. Furthermore, the information display icon 90 may be referred to as a button, an object, and a soft key, etc., and the name need not be an icon. Furthermore, the information display icon 90 may be pressed by pressing a hard key.

Furthermore, the configuration example of FIG. 6, etc., is divided according to the main functions in order to facilitate understanding of processes by the information distribution system 100. The invention of the present application is not limited by the method of division of the processing units or the names of the processing units. The processes of the information distribution system 100 can be divided into more processing units according to the processing contents. It is also possible to divide one processing unit to include more processes.

As illustrated in FIG. 2, the remote monitoring apparatus 40, the consumable item ordering apparatus 50, the consumable item delivery apparatus 60, and the information distribution apparatus 70 may be respectively implemented by separate information processing apparatuses, or two or more of these apparatuses may be implemented by one information processing apparatus. Furthermore, these apparatuses may be implemented by more information processing apparatuses than those illustrated in FIG. 2.

Note that the content acquiring unit 84 is an example of an information requester, the content display unit 85 is an example of an information displayer, the contract information receiving unit 71 is an example of a contract information acquirer, the content generating unit 75 is an example of an information generator, the content distributing unit 76 is an example of an information distributer, and the device information transmitting unit 89 is an example of a device information transmitter. The information display icon 90 is an example of a display component, the icon acquiring unit 82 is an example of a display component information acquirer, the icon display unit 83 is an example of a display component displayer, the icon information providing unit 73 is an example of a display component information provider, and the delivery status updating unit 62 is an example of an updater. The delivery result receiving unit 64 is an example of a delivery result receiver.

According to one embodiment of the present invention, an information providing system by which erroneous recognition can be avoided, is provided.

The information distribution system and the electronic device are not limited to the specific embodiments described in the detailed description, and variations and modifications may be made without departing from the spirit and scope of the present invention.

What is claimed is:

1. An information distribution system comprising:
an image forming apparatus that includes consumable items of different colors; and
a server system including at least one information distribution apparatus that communicates with the image forming apparatus via a network, wherein
the image forming apparatus includes:
a first processor; and
a first memory storing first program instructions that cause the first processor to:
transmit a request for delivery status information to the server system, the delivery status information including a scheduled delivery date for each color of the consumable items to be delivered, consumable item delivery history information for a consumable item from among the consumable items, the consumable item delivery history information including the newest delivery history for the consumable item, and a delivery history list display component that indicates a history of past deliveries of the consumable item; and
display the delivery status information including the scheduled delivery date for each color of the consumable items to be delivered on a display of the image forming apparatus, and
the server system includes:
a second processor; and
a second memory storing second program instructions that cause the second processor to:
generate the delivery status information including the scheduled delivery date for each color of the consumable items to be delivered,
generate a consumable item delivery history display component from the delivery status information that has been stored for a predetermined period of time, and
distribute the delivery status information to the image forming apparatus in response to receiving the request for the delivery status information from the image forming apparatus.

2. The information distribution system according to claim 1, wherein
the second program instructions further cause the second processor to:
add a time to information relating to a display component indicating a summary of the delivery status information generated by the second processor, the time indicating when the information relating to the display component was generated; and
provide the information relating to the display component to the image forming apparatus; and
the first program instructions further cause the first processor to:
transmit the time to the server system, when requesting the information relating to the display component from the server system, wherein the second processor:
compares the time with an update time of updating contract information acquired by the second processor,
generates the information relating to the display component in response to determining that the update time is more recent than the time, and
transmits a response indicating that the information relating to the display component is newest to the image forming apparatus, upon determining that the update time is not more recent than the time.

3. The information distribution system according to claim 1, wherein the request for the delivery status information includes identification information of the image forming apparatus.

4. The information distribution system according to claim 3, wherein
the image forming device includes:
a main body including at least an image former, and
an operator configured to operate the main body, wherein the operator includes:
an operating system (OS) and a central processing unit (CPU) that are independent from the main body, and
the first program instructions are provided as an information distribution application and a browser that are operated by the OS and the CPU, wherein
the information distribution application of the operator is configured to:
acquire an image of an icon of the information distribution application from the server system at a predetermined timing and display the acquired image,
transmit the identification information of the electronic device in response to the acquired image of the icon being pressed, and
acquire content corresponding to the identification information and display the acquired content by the browser.

5. The information distribution system according to claim 4, wherein
the predetermined timing corresponds to when the information distribution application is pressed or at an interval of a first predetermined time, when the information distribution application has not acquired the image of the icon,
the predetermined timing corresponds to at an interval of a second predetermined time, when the information distribution application has acquired the image of the icon, and
the first predetermined time is shorter than the second predetermined time.

6. The information distribution system according to claim 3, wherein the second program instructions further cause the second processor to:
acquire contract information relating to a contract for a service provided to the image forming apparatus;
identify the contract information of the image forming apparatus based on the identification information; and
generate the delivery status information according to the contract information.

7. The information distribution system according to claim 6, wherein
the first program instructions further cause the first processor to:
transmit, to the server system, device information relating to the image forming apparatus,
the contract information includes a setting indicating whether the contract is for transmitting the device information to a predetermined information processing apparatus,
the second program instructions further cause the second processor to:
transmit the device information to the predetermined information processing apparatus set in the contract information, and
change the generated delivery status information based on whether the contract is for transmitting the device information to the predetermined, information processing apparatus.

8. The information distribution system according to claim 7, wherein
the contract information includes a setting indicating whether the contract is for ordering, the consumable items of the image forming apparatus, and
the second program instructions further cause the second processor to:
change the generated delivery status information based on whether the contract is for ordering the consumable items or the contract is not for ordering the consumable items.

9. The information distribution system according to claim 8, wherein the second program instructions further cause the second processor to:
acquire a delivery status for each color of the consumable items of the image forming apparatus to be delivered; and
generate the delivery status information for each color of the consumable items upon determining that the contract is for ordering the consumable items and not for transmitting the device information to the predetermined information processing apparatus.

10. The information distribution system according to claim 9, wherein the second program instructions further cause the second processor to:
update the delivery status for each color of the consumable items, and
generate the delivery status information relating to the delivery status for each color of the consumable items upon applying the updated delivery status to the delivery status, in response to the updating of the delivery status.

11. The information distribution system according to claim 10, wherein
the second program instructions further cause the second processor to:
receive a message indicating non-delivery when delivery of a consumable item from among, the consumable items is unsuccessful, the message indicating non-delivery being, received from a consumable item delivery apparatus configured to manage delivery of the consumable item, the consumable item delivery apparatus being included in the server system, and
determine that delivery of the consumable items has been completed when the message indicating non-delivery is not, received by the second processor from the consumable item delivery apparatus for a predetermined period from when a delivery request has been sent to the consumable item delivery apparatus, and
record a report indicating completion of delivery, wherein the second processor generates the delivery status information of the consumable items, upon applying the report indicating completion of delivery to the delivery status.

12. The information distribution system according to claim 10, wherein the second program instructions further cause the second processor to:
periodically report the delivery status for each color of the consumable items, report the delivery status for each color of the consumable items that has been ordered after previously reporting the delivery status, and
report the updated delivery status for each color of the consumable items when the delivery status is updated.

13. The information distribution system according to claim 9, wherein
the delivery status for each color of the consumable items acquired by the second processor includes a product name for each color of the consumable items, and
the second program instructions further cause the second processor to:
compare the product name with a character string held in advance, to determine a type for each color of the consumable items, and
generate the delivery status information of the consumable item in association with the type for each color of the consumable items.

14. The information distribution system according to claim 8, wherein the second program instructions further cause the second processor to:
generate the delivery status information relating to a service of transmitting the device information from the image forming apparatus to the server system upon determining that the contract is for transmitting the device information to the predetermined information processing apparatus.

15. The information distribution system according to claim 8, wherein the second program instructions further cause the second processor to:
generate the delivery status information relating to a service of automatically delivering the consumable items, upon determining that the contract is not for ordering the consumable items and not for transmitting the device information to the predetermined information processing apparatus.

16. The information distribution system according to claim 6, wherein
the first program instructions further cause the first processor to:
transmit a request to the server system to acquire, from the server system, information relating to a display component indicating a summary of the delivery status information generated by the second processor, and
display the display component on the display of the image forming apparatus by using the information relating to the display component, and
the second program instructions further cause the second processor to:
generate the information relating to the display component according to the contract information, and to provide the information relating to the display component to the image forming apparatus.

17. The information distribution system according to claim 16, wherein
the second program instructions further cause the second processor
add address information according to the contract information to the information relating to the display component, and
the first program instructions further cause the first processor to:
acquire the information relating to the display component generated by the second processor by accessing a resource of the address information; and
display the information relating to the display component on the display of the image forming apparatus in response to accepting a pressing operation on the display component displayed on the display of the image forming apparatus.

18. The information distribution system according to claim 17, wherein
the first program instructions further cause the first processor to:
accept an operation of displaying other information from the information displayed by the first processor,
transmit a request for the other information to the server system in response to accepting the operation of displaying other information, the request being transmitted together with the address information,
the second program instructions further cause the second processor to:
generate the other information and associates the address information with a return button of the other information,
distribute the other information to the electronic device, and
display the other information together with the return button on the display of the image forming apparatus.

19. The information distribution system according to claim 17, wherein
the first program instructions further cause the first processor to:
transmit information relating to a function of the image forming apparatus to the server system, when requesting the information relating to the display component from the server system,
the second program instructions further cause the second processor to:
add the address information according to the function of the image forming apparatus to the information relating to the display component, wherein
the first processor accesses the resource of the address information and displays, on the display of the image forming, apparatus, the information relating to the function in response to accepting a pressing operation on the displayed display component.

20. The information distribution system according to claim 16, wherein the first program instructions further cause the first processor to:
periodically acquire the information relating to the display component from the server system.

21. The information distribution system according to claim 6, wherein
the server system includes a server configured to manage the contract information, and
the contract information acquirer acquires the contract information that has been updated from the server, without acquiring the contract information that has not been updated.

22. The information distribution system according to claim 6, wherein
the first program instructions further cause the first processor to:
transmit, to the server system, device information relating to the image forming apparatus, and
the second program instructions further cause the second processor to
acquire service information relating to support services provided to the image forming apparatus, the service information including a setting that indicates whether the device information is to be sent to a predetermined information processing apparatus,
transmit the device information to the predetermined information processing apparatus, and
change the generated delivery status information based on whether the support services include transmitting the device information to the predetermined information processing apparatus.

23. The information distribution system according to claim 22, wherein
the device information indicates a remaining amount of a consumable item from among the consumable items, and
the second program instructions further cause the second processor to
transmit an order request for the consumable item to the predetermined information processing apparatus in a case where the indicated remaining amount of the consumable item is less than or equal to a threshold amount.

24. The information distribution system according to claim 22, wherein the device information further includes counter information indicating a cumulative print amount of the image forming apparatus.

25. The information distribution system according to claim wherein the consumable items are color toners.

26. The information distribution system according to claim 1, wherein
the first program instructions further cause the first processor to:
display on the display of the image forming apparatus
a delivery completed status in a case where a delivery of a consumable item from among the consumable items of different colors is completed, and
a delivery returned status in a case where the delivery of the consumable item from among the consumable items of different colors was returned;
the second program instructions further cause the second processor to:
generate delivery completed status information, indicating the delivery completed status, in the case where the delivery of the consumable item is completed, and
generate delivery returned status information, indicating the delivery returned status, in a case where the consumable item was returned; and
the delivery completed status information and the delivery returned status information is included in the delivery status information transmitted from the server system to the image forming apparatus.

27. An image forming apparatus including, consumable items of different colors that communicates with a server system including at least one information distribution apparatus via a network, the image forming apparatus comprising:
a first processor; and
a first memory storing first program instructions that cause the first processor to:
transmit a request for delivery status information to the server system, the delivery status information including
a scheduled delivery date for each color of the consumable items to be delivered,
consumable item delivery history information for a consumable item from among the consumable items, the consumable item delivery history information including the newest delivery history for the consumable item, and
a delivery history list display component that indicates a history of past deliveries of the consumable item; and
display the delivery status information including the scheduled delivery date for each color of the consumable items to be delivered on a display of the image forming apparatus, wherein
the server system includes:
a second processor; and
a second memory storing second program instructions that cause the second processor to: generate the delivery status information including the scheduled delivery state for each color of the consumable items to be delivered, generate a consumable item delivery history display component from the delivery status information that has been stored for a predetermined period of time, and distribute the delivery status information to the image forming apparatus in response to receiving the request for the delivery status information from the image forming apparatus.

28. The image forming apparatus according to claim 27, wherein the second program instructions further cause the second processor to:
acquire contract information relating to a contract for a service provided to the image forming apparatus;
identify the contract information of the image forming, apparatus based on identification information of the, image forming apparatus; and
generate the delivery status information according to the contract information.

* * * * *